US008781412B2

(12) United States Patent
Mihota

(10) Patent No.: US 8,781,412 B2
(45) Date of Patent: *Jul. 15, 2014

(54) RADIO TRANSMISSION SYSTEM, RADIO COMMUNICATION APPARATUS, AND RADIO TRANSMISSION METHOD

(75) Inventor: Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 928 days.

This patent is subject to a terminal disclaimer.

(21) Appl. No.: 12/890,055

(22) Filed: Sep. 24, 2010

(65) Prior Publication Data

US 2011/0098010 A1    Apr. 28, 2011

(30) Foreign Application Priority Data

Oct. 22, 2009  (JP) ................................ 2009-243107
Jan. 21, 2010  (JP) ................................ 2010-011360

(51) Int. Cl.
H04W 40/02   (2009.01)
H04B 7/02    (2006.01)
H04K 1/10    (2006.01)

(52) U.S. Cl.
USPC ....... 455/101; 455/63.1; 455/67.13; 455/103; 455/114.2; 370/229; 375/267

(58) Field of Classification Search
USPC .............. 455/101, 63.1, 67.13, 103, 114.2, 455/115.1, 115.3, 67.11, 132–135; 370/229, 252, 328, 329, 277–282, 310; 375/267, 259, 260

See application file for complete search history.

(56) References Cited

U.S. PATENT DOCUMENTS 6,348,891 B1 * 2/2002 Uemura ........................ 342/413
6,608,875 B1   8/2003 Wolaver (Continued)

FOREIGN PATENT DOCUMENTS

EP   1 484 843 A1   12/2004
EP   1 821 418 A2    8/2007

(Continued)

OTHER PUBLICATIONS

Extended European Search Report issued Mar. 16, 2012 in patent application No. 10173823.5.

(Continued)

Primary Examiner — Pablo Tran
(74) Attorney, Agent, or Firm — Oblon, Spivak, McClelland, Maier & Neustadt, L.L.P.

(57) ABSTRACT

A radio transmission system includes: antenna pairs, each antenna pair being a combination of a transmitting antenna and a receiving antenna in one-to-one correspondence. A radio signal from the transmitting antenna in one of the antenna pairs reaches the receiving antenna of the one antenna pair as a desired wave directly, and a radio signal from the transmitting antenna of another antenna pair different from the one antenna pair reaches the receiving antenna of the one antenna pair as an unnecessary wave directly. A transfer characteristic correction section which performs a correction operation based on the transfer characteristic of a transmission space between the transmitting antenna and the receiving antenna for a transmission-target signal corresponding to the transmitting antenna, and a modulation functional section which modulates a carrier signal with a corrected signal after having been corrected by the transfer characteristic correction section and transmits the modulated carrier signal from the corresponding transmitting antenna, are provided in correspondence with each antenna pair.

23 Claims, 35 Drawing Sheets

(56) References Cited

U.S. PATENT DOCUMENTS

| | | | |
|---|---|---|---|
| 6,731,712 | B1 | 5/2004 | Lindstrom et al. |
| 2002/0080897 | A1 | 6/2002 | Main et al. |
| 2002/0191535 | A1* | 12/2002 | Sugiyama et al. ............ 370/208 |
| 2004/0002364 | A1* | 1/2004 | Trikkonen et al. ......... 455/562.1 |
| 2004/0164812 | A1 | 8/2004 | Lindstrom et al. |
| 2005/0141631 | A1* | 6/2005 | Takano ......................... 375/267 |
| 2005/0176377 | A1 | 8/2005 | Shoji et al. |
| 2005/0226355 | A1 | 10/2005 | Kibune et al. |
| 2007/0132521 | A1 | 6/2007 | Lee et al. |
| 2008/0285686 | A1* | 11/2008 | Beaulieu et al. .............. 375/329 |
| 2009/0067402 | A1* | 3/2009 | Forenza et al. ............... 370/343 |
| 2010/0020757 | A1* | 1/2010 | Walton et al. ................. 370/329 |
| 2011/0064036 | A1* | 3/2011 | Tsai et al. ..................... 370/329 |
| 2011/0194591 | A1* | 8/2011 | Agee et al. .................... 375/219 |

FOREIGN PATENT DOCUMENTS

| | | |
|---|---|---|
| JP | 2003-179516 | 6/2003 |
| JP | 2003-244016 | 8/2003 |
| JP | 2005-303607 | 10/2005 |
| JP | 2007-228499 | 9/2007 |
| JP | 2008-535272 | 8/2008 |
| JP | 2008-252566 | 10/2008 |
| JP | 2008-271188 | 11/2008 |
| JP | 2008-541639 | 11/2008 |
| JP | 2009-33588 | 2/2009 |
| JP | 2009-49632 | 3/2009 |
| JP | 2009-55228 | 3/2009 |
| JP | 2009-182894 | 8/2009 |
| JP | 2009-246764 | 10/2009 |
| JP | 4708241 B2 | 6/2011 |
| WO | WO 01/58018 A2 | 8/2001 |
| WO | WO 2009/017230 A1 | 2/2009 |
| WO | WO 2009/026400 A1 | 2/2009 |

OTHER PUBLICATIONS

Office Action issued Oct. 22, 2013 in Japanese Application No. 2010-011360 (With English Translation).

Office Action issued Nov. 26, 2013 in Japanese Application No. 2009-200118.

Japanese Office Action issued Aug. 13, 2013, in Japan Patent Application No. 2009-200118.

Combined Chinese Office Action and Search Report issued Dec. 4, 2013, in Chinese Patent Application No. 201080048039.0 with English translation.

* cited by examiner (1) FULL-DUPLEX SYSTEM BY FREQUENCY DIVISION MULTIPLEX SYSTEM (2) FREQUENCY DIVISION MULTIPLEX SYSTEM OF SIGNAL (3) FREQUENCY DIVISION MULTIPLEX SYSTEM + MULTICHANNELING (N1 ≠ N2)

(4) FREQUENCY DIVISION MULTIPLEX SYSTEM + FULL-DUPLEX SYSTEM + MULTICHANNELING (N=N1=N2)

(5) SPACE DIVISION MULTIPLEX SYSTEM + MULTICHANNELING (+ FULL-DUPLEX SYSTEM)

<SPACE DIVISION MULTIPLEX>

(1) RELATIONSHIP BETWEEN TRANSMISSION-RECEPTION DISTANCE AND PROPAGATION LOSS $L[dB] = 10\log_{10}((4\pi d/\lambda)^2)$ ··· (A)

L: PROPAGATION LOSS
d: INTER-TWO-PARTY (TRANSMISSION-RECEPTION) DISTANCE
$\lambda$: WAVELENGTH $d_2/d_1 = 10^{(DU/20)}$ ··· (B)

(2)

(3)

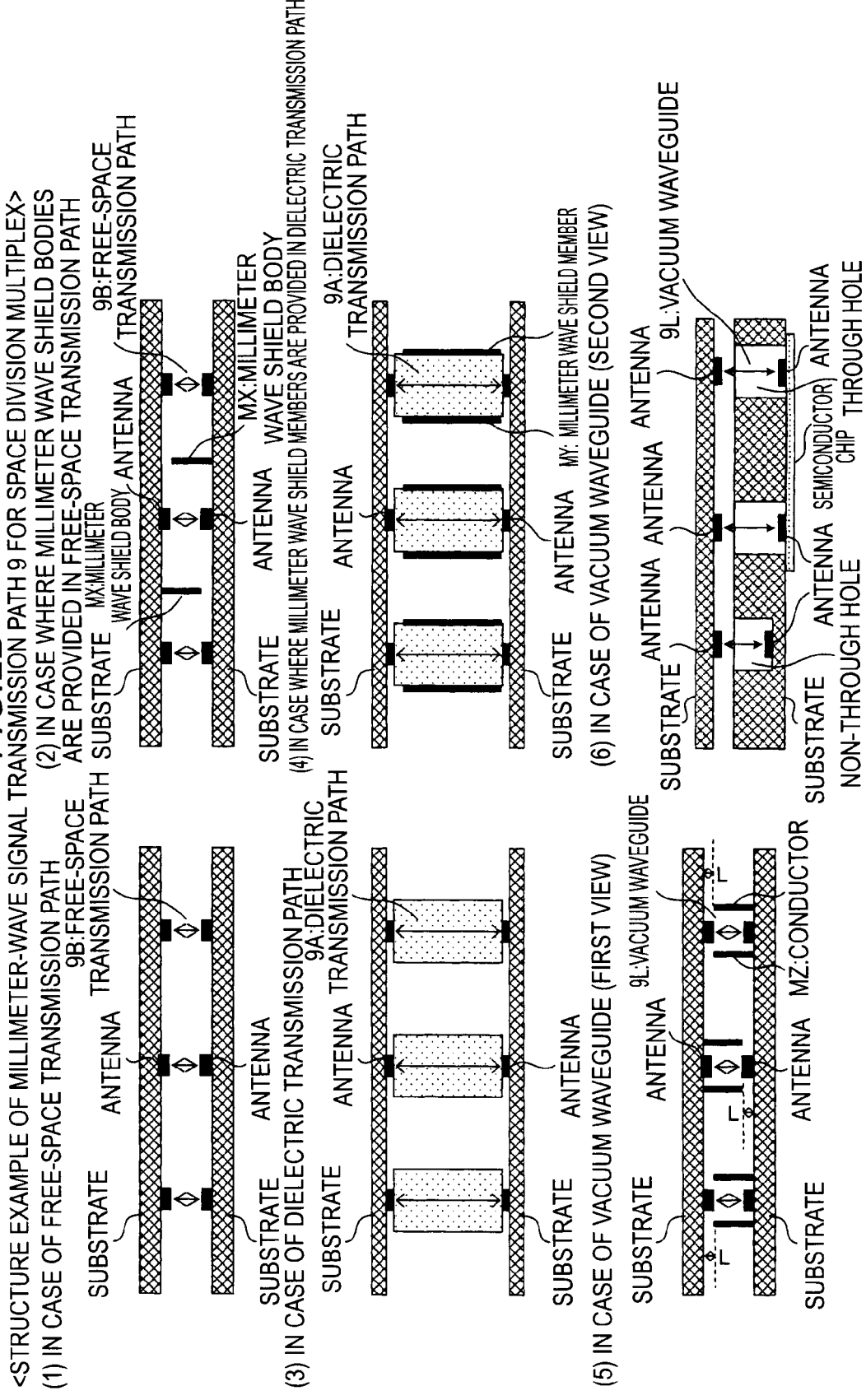

<MODULATION FUNCTIONAL SECTION AND
DEMODULATION FUNCTIONAL SECTION: FIRST EXAMPLE>

(1) MODULATION FUNCTIONAL SECTION (2) DEMODULATION FUNCTIONAL SECTION

<SECOND EXAMPLE OF MODULATION FUNCTIONAL SECTION: TRANSMISSION-SIDE SIGNAL CREATION SECTION 8110>

(1) BASIC CONFIGURATION 1

(2) BASIC CONFIGURATION 2

(3) BASIC CONFIGURATION 3 (APPLICATION TO SYSTEM FOR MODULATING AMPLITUDE)

(4) BASIC CONFIGURATION 4 (APPLICATION TO SYSTEM FOR MODULATING FREQUENCY OR PHASE)

<SECOND EXAMPLE OF DEMODULATION FUNCTIONAL SECTION: RECEPTION-SIDE SIGNAL CREATION SECTION 8220>

(1) BASIC CONFIGURATION 1

(2) BASIC CONFIGURATION 2

(3) BASIC CONFIGURATION 3

(4) BASIC CONFIGURATION 4

<PHASE RELATIONSHIP OF INJECTION LOCKING>

<RELATIONSHIP BETWEEN MULTICHANNELING AND INJECTION LOCKING SCHEME>
(1) MULTICHANNELING (2) IN CASE OF SQUARE-LAW DETECTION (3) IN CASE WHERE IF IS DOWNCONVERTED AND SQUARE-LAW DETECTION IS PERFORMED (4) IN CASE OF INJECTION LOCKING SCHEME

<REDUCTION IN CIRCUIT SCALE AT MULTIPLEX TRANSMISSION: BASIC MECHANISM>

(1)

(2)

<IN CASE WHERE TRANSMISSION INFORMATION AND REFERENCE CARRIER SIGNAL ARE IN PHASE>

(1) TRANSMISSION SIDE (5) RECEPTION SIDE (2) FIRST EXAMPLE (3) SECOND EXAMPLE (4) THIRD EXAMPLE

<RELATIONSHIP BETWEEN MODULATION SYSTEM AND NECESSARY TRANSMISSION POWER>

(1) PSK $P_{PSK} = a^2/2$ · · · (B-1)

(2) ASK MODULATION RATE 100%

$P_{ASK100\%} = ((2a)^2/2 + 0)/2 = a^2$ · · · (B-2)

(3) ASK MODULATION RATE 50%

$P_{ASK50\%} = ((3a)^2/2 + (a)^2/2)/2 = 5a^2/2$ · · · (B-3)

<REDUCTION IN NECESSARY TRANSMISSION POWER AT MULTIPLEX TRANSMISSION: BASIC MECHANISM>

<OPERATION METHOD OF MIMO PROCESSING FOR APPLICATION ON TRANSMISSION SIDE: BASIS>
(1) FOR CHANNEL MATRIX (2) RELATIONSHIP OF TRANSMITTED/RECEIVED SIGNAL $$r = Hs + v = H(H^{-1}\hat{s}) + v = \hat{s} + v$$

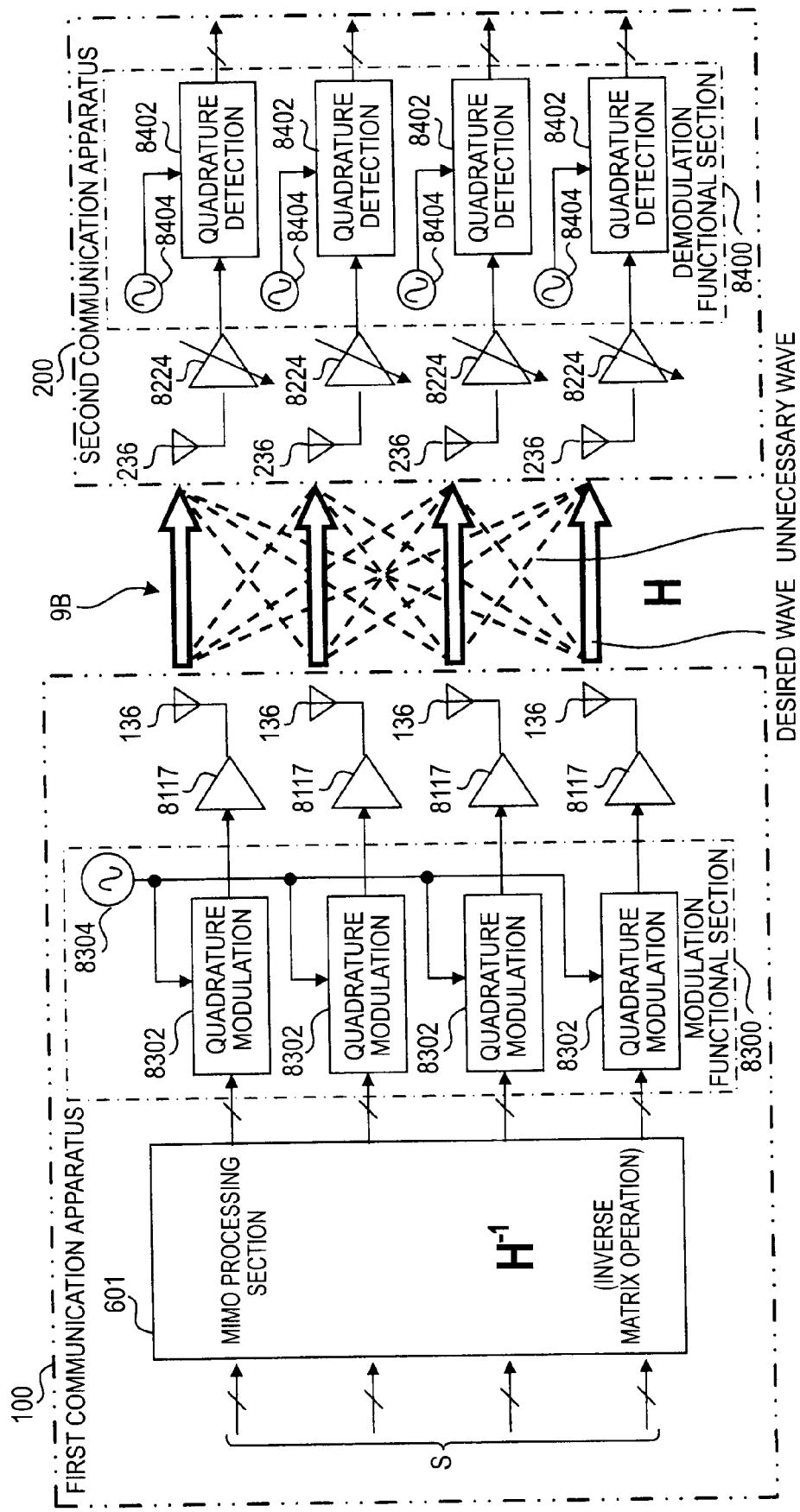

<MIMO PROCESSING ON TRANSMISSION SIDE IN CASE OF TWO CHANNELS: BASIS>

(1)

(2) VERSATILE CIRCUIT CONFIGURATION (1)

(2) REAL TERM (cos TERM)

(3) IMAGINARY TERM (sin TERM)

<PATH CONDITION 1: PATH DIFFERENCE $\Delta d = (n/2 + 1/4)\lambda c$>

(1) RELATIONSHIP BETWEEN CHANNEL MATRIX, INVERSE MATRIX, AND TRANSMITTED SIGNAL (1-1)

(1-2)

$$H = \begin{pmatrix} Re & Im \\ Im & Re \end{pmatrix}$$

$$H^{-1} = \begin{pmatrix} Re' & Im' \\ Im' & Re' \end{pmatrix}$$

(1-3) TRANSMITTED SIGNAL ON PHASE PLANE (BPSK)

(2) CIRCUIT CONFIGURATION EXAMPLE

<PATH CONDITION 2: PATH DIFFERENCE $\Delta d = (n/2)\lambda c$>

(1) RELATIONSHIP BETWEEN CHANNEL MATRIX, INVERSE MATRIX, AND TRANSMITTED SIGNAL

<MIMO PROCESSING ON TRANSMISSION SIDE IN CASE OF THREE OR MORE CHANNELS: REDUCTION IN AMOUNT OF REAL MULTIPLICATION>

<APPLICATION TO THREE-DIMENSIONAL ARRANGEMENT>
(1) TWO-DIMENSIONAL ARRANGEMENT (2) THREE-DIMENSIONAL ARRANGEMENT

<APPLICATION TO DIGITAL PROCESSING>

(1) PATH CONDITION 1: PATH DIFFERENCE $\triangle d=(n/2+1/4)\lambda c$ (2) PATH CONDITION 2: PATH DIFFERENCE $\triangle d=(n/2)\lambda c$

<TRANSMISSION MIMO SYSTEM: FIRST EMBODIMENT (FIRST EXAMPLE)>

(1) CONFIGURATION (2) PHASE RELATIONSHIP BETWEEN SIGNAL COMPONENT AND ASK CARRIER SIGNAL

<TRANSMISSION MIMO SYSTEM: FIRST EMBODIMENT (SECOND EXAMPLE)>

※CONFIGURATION

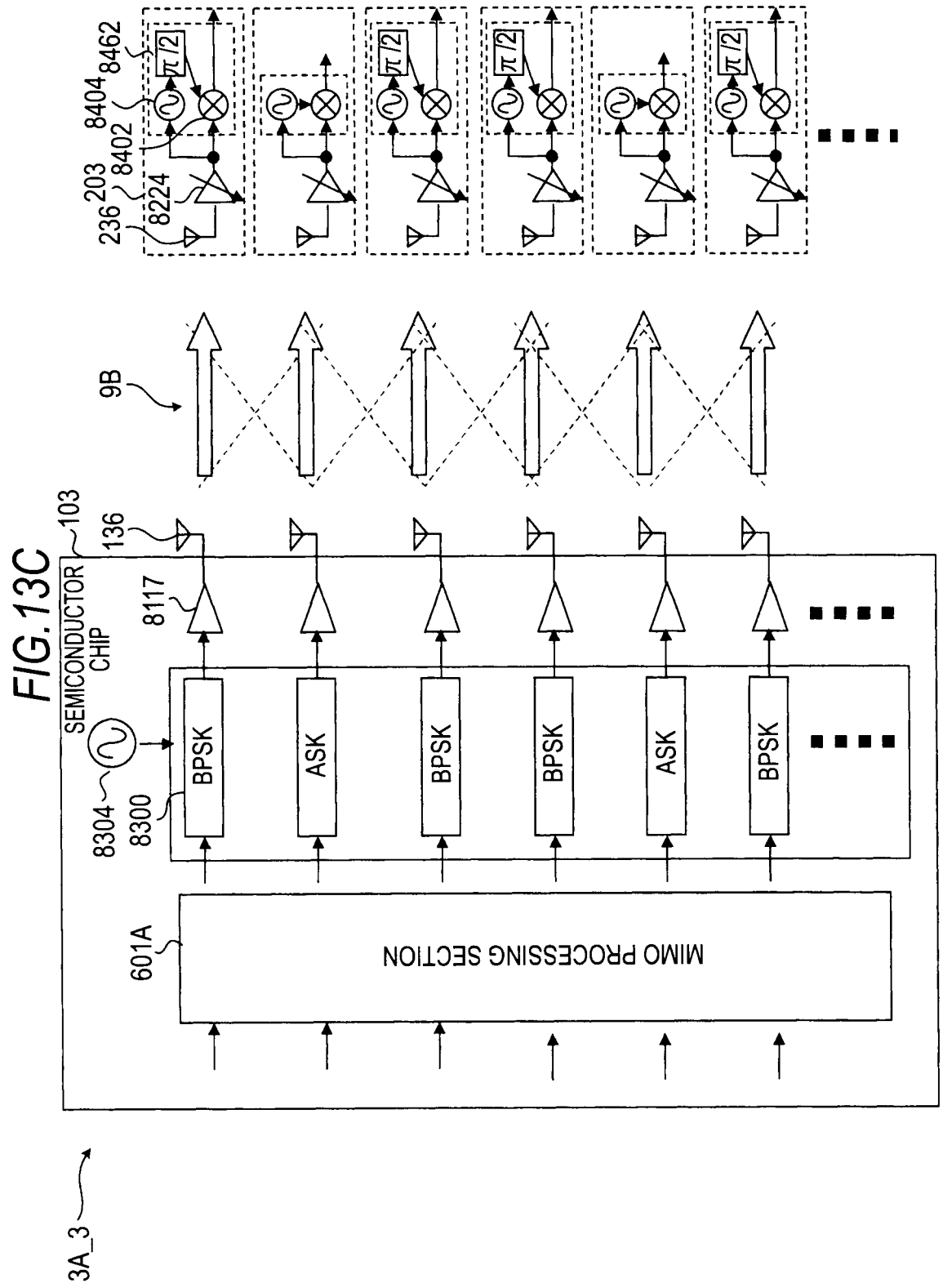

<TRANSMISSION MIMO SYSTEM: SECOND EMBODIMENT (FIRST EXAMPLE)>

(1) CONFIGURATION (2) PHASE RELATIONSHIP BETWEEN SIGNAL COMPONENT AND ASK CARRIER SIGNAL (2-1) WHEN n IS ODD NUMBER (2-2) WHEN n IS EVEN NUMBER

* INVERT SIGN OF DEMODULATION OUTPUT

<TRANSMISSION MIMO SYSTEM: SECOND EMBODIMENT (SECOND EXAMPLE)>

<TRANSMISSION MIMO SYSTEM: THIRD EMBODIMENT (FIRST EXAMPLE)>
(1) CONFIGURATION (2) PHASE RELATIONSHIP BETWEEN SIGNAL COMPONENT AND ASK CARRIER SIGNAL

\* EVEN WHEN n IS ODD NUMBER OR EVEN NUMBER, PHASE OF RECEIVED SIGNAL IS NOT INVERTED (DOES NOT BECOME NEGATIVE)

<TRANSMISSION MIMO SYSTEM: THIRD EMBODIMENT (SECOND EXAMPLE)>
※ CONFIGURATION

<TRANSMISSION MIMO SYSTEM: THIRD EMBODIMENT (FIRST EXAMPLE), FOURTH EMBODIMENT>

<TRANSMISSION MIMO SYSTEM: FOURTH EMBODIMENT>

(1) CONFIGURATION (2) PHASE RELATIONSHIP BETWEEN SIGNAL COMPONENT AND ASK CARRIER SIGNAL

* EVEN WHEN n IS ODD NUMBER OR EVEN NUMBER, PHASE OF RECEIVED SIGNAL IS NOT INVERTED (DOES NOT BECOME NEGATIVE)

RADIO TRANSMISSION SYSTEM, RADIO COMMUNICATION APPARATUS, AND RADIO TRANSMISSION METHOD

BACKGROUND OF THE INVENTION

1. Field of the Invention

The present invention relates to a radio transmission system (also including a radio communication apparatus which is realized in a single housing), a transmission-side radio communication apparatus, and a radio transmission method. In particular, the present invention relates to a mechanism for transmitting a plurality of transmission-target signals by radio using space division multiplex.

2. Description of the Related Art

For example, as a method which realizes high-speed signal transmission between electronic instruments arranged at a comparatively short distance (for example, within several centimeters to ten-odd centimeters) or within an electronic instrument, an LVDS (Low Voltage Differential Signaling) is known. However, recent increases in the capacity and speed of transmission data have led to problems, such as an increase of power consumption, an increase of the effect of signal distortion due to reflection or the like, an increase of unnecessary radiation, and the like. For example, when a signal, such as a video signal (including a captured signal) or a computer image, is transmitted at a high speed (in real time) within the instrument, the LVDS has limitations.

In order to cope with a problem regarding the high speed of transmission data, it is possible to increase the number of wirings or to reduce the transmission speed per signal line through signal parallelization. However, such a countermeasure results in an increase in the number of input/output terminals. As a result, a printed substrate or a cable wiring is complicated, or a semiconductor chip increases in size. Further, high-speed and large-capacity data is routed through wirings, thus so-called electromagnetic interference becomes problematic.

The problems in the LVDS or the method in which the number of wirings increases are due to signal transmission through electrical wirings. Thus, as a method which resolves the problems due to signal transmission through electrical wirings, it is possible to transmit signals by radio without using electrical wirings.

When a plurality of communication sections are provided on the transmission side and the reception side to perform multiplex transmission, it is also possible to apply space division multiplex. However, when space division multiplex is applied, it is necessary to provide a countermeasure against interference between channels. As one method which resolves this problem, it is possible to apply MIMO (Multi-Input Multi-Output) (for example, JP-A-2009-055228, JP-A-2009-049632, and JP-A-2009-033588).

JP-A-2009-055228, JP-A-2009-049632, and JP-A-2009-033588 are intended for radio transmission at a comparatively long distance with respect to radio transmission within an instrument or between instruments, and describe the application of MIMO processing in combination with an OFDM modulation scheme. That is, the MIMO processing described in JP-A-2009-055228, JP-A-2009-049632, and JP-A-2009-033588 depends on the OFDM modulation scheme.

SUMMARY OF THE INVENTION

However, taking into consideration radio transmission at a comparatively short distance within an instrument or between instruments, it is not necessary to use the MIMO processing along with the OFDM modulation scheme. Further, if the wavelength is shortened, the effect of directionality of an antenna is also obtained, thus it is not necessary to use the MIMO processing along with the OFDM modulation scheme.

Thus, it is desirable to provide a mechanism for MIMO processing suitable for radio signal transmission between instruments or within an instrument.

In a radio transmission system, a radio communication apparatus, and a radio transmission method of an embodiment of the invention, first, a transmitting communication section and a receiving communication section are arranged in a housing of an electronic instrument.

The transmitting communication section frequency-converts a transmission-target signal with a carrier signal for modulation to create a modulated signal and sends the created modulated signal to a radio signal transmission path. The receiving communication section demodulates the modulated signal received through the radio signal transmission path to acquire an output signal corresponding to the transmission-target signal. Preferably, a carrier signal for demodulation synchronized with the carrier signal for modulation is created with a signal received through the radio signal transmission path as an injection signal, and the modulated signal received through the radio signal transmission path is frequency-converted with the carrier signal for demodulation to acquire the output signal corresponding to the transmission-target signal.

In summary, a radio signal transmission path is configured between a transmission-side communication section arranged in the housing of the electronic instrument and a reception-side communication section arranged in the housing of the same electronic instrument (the same as or different from the electronic instrument in which the transmission-side communication section is arranged), such that signal transmission is performed between both communication sections by radio.

In the mechanism according to the embodiment of the invention, space division multiplex is applied in radio transmission within an instrument or between instruments. For this reason, a transmission-side radio communication apparatus is provided with a plurality of transmitting antennas, and a corresponding reception-side radio communication apparatus is also provided with a plurality of receiving antennas. The transmitting antennas and the receiving antennas are in one-to-one correspondence. It is configured such that a radio signal from the transmitting antenna of one (one: one antenna pair) of a plurality of antenna pairs reaches the receiving antenna of the one antenna pair as a desired wave directly, and a radio signal from the transmitting antenna of another (another: not limited to one pair) antenna pair different from the one antenna pair reaches the receiving antenna of the one antenna pair as an unnecessary wave directly. That is, a desired wave from a transmitting antenna is received as a direct wave between antennas which correspond to each other, and an unnecessary wave from a transmitting antenna is received as a direct wave between antennas which do not correspond to each other.

The transmission-side radio communication apparatus is provided with a transfer characteristic correction section and a modulation functional section. The transfer characteristic correction section performs correction operation processing (MIMO processing) based on the transfer characteristic of a transmission space between the transmitting antenna and the receiving antenna for each of a plurality of transmission-target signals corresponding to the plurality of transmitting antennas, and supplies a signal after the correction operation to the modulation functional section. The modulation functional section modulates the corrected signal after having been corrected by the transfer characteristic correction section using the carrier signal and transmits the modulated signal from the corresponding transmitting antenna. Preferably, the carrier signals having the same carrier frequency are modulated.

That is, the mechanism according to the embodiment of the invention has a feature in that, after the MIMO processing is performed for a plurality of transmission-target signals in a baseband area, modulation processing is performed on the basis of the same carrier signal. The transfer characteristic of the transmission space has a feature in that both the desired wave and the unnecessary wave are handled to be defined as a direct wave which is emitted from the transmitting antenna and reaches the receiving antenna directly, and during the MIMO processing on the transmission side in the transfer characteristic correction section, an inverse matrix operation based on the matrix defining the transfer characteristic is performed.

The antenna arrangement is determined so as to be advantageous for the MIMO processing. As viewpoints in relation to this, there are a concept which prescribes a path difference, which is the difference between the inter-antenna distance of the desired wave and the inter-antenna distance of the unnecessary wave, a concept which prescribes the matrix elements defining a transfer function, a concept which performs regulation using MIMO processing and modulation processing on the transmission side in the transfer characteristic correction section, and the like.

In prescribing the path difference, when the wavelength of the carrier signal is $\lambda c$, and the phase characteristics depending on the directionality of the antennas are zero, as a first condition, the path difference is set to $(n/2+\frac{1}{4})\lambda c$, and as a second condition, the path difference is set to $(n/2)\lambda c$. When there are the phase characteristics depending on the directionality of the antennas, correction is made by the phase characteristics depending on the radiation angle of the desired wave or the unnecessary wave from the transmitting antenna and the incidence angle of the desired wave or the unnecessary wave on the corresponding receiving antenna.

If the above-described first condition is substituted with the concept which prescribes the matrix elements, it is said that the path difference is set such that each element of the desired wave of a matrix prescribing the transfer characteristic is expressed only by a real term, and each element of the unnecessary wave is expressed only by an imaginary term. If the above-described first condition is substituted with the concept which performs regulation through MIMO processing and modulation processing on the transmission side in the transfer characteristic correction section, this means that, with regard to each of a plurality of transmission-target signals, only a real term-related correction operation is performed for the desired signal (a transmission-target signal of the own channel), and only an imaginary term-related correction operation is performed for the unnecessary signal (a transmission-target signal of another channel). Then, quadrature modulation is performed for corrected signals in pairs by the modulation functional section.

If the above-described second condition is substituted with the concept which prescribes the matrix elements, it is said that the path difference is set such that each element of the desired wave of the matrix prescribing the transfer characteristic is expressed only by a real term, and each element of the unnecessary wave is also expressed only by a real term. If the above-described second condition is substituted with the concept which performs regulation through MIMO processing and modulation processing on the transmission side in the transfer characteristic correction section, this means that, with regard to each of a plurality of transmission-target signals, only a real term-related correction operation is performed for the desired signal (a transmission-target signal of the own channel), and only a real term-related correction operation is performed for the unnecessary signal (a transmission-target signal of another channel). Then, corrected signals are added, and modulation processing is performed by the modulation functional section.

When demodulation processing on the reception side is taken into consideration, it is preferable to use one of the following four modes. A first method applies the above-described first condition, and also uses a scheme of modulating only amplitude for part of the systems and a scheme other than the scheme of modulating only amplitude for the remaining systems. The reception side may use a method which applies an injection locking scheme for each transmission-target signal, or a method which applies an injection locking scheme only for the systems using the scheme of modulating only amplitude, and demodulation processing is performed for the remaining systems on the basis of the carrier signal for demodulation created by the systems using the injection locking scheme.

A second method applies the above-described second condition, and also uses the scheme of modulating only amplitude for part of the systems and the scheme other than the scheme of modulating only amplitude for the remaining systems. The reception side may use a method which applies the injection locking scheme for each transmission-target signal, or a method which applies the injection locking scheme only for the systems using the scheme of modulating only amplitude, and demodulation processing is performed for the remaining systems on the basis of the carrier signal for demodulation created by the systems using the injection locking scheme.

A third method applies the above-described second condition, and also uses the scheme of modulating only amplitude for all systems. The reception side may use a method which applies the injection locking scheme for each transmission-target signal, or a method which applies the injection locking scheme with a certain number of systems (within a range smaller than all systems: the optimum is only one system), and demodulation processing is performed for the remaining systems on the basis of the carrier signal for demodulation created by the systems using the injection locking scheme.

A fourth method applies the above-described second condition, and also uses the method of modulating only amplitude for all systems. The reception side performs demodulation through envelope detection or square-law detection without using the injection locking scheme.

Hence, when the injection locking scheme is used, the reception side creates the carrier signal for demodulation synchronized with the carrier signal for modulation with a received signal as an injection signal, and performs frequency conversion (down-conversion) using the carrier signal for demodulation.

Although only the modulated signal obtained through frequency conversion (up-conversion) on the transmission side is sent, and the modulated signal is received and used as the injection signal for creating the carrier signal for demodulation, it is preferable that a reference carrier signal used in modulation is also sent along with the modulated signal, and the received reference carrier signal is injection-locked on the reception side.

In the mechanism using the injection locking scheme, the carrier signal for modulation which is used in up-conversion is reliably in synchronization with the carrier signal for demodulation which is used in down-conversion. Thus, even when signal transmission is performed by radio in a state where the degree of stability of the frequency of the carrier signal for demodulation is relaxed, it is possible to appropriately demodulate the transmission-target signal. In the case of down-conversion, synchronous detection is easily applied, and synchronous detection is expanded to quadrature detection and used, such that phase modulation or frequency modulation as well as amplitude modulation can be applied. This means, for example, that the modulated signal is orthogonalized to increase the data transmission rate.

According to the embodiment of the invention, a mechanism is realized in which MIMO processing is applied on the transmission side without using an OFDM modulation scheme in combination and which is suitable for transmission of a radio signal between instruments or within an instrument. The MIMO processing is applied on the transmission side, reducing an antenna interval.

Both of the desired wave and the unnecessary wave are handled as direct waves, thus it is possible to manage the path difference regarding the desired wave and the unnecessary wave, and to determine the antenna arrangement so as to be advantageous for the MIMO processing on the transmission side. As a result, it is possible to reduce the operation scale of the MIMO processing compared to a case where the invention is not applied.

If the frequency of the carrier signal is in common, the effect of the carrier frequency is reliably identical in each channel, thus it is possible to reliably and efficiently perform the MIMO processing in the baseband area, which is preferable. In addition, it is possible to reduce the circuit scale of modulation or demodulation compared to a case where each channel has a different carrier frequency.

BRIEF DESCRIPTION OF THE DRAWINGS

FIG. 2B is an image view showing the outline of the structure of a millimeter-wave signal transmission path for application of "space division multiplex".

FIG. 9B is a diagram illustrating the basis of an operation method of MIMO processing for application on a transmission side.

FIG. 13C is a diagram illustrating a transmission MIMO system of the first embodiment (third example).

DETAILED DESCRIPTION OF THE RELATED ART

Figure 1A:
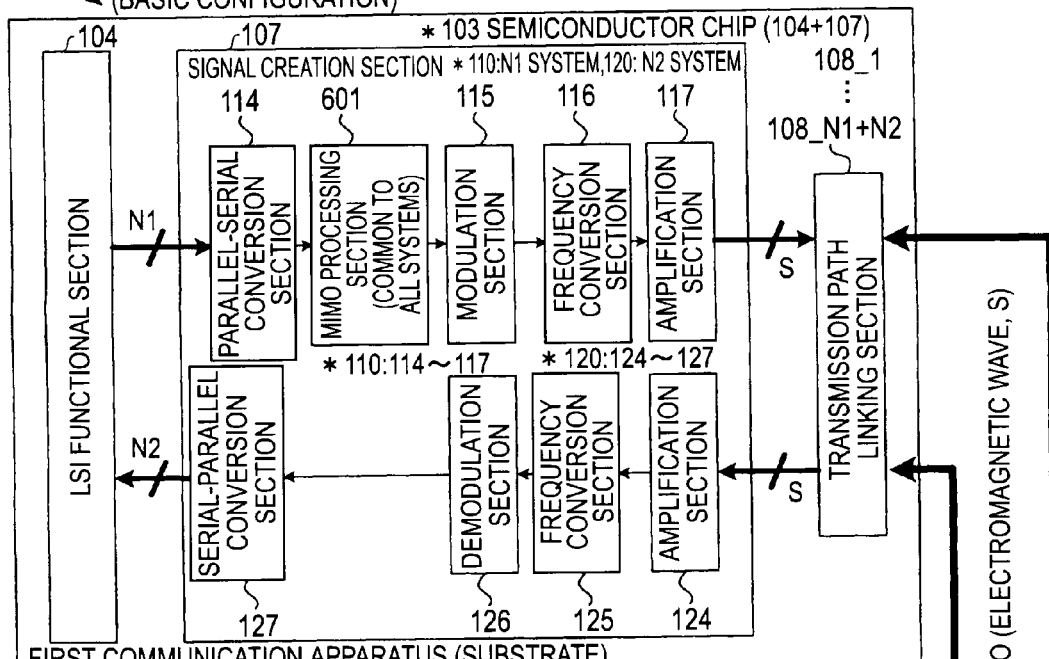
FIG. 1A is a diagram illustrating a signal interface of a radio transmission system of this embodiment from a viewpoint of functional configuration.
Figure 1A:
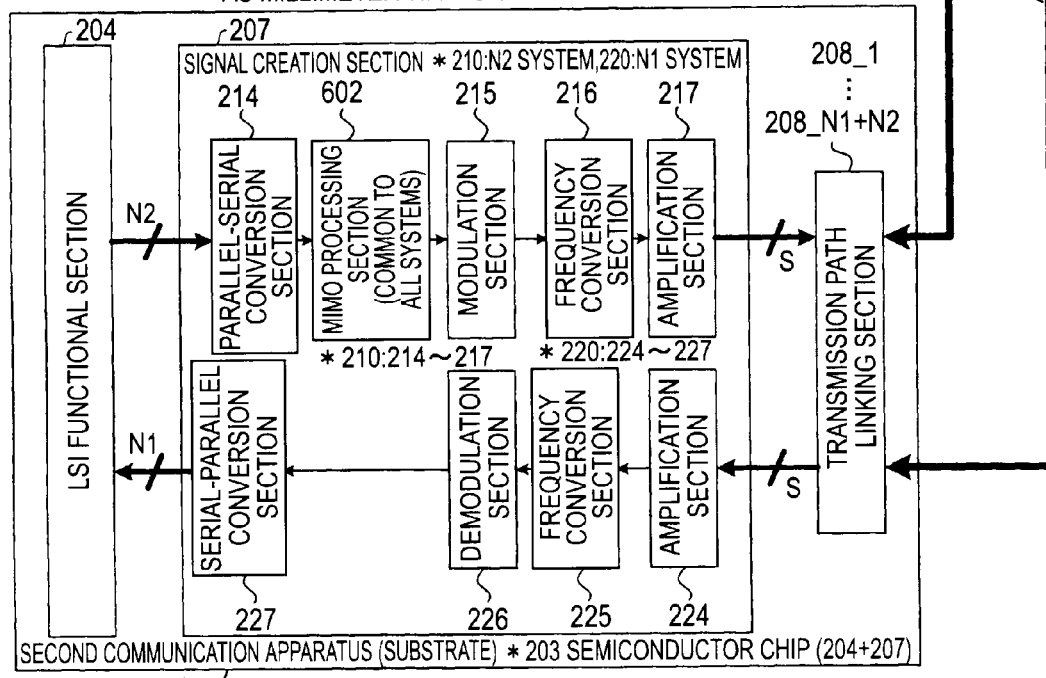

Hereinafter, embodiments of the invention will be described in detail with reference to the drawings. When distinction is made between the functional elements of the different embodiments, such elements will be denoted by reference numerals, such as capital letters A, B, C, . . . . When no particular distinction is made between the functional elements for description, such reference numerals will be omitted. The same is applied to the drawings.

Description will be provided in the following sequence.

1. Communication Processing System: Basis (Space division Multiplex)
2. Application Method of Space division Multiplex
3. Modulation and Demodulation: First Example (Application of Square-Law Detection/Envelope Detection)
4. Modulation and Demodulation: Second Example (Application of Injection Locking Scheme)
5. Relationship between Multichanneling and Space division Multiplex
6. Relationship between Multichanneling and Injection Locking
7. Relationship between Multichanneling and Necessary Transmission Power
8. Outline of MIMO Processing for Application on Transmission Side Operation Processing, Relationship with Carrier Frequency, Relationship with Antenna Arrangement, Relationship with Directionality, Application to Three or More Channels, Application to Three-Dimensional Arrangement, Digital Processing
9. Transmission MIMO System: First Embodiment
10. Transmission MIMO System: Second Embodiment
11. Transmission MIMO System: Third Embodiment
12. Transmission MIMO System: Fourth Embodiment First, in describing a radio transmission system of this embodiment, for ease of understanding the mechanism, the basic overall configuration will be first described, and then the details of MIMO processing for application on a transmission side as a feature of a radio transmission system of this embodiment will be described.

<Communication Processing System: Basis>

Figure 1B:
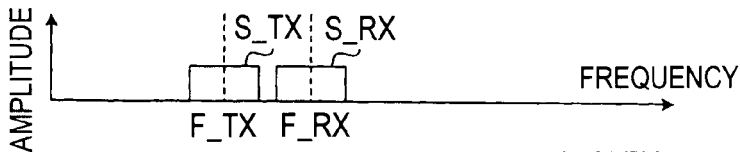
FIG. 1B is a diagram illustrating signal multiplex.
Figure 1B:
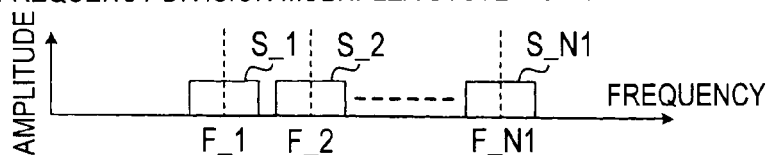
Figure 1B:
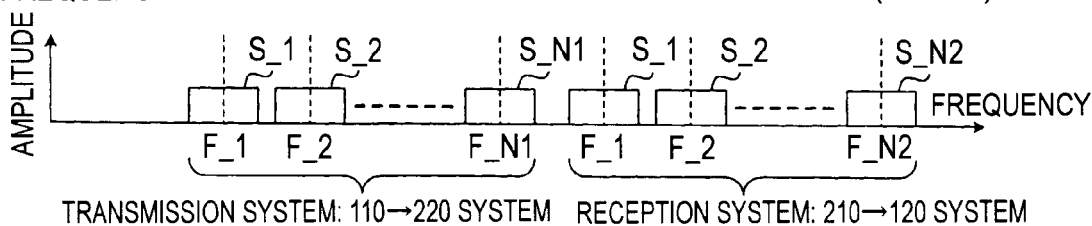
Figure 1B:
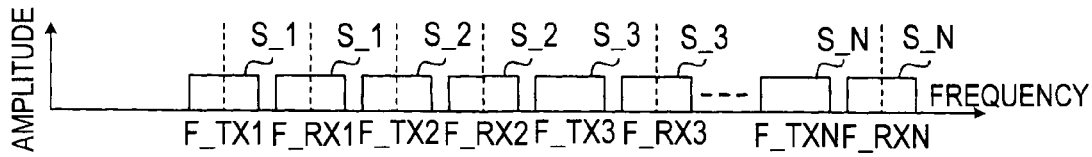
Figure 1B:
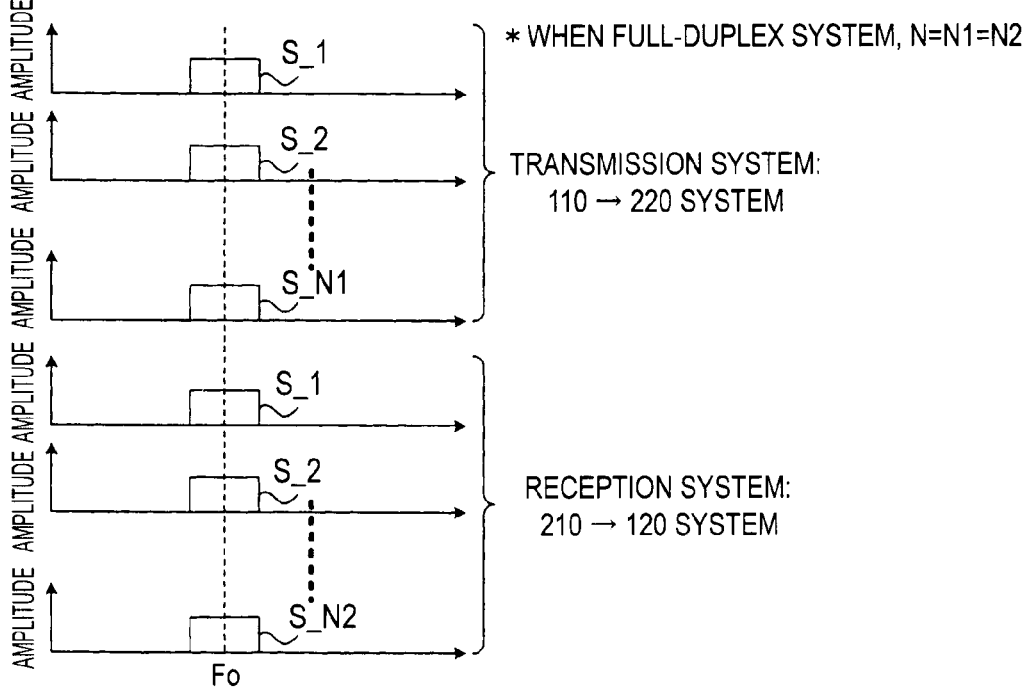

FIGS. 1A and 1B are diagrams illustrating the radio transmission system of this embodiment. FIG. 1A is a diagram illustrating a signal interface of a radio transmission system 1Y of this embodiment from a viewpoint of functional configuration. FIG. 1B is a diagram illustrating signal multiplex.

Although a case will be described where a carrier frequency which is used in the radio transmission system of this embodiment is in a millimeter-wave band, the mechanism of this embodiment is not limited to the millimeter-wave band, and may be applied to a case where a carrier frequency having a shorter wavelength, for example, a carrier frequency in a submillimeter-wave band is used. For example, the radio transmission system of this embodiment is used in a digital recording/reproducing apparatus, a terrestrial television receiver, a mobile phone, a game machine, a computer, and the like.

[Functional Configuration]

As shown in FIG. 1A, the radio transmission system 1Y is configured such that a first communication apparatus 100Y which is an example of a first radio instrument and a second communication apparatus 200Y which is an example of a second radio instrument are linked through a millimeter-wave signal transmission path 9 which is an example of a radio signal transmission path, and perform signal transmission in a millimeter-wave band. The millimeter-wave signal transmission path 9 is an example of a radio signal transmission path. A transmission-target signal is subjected to frequency conversion suitable for broadband transmission and then transmitted.

The radio transmission system 1Y of this embodiment has a feature in that a plurality of sets of transmission path linking sections 108 and 208 are used to provide the millimeter-wave signal transmission paths 9 in multiple systems. It is assumed that the millimeter-wave signal transmission paths 9 in the multiple systems are provided with no spatial interference (with no effect of interference) and can perform communication with the same frequency or at the same time at the time of signal transmission in multiple systems.

"No spatial interference" means that signals in multiple systems can be transmitted separately. Such a mechanism is called "space division multiplex". For multichanneling of a transmission channel, when space division multiplex is not applied, frequency division multiplex is applied such that the channels have to use different carrier frequencies. Meanwhile, if space division multiplex is applied, transmission can be performed with the same carrier frequency with no effect of interference.

With regard to "space division multiplex", it should suffice that the millimeter-wave signal transmission paths 9 in the multiple systems are formed in a three-dimensional space where millimeter-wave signals (electromagnetic waves) can be transmitted, and it is not limited to the configuration where the millimeter-wave signal transmission paths 9 in the multiple systems are formed in a free space. For example, the three-dimensional space where millimeter-wave signals (electromagnetic wave) can be transmitted is formed of a dielectric material (tangible object), the millimeter-wave signal transmission paths 9 in the multiple systems may be formed in the dielectric material. Each of the millimeter-wave signal transmission paths 9 in the multiple systems is not limited to the free space, and may have a form of a dielectric transmission path, a hollow waveguide, or the like.

A first communication section (first millimeter wave transmission apparatus) and a second communication section (second millimeter wave transmission apparatus) form a radio transmission apparatus (system). Between the first communication section and the second communication section which are arranged at a comparatively short distance, a transmission-target signal is converted to a millimeter-wave signal and then the millimeter-wave signal is transmitted through the millimeter-wave signal transmission path. In this embodiment, the term "radio transmission" means that a transmission-target signal is transmitted by radio (in this example, a millimeter wave), not through an electrical wiring.

The term "comparatively short distance" means that the distance is shorter than the distance between communication apparatuses in the field (outdoors) for use in broadcasting or general radio communication, and is of an extent such that a transmission range can be substantially specified as a closed space. The term "closed space" means a space where there is a small amount of electric waves leaking from the space toward the outside and there is a small amount of electric waves coming to (entering) the space from the outside. Usually, the entire closed space is surrounded by a housing (case) which provides shielding from electric waves.

For example, there are communication between the substrates within the housing of a single electronic instrument, communication between the chips on the same substrate, and communication between instruments when a plurality of electronic instruments are combined as a single body, for example, another electronic instrument (another: not limited to one) is mounted in an (one) electronic instrument.

The term "single body" usually means that both electronic instruments are completely in contact with each other through mounting. As described above, it should suffice that the transmission range between both electronic instruments can be substantially specified as the closed space. The term "single body" includes a case where, when both electronic instruments are arranged at given positions somewhat away from each other (comparatively short distance: for example, within several centimeters to ten-odd centimeters), both electronic instruments are regarded as a "substantially" single body. It should suffice that there is a small amount of electric waves leaking from the space, which is formed by both electronic instruments and in which electric waves can propagate, toward the outside, and there is a small amount of electric waves coming to (entering) the space from the outside.

Hereinafter, signal transmission within the housing of a single electronic instrument is called in-housing signal transmission, and signal transmission when a plurality of electronic instruments are integrated (hereinafter, also including "substantially integrated") is called inter-instrument signal transmission. In the case of in-housing signal transmission, the radio transmission system of this embodiment is the electronic instrument itself. In the radio transmission system, a transmission-side communication apparatus (communication section: transmitting section) and a reception-side communication apparatus (communication section: receiving section) are accommodated in the same housing, and a radio signal transmission path is formed between the communication sections (transmitting section and receiving section). In the case of inter-instrument signal transmission, the radio transmission system of this embodiment is constructed such that a transmission-side communication apparatus (communication section: transmitting section) and a reception-side communication apparatus (communication section: receiving section) are respectively accommodated in the housings of different electronic instruments, and a radio signal transmission path is formed between the communication sections (transmitting section and receiving section) of both electronic instruments when both electronic instruments are arranged at given positions and combined as a single body.

In each of the communication apparatuses which are provided with the millimeter-wave signal transmission path sandwiched therebetween, a transmitting section and a receiving section are arranged in a pair. Signal transmission between a (one) communication apparatus and another (another: not limited to one) communication apparatus may be unidirectional or bidirectional. For example, when the first communication section is on the transmission side and the second communication section is on the reception side, the transmitting section is arranged in the first communication section, and the receiving section is arranged on the second communication section. When the second communication section is on the transmission side and the first communication section is on the reception side, the transmitting section is arranged in the second communication section, and the receiving section is arranged in the first communication section.

It is assumed that the transmitting section includes, for example, a transmission-side signal creation section which performs signal processing for a transmission-target signal to create a millimeter-wave signal (a signal conversion section which converts the transmission-target electrical signal to a millimeter-wave signal), and a transmission-side signal linking section which links the millimeter-wave signal created by the transmission-side signal creation section to a transmission path (millimeter-wave signal transmission path) through which a millimeter-wave signal is transmitted. Preferably, the transmission-side signal creation section is combined as a single body with a functional section which creates the transmission-target signal.

For example, the transmission-side signal creation section has a modulation circuit, and the modulation circuit modulates the transmission-target signal. The transmission-side signal creation section frequency-converts a signal after having been modulated by the modulation circuit to create the millimeter-wave signal. In principle, it is possible to directly convert the transmission-target signal to the millimeter-wave signal. The transmission-side signal linking section supplies the millimeter-wave signal created by the transmission-side signal creation section to the millimeter-wave signal transmission path.

It is assumed that the receiving section includes, for example, a reception-side signal linking section which receives the millimeter-wave signal transmitted through the millimeter-wave signal transmission path, and a reception-side signal creation section which performs signal processing for the millimeter-wave signal (input signal) received by the reception-side signal linking section to create a normal electrical signal (transmission-target signal) (a signal conversion section which converts the millimeter-wave signal to the transmission-target electrical signal). Preferably, the reception-side signal creation section is combined as a single body with a functional section which receives the transmission-target signal. For example, the reception-side signal creation section has a demodulation circuit. The reception-side signal creation section frequency-converts the millimeter-wave signal to create an output signal, and then the demodulation circuit demodulates the output signal to create the transmission-target signal. In principle, it is possible to directly convert the millimeter-wave signal to the transmission-target signal.

That is, the signal interface is taken such that the transmission-target signal is transmitted as the millimeter-wave signal in a contactless or cableless manner (not transmitted through an electrical wiring). Preferably, at least signal transmission (in particular, a video signal or a high-speed clock signal for which high-speed transmission or large-capacity transmission has to be performed) is performed such that a millimeter-wave signal is transmitted. In summary, although in the related art, signal transmission has been performed through an electric wiring, in this embodiment, signal transmission is performed by the millimeter-wave signal. Signal transmission is performed in the millimeter-wave band, thus it is possible to realize high-speed signal transmission in the order of Gbps, and to easily limit the range of the effect of the millimeter-wave signal. An effect based on this property is also obtained.

The signal linking sections are preferably configured such that the first communication section and the second communication section can transmit the millimeter-wave signal through the millimeter-wave signal transmission path. For example, an antenna structure (antenna linking section) may be provided, or linking may be made with no antenna structure.

"The millimeter-wave signal transmission path through which the millimeter-wave signal is transmitted" may be air (so-called free space), and preferably has a structure in which the millimeter-wave signal is transmitted while the millimeter-wave signal is confined in the transmission path. The active use of this property enables arbitrary determination of the routing of the millimeter-wave signal transmission path, like the electrical wiring.

As the millimeter wave-confinement structure (radio signal-confinement structure), for example, a so-called waveguide is usually taken into consideration, but is not intended to limit the invention. For example, a transmission path (dielectric transmission path or in-millimeter-wave dielectric transmission path) may be used which is formed of a dielectric material capable of transmitting the millimeter-wave signal, or a hollow waveguide may be used in which a transmission path is formed, and a hollow shield material surrounds the transmission path so as to suppress external radiation of the millimeter-wave signal. If a dielectric material or a shield material has flexibility, it becomes possible to route the millimeter-wave signal transmission path.

In the case of air (so-called free space), each signal linking section has an antenna structure, such that the antenna structure enables signal transmission in a space at a short distance. Meanwhile, when a dielectric material is used, an antenna structure may be adopted, but this is not indispensable.

[System Configuration for Application of Space Division Multiplex]

FIG. 1A shows the radio transmission system 1Y of this embodiment. As understood from the basic description of space division multiplex, the radio transmission system 1Y of this embodiment includes the millimeter-wave signal transmission paths 9 in the multiple systems between the first communication apparatus 100Y and the second communication apparatus 200Y.

Description will be provided assuming that multiple signals with _@ (where @ is in a range of 1 to N1) are transmitted from the first communication apparatus 100Y toward the second communication apparatus 200Y, and multiple signals with _@ (where @ is in a range of 1 to N2) are transmitted from the second communication apparatus 200Y toward the first communication apparatus 100Y.

Although the details will be described below, a semiconductor chip 103 is provided with a transmission-side signal creation section 110 and a reception-side signal creation section 120, and a semiconductor chip 203 is provided with a transmission-side signal creation section 210 and a reception-side signal creation section 220. Though conveniently described in the drawings, in order to realize space division multiplex, the transmission-side signal creation section 110 and the reception-side signal creation section 220 are provided in equal number to the N1 systems, and the transmission-side signal creation section 210 and the reception-side signal creation section 120 are provided in equal number to the N2 systems.

In the case of space division multiplex, the same frequency band can be used at the same time. Thus, it is possible to increase the communication speed and to secure the synchronism of bidirectional communication in which signal transmission from the first communication apparatus 100Y toward the second communication apparatus 200Y in equal number to the N1 channels and signal transmission from the second communication apparatus 200Y toward the first communication apparatus 100Y in equal number to the N2 channels can be performed simultaneously. In particular, in the case of millimeter waves, the attenuation effect according to the distance can be expected because of the short wavelength, interference scarcely occurs even with a small offset (when the spatial distance of the transmission channel is small), and it is easy to realize a different propagation channel in accordance with a location.

As shown in FIG. 1A, the radio transmission system 1Y of this embodiment has the transmission path linking sections 108 and 208 including a millimeter wave transmission terminal, a millimeter wave transmission path, an antenna, and the like in equal number to the "N1+N2" systems, and the millimeter-wave signal transmission path 9 in equal number to the "N1+N2" systems. Each section is denoted by a reference numeral "_@" (where @ is in a range of 1 to N1+N2). Thus, it is possible to realize a full-duplex transmission scheme in which millimeter wave transmission is performed separately with respect to transmission and reception.

The functional sections of the radio transmission system 1Y of this embodiment will be first described specifically. Although an example where each functional section is formed in a semiconductor integrated circuit (chip) will be described as the most preferred example, it is not indispensable.

The first communication apparatus 100Y is provided with the semiconductor chip 103 which is communicable in the millimeter-wave band, and the second communication apparatus 200Y is also provided with the semiconductor chip 203 which is communicable in the millimeter-wave band.

A communication-target signal in the millimeter-wave band is regarded as a signal which has to be transmitted at high-speed or with large capacity, and other signals which are sufficiently transmitted even at low speed and with small capacity or signals which are regarded as direct current, such as power, will not be converted to millimeter-wave signals. With regard to the signals (including power) which will not be converted to millimeter-wave signals, the signal connection between the substrates is made with the same mechanism as in the related art. Original transmission-target electrical signals before being converted to millimeter waves are collectively called a baseband signal.

[First Communication Apparatus]

The first communication apparatus 100Y has the semiconductor chip 103 which is communicable in the millimeter-wave band and the transmission path linking section 108 mounted on a substrate 102. The semiconductor chip 103 is a system LSI (Large Scale Integrated Circuit) in which an LSI functional section 104 and a signal creation section 107 (millimeter-wave signal creation section) are combined as a single body. Though not shown, the LSI functional section 104 and the signal creation section 107 may not be combined as a single body. When the LSI functional section 104 and the signal creation section 107 are provided separately, with regard to signal transmission between the LSI functional section 104 and the signal creation section 107, there may be a problem due to signal transmission through an electrical wiring. Thus, the LSI functional section 104 and the signal creation section 107 are preferably combined as a single body. When the LSI functional section 104 and the signal creation section 107 are provided separately, two chips (the LSI functional section 104 and the signal creation section 107) are arranged at a short distance, wiring is preferably provided with a short wire bonding length, reducing an adverse effect.

The signal creation section 107 and the transmission path linking section 108 are configured to have data bidirectionality. Thus, the signal creation section 107 is provided with a transmission-side signal creation section and a reception-side signal creation section. The transmission path linking section 108 may be provided on each of the transmission side and the reception side. Here, it is assumed that the transmission path linking section 108 is used for transmission and reception.

In realizing "bidirectional communication", when the millimeter-wave signal transmission path 9 which is a transmission channel of millimeter waves is provided for single-fiber bidirectional transmission of a single channel (single fiber), a half-duplex scheme which applies time division duplex (TDD), frequency division duplex (FDD), or the like is applied.

However, in the case of time division duplex, transmission and reception are performed separately in a time division manner. For this reason, "the synchronism of bidirectional communication (single-fiber simultaneous bidirectional transmission) is not realized in which signal transmission from the first communication apparatus 100Y toward the second communication apparatus 200Y and signal transmission from the second communication apparatus 200Y toward the first communication apparatus 100Y are performed simultaneously. Single-fiber simultaneous bidirectional transmission is realized through frequency division duplex.

As shown in (1) of FIG. 1B, frequency division duplex uses different frequencies for transmission and reception, thus it is necessary to widen the transmission bandwidth of the millimeter-wave signal transmission path 9. In addition, in realizing multiplex transmission (multichanneling) through frequency division duplex, as shown in (2) of FIG. 1B, it is necessary to perform frequency conversion in the range of different frequency bands F_@ through modulation with different carrier frequencies to create millimeter-wave signals, and to transmit the millimeter-wave signals using different carrier frequencies in the same direction or the reverse direction. In this case, when different frequencies are used for transmission (in the example of the drawing, the system from the transmission-side signal creation section 110 toward the reception-side signal creation section 220) and reception (in the example of the drawing, the system from the transmission-side signal creation section 210 toward the reception-side signal creation section 120), as shown in (3) and (4) of FIG. 1B, it is necessary to further widen the transmission bandwidth.

From this viewpoint, if space division multiplex is applied, as shown in (5) of FIG. 1B, in realizing multiplex transmission (multichanneling) as well as bidirectional communication, the same frequency band can be applied to each channel, thus it is advantageous in that there is no limitation of the transmission bandwidth.

Although the semiconductor chip 103 is mounted directly on the substrate 102, a semiconductor package in which the semiconductor chip 103 is mounted on an interposer substrate and the semiconductor chip 103 is molded with resin (for example, epoxy resin or the like) may be mounted on the substrate 102. That is, the interposer substrate serves as a chip mounting substrate, and the semiconductor chip 103 is provided on the interposer substrate. For the interposer substrate, a sheet member is preferably used which has a relative dielectric constant in a predetermined range (about 2 to 10) and in which, for example, thermally reinforced resin and a copper foil are combined.

The semiconductor chip 103 is connected to the transmission path linking section 108. In the transmission path linking section 108, for example, an antenna structure is applied which includes an antenna linking section, an antenna terminal, a microstrip line, an antenna, and the like. With the application of a technique for forming a chip directly in an antenna, the transmission path linking section 108 can be embedded into the semiconductor chip 103.

The LSI functional section 104 performs main application control of the first communication apparatus 100Y, and includes, for example, a circuit which processes various signals to be transmitted to the other party or a circuit which processes various signals received from the other party.

The signal creation section 107 (electrical signal conversion section) converts a signal from the LSI functional section 104 to a millimeter-wave signal, and performs signal transmission control through the millimeter-wave signal transmission path 9.

Specifically, the signal creation section 107 has the transmission-side signal creation section 110 and the reception-side signal creation section 120. The transmission-side signal creation section 110 and the transmission path linking section 108 form a transmitting section (transmission-side communication section), and the reception-side signal creation section 120 and the transmission path linking section 108 constitute a receiving section (reception-side communication section).

In order to create a millimeter-wave signal through signal processing for an input signal, the transmission-side signal creation section 110 has a parallel-serial conversion section 114, a modulation section 115, a frequency conversion section 116, and an amplification section 117. The modulation section 115 and the frequency conversion section 116 may be collectively of a so-called direct conversion scheme.

In order to create an output signal through signal processing a millimeter-wave electrical signal received by the transmission path linking section 108, the reception-side signal creation section 120 has an amplification section 124, a frequency conversion section 125, a demodulation section 126, and a serial-parallel conversion section 127. The frequency conversion section 125 and the demodulation section 126 may be collectively of a direct conversion scheme.

When this configuration is not applied, the parallel-serial conversion section 114 and the serial-parallel conversion section 127 are provided in the case of a parallel interface specification which uses multiple signals for parallel transmission, but are not provided in the case of a serial interface specification.

The parallel-serial conversion section 114 converts a parallel signal to a serial data signal and supplies the serial data signal to the modulation section 115. The modulation section 115 modulates a transmission-target signal and supplies a modulated signal to the frequency conversion section 116. As the modulation section 115, any device may be used insofar as the device modulates at least one of amplitude, frequency, and phase with the transmission-target signal, and a scheme according to an arbitrary combination may be used.

In the case of an analog modulation scheme, for example, there are amplitude modulation (AM) and vector modulation. As vector modulation, there are frequency modulation (FM) and phase modulation (PM). In the case of a digital modulation scheme, for example, there are amplitude shift keying (ASK), frequency shift keying (FSK), phase shift keying (PSK), and amplitude phase shift keying (APSK) in which amplitude and phase are modulated. As amplitude phase modulation, quadrature amplitude modulation (QAM) is representative.

The frequency conversion section 116 frequency-converts a transmission-target signal after having been modulated by the modulation section 115 to crate a millimeter-wave electrical signal, and supplies the millimeter-wave electrical signal to the amplification section 117. The millimeter-wave electrical signal refers to an electrical signal having a frequency of about 30 GHz to 300 GHz. The reason why the term "about" is used is that the frequency is of an extent such that the effect of millimeter-wave communication is obtained, the lower limit is not limited to 30 GHz, and the upper limit is not limited to 300 GHz.

As the frequency conversion section 116, various kinds of circuit configuration may be used. For example, configuration may be made in which a frequency mixing circuit (mixer circuit) and a local oscillation circuit are provided. The local oscillation circuit creates a carrier wave (carrier signal, reference carrier wave) for modulation. The frequency mixing circuit multiplies (modulates) a carrier wave in a millimeter-wave band generated by the local oscillation circuit with a signal from the parallel-serial conversion section 114 to create a modulated signal in the millimeter-wave band and supplies the modulated signal to the amplification section 117.

The amplification section 117 amplifies the millimeter-wave electrical signal after frequency conversion and supplies an amplified signal to the transmission path linking section 108. The amplification section 117 is connected to the bidirectional transmission path linking section 108 through an antenna terminal (not shown).

The transmission path linking section 108 transmits the millimeter-wave signal created by the transmission-side signal creation section 110 to the millimeter-wave signal transmission path 9, receives the millimeter-wave signal from the millimeter-wave signal transmission path 9, and outputs the millimeter-wave signal to the reception-side signal creation section 120.

The transmission path linking section 108 is constituted by an antenna linking section. The antenna linking section constitutes an example or a part of the transmission path linking section 108 (signal linking section). In a narrow sense, the antenna linking section refers to a portion where an electronic circuit in the semiconductor chip and an antenna arranged inside or outside the chip are linked. In a broad sense, the antenna linking section refers to a portion where the semiconductor chip and the millimeter-wave signal transmission path 9 are signally linked. For example, the antenna linking section includes at least an antenna structure. When transmission and reception are performed through time division multiplex, an antenna switching section (antenna duplexer) is provided in the transmission path linking section 108.

The antenna structure refers to a structure in the linking section with the millimeter-wave signal transmission path 9. Any antenna structure may be used insofar as the millimeter-wave electrical signal is linked to the millimeter-wave signal transmission path 9. The antenna structure does not mean an antenna only. For example, the antenna structure includes an antenna terminal, a microstrip line, and an antenna. When the antenna switching section is formed in the same chip, an antenna terminal and a microstrip line, excluding an antenna switching section, constitute the transmission path linking section 108.

The transmission-side antenna radiates an electromagnetic wave based on the millimeter-wave signal to the millimeter-wave signal transmission path 9. The reception-side antenna receives an electromagnetic wave based on the millimeter-wave signal from the millimeter-wave signal transmission path 9. The microstrip line connects the antenna terminal and the antenna, transmits the transmission-side millimeter-wave signal from the antenna terminal to the antenna, and transmits the reception-side millimeter-wave signal from the antenna to the antenna terminal.

The antenna switching section is used when the antenna is used for transmission and reception. For example, when the millimeter-wave signal is transmitted to the second communication apparatus 200Y which is the other party, the antenna switching section connects the antenna to the transmission-side signal creation section 110. When the millimeter-wave signal is received from the second communication apparatus 200Y which is the other party, the antenna switching section connects the antenna to the reception-side signal creation section 120. The antenna switching section is provided on the substrate 102 separately from the semiconductor chip 103, but the invention is not limited thereto. The antenna switching section may be provided in the semiconductor chip 103. When the antennas are provided separately for transmission and reception, the antenna switching section may not be provided.

The reception-side signal creation section 120 is connected to the transmission path linking section 108. In order to create an output signal through signal processing for the millimeter-wave electrical signal received by the transmission path linking section 108, the reception-side signal creation section 120 has an amplification section 124, a frequency conversion section 125, a demodulation section 126, a serial-parallel conversion section 127, and a unification processing section 128. The frequency conversion section 125 and the demodulation section 126 may be collectively of a so-called direct conversion scheme.

The reception-side amplification section 124 is connected to the transmission path linking section 108 to amplify the millimeter-wave electrical signal after having been received by the antenna and to supply an amplified signal to the frequency conversion section 125. The frequency conversion section 125 frequency-converts the millimeter-wave electrical signal after amplification and supplies a signal after frequency conversion to the demodulation section 126. The demodulation section 126 demodulates the signal after frequency conversion to acquire a baseband signal and supplies the baseband signal to the serial-parallel conversion section 127.

The serial-parallel conversion section 127 converts serial received data to parallel output data and supplies parallel output data to the LSI functional section 104.

If the semiconductor chip 103 is constituted as described above, an input signal is subjected to parallel-serial conversion and transmitted to the semiconductor chip 203, and a received signal from the semiconductor chip 203 is subjected to serial-parallel conversion. Thus, the number of millimeter-wave conversion-target signals is reduced.

When original signal transmission between the first communication apparatus 100Y and the second communication apparatus 200Y is of a serial format, the parallel-serial conversion section 114 and the serial-parallel conversion section 127 may not be provided.

The radio transmission system 1Y of this embodiment has a feature in that, in the first communication apparatus 100Y, a MIMO processing section 601 which is shared by all the N1 systems is provided in the transmission-side signal creation section 110 between the parallel-serial conversion section 114 and the modulation section 115. Similarly, in the transmission-side signal creation section 210, a MIMO processing section 602 which is shared by all the N2 systems is provided in the second communication apparatus 200Y between the parallel-serial conversion section 214 and the modulation section 215. The details of the MIMO processing sections 601 and 602 will be described below.

Although the basic configuration has been described, this is just an example. A form where the transmission-side signal creation section 110 and the reception-side signal creation section 120, and the transmission-side signal creation section 210 and the reception-side signal creation section 220 are respectively accommodated in the semiconductor chips 103 and 203 is not limited to that shown in the drawing. For example, a system may be constituted using the semiconductor chip 103 for only the signal creation section 107 in which the transmission-side signal creation section 110 and the reception-side signal creation section 120 are accommodated by one system and the semiconductor chip for only the signal creation section 207 in which the transmission-side signal creation section 210 and the reception-side signal creation section 220 are accommodated by one system. A system may be constituted in which the transmission-side signal creation section 110 and the reception-side signal creation section 120, and the transmission-side signal creation section 210 and the reception-side signal creation section 220 are respectively accommodated in the semiconductor chips 103 and 203. A system may be constituted such that N1=N2=N in accordance with these modifications.

The functional sections which are accommodated in the semiconductor chips 103 and 203 do not have to be provided in the first communication apparatus 100Y and the second communication apparatus 200Y in a pair, and an arbitrary combination may be used. For example, on the first communication apparatus 100Y, a form is used in which the transmission-side N1 systems and the reception-side N2 systems are accommodated in one chip. On the second communication apparatus 200Y, the transmission-side signal creation section 210 and the reception-side signal creation section 220 may be accommodated in different semiconductor chips 203.

In this embodiment, the MIMO processing section 601 is provided which is shared by all the systems between the parallel-serial conversion section 114 and the modulation section 115 for each system. The MIMO processing section 602 is provided which is shared by all the systems between the parallel-serial conversion section 214 and the modulation section 215 for each system. With regard to the transmission system, it is appropriate to use a single chip for the N1 systems or the N2 systems. Although with regard to the transmission system, the use of a chip for each system is not excluded, in this case, an out-of-chip wiring has to be provided between a chip of the transmission system for each system and a chip in which the MIMO processing section 601 or 602 is accommodated (may be accommodated in one chip of the transmission system) such that the MIMO processing section 601 or 602 is interposed between the parallel-serial conversion section 114 and the modulation section 115 or between the parallel-serial conversion section 214 and the modulation section 215.

Meanwhile, with regard to the reception system, there is no such limitation, thus a single chip may be used for a plurality of systems or a chip may be used for each system without any problems.

The carrier frequencies of the respective systems may be identical or different. For example, in the case of a dielectric transmission path or a hollow waveguide, a millimeter wave is confined, preventing millimeter-wave interference, and there is no problem even with the same frequency. In the case of a free-space transmission path, if the free-space transmission paths are away from each other to some extent, there is no problem even at the same carrier frequency. Meanwhile, if the free-space transmission paths are at a short distance, different carrier frequencies may be used. In order to effectively perform MIMO processing on the transmission side or to reduce the circuit scale of the demodulation functional section, the carrier frequency is preferably in common regardless of the form of the millimeter-wave signal transmission path 9 (even in the free-space transmission path).

For example, in realizing bidirectional communication, in addition to space division multiplex, it is possible to use a scheme in which time division multiplex is performed, frequency division multiplex, or the like. As a scheme in which a millimeter-wave signal transmission path 9 in a single system is provided to realize data transmission and reception, either a half-duplex scheme in which transmission and reception are switched through time division multiplex, or a full-duplex scheme in which transmission and reception are performed simultaneously through frequency division multiplex is used.

However, in the case of time division multiplex, there is a problem in that transmission and reception are unable to be performed simultaneously. As shown in (1) to (3) of FIG. 1B, in the case of frequency division multiplex, there is a problem in that it is necessary to widen the bandwidth of the millimeter-wave signal transmission path 9.

In contrast, in the radio transmission system 1Y of this embodiment to which space division multiplex is applied, the same carrier frequency can be set in a plurality of signal transmission systems (a plurality of channels), and it is easy to reuse the carrier frequency (to use the same frequency in a plurality of channels). It is possible to realize signal transmission and reception simultaneously without widening the bandwidth of the millimeter-wave signal transmission path 9. If the same frequency band is used at the same time with a plurality of transmission channels in the same direction, it is possible to increase the communication speed.

When the millimeter-wave signal transmission path 9 has N systems with respect to N (N=N1=N2) baseband signals, for bidirectional transmission and reception, time division multiplex or frequency division multiplex has to be applied to transmission and reception. In contrast, when space division multiplex is applied, the millimeter-wave signal transmission path 9 having 2N systems is used, with regard to bidirectional transmission and reception, transmission can be performed using the millimeter-wave signal transmission path 9 having different systems (separate transmission paths are used). That is, when there are N signals for transmission and reception as a communication target in the millimeter-wave band, even when time division multiplex, frequency division multiplex, or code division multiplex is not performed, the signals can be transmitted through the millimeter-wave signal transmission path 9 having 2N systems.

[Second Communication Apparatus]

The second communication apparatus 200Y includes the same functional configuration as the first communication apparatus 100Y. The functional sections are denoted by reference numerals of 200s, and the functional sections which are the same as or similar to those in the first communication apparatus 100Y are denoted by the same reference numerals of 10s and 1s as in the first communication apparatus 100Y. The transmission-side signal creation section 210 and the transmission path linking section 208 constitute a transmitting section, and the reception-side signal creation section 220 and the transmission path linking section 208 constitute a receiving section.

The LSI functional section 204 performs main application control of the second communication apparatus 200Y, and includes, for example, a circuit which processes various signals to be transmitted to the other party or a circuit which processes various signals received from the other party.

[Connection and Working]

A method in which an input signal is frequency-converted and transmitted is generally used in broadcasting or radio communication. For these purposes, a comparatively complex transmitter or receiver is used which is capable of coping with problems regarding α) how far communication can be performed (a problem regarding S/N with respect to thermal noise), β) how reflection or multipath is handled, and γ) how interruption or inference with other channels is suppressed. In contrast, for the signal creation sections 107 and 207 which are used in this configuration, a signal creation section is used which is used in a millimeter-wave band which is a higher frequency band than the use frequency of a complex transmitter or receiver generally used in broadcasting or radio communication, easily reuses the frequency because of the short wavelength λ, and is suitable for communication between many peripheral devices.

In this configuration, unlike a signal interface of the related art using an electrical wiring, as described above, signal transmission is performed in a millimeter-wave band, making it possible to flexibly cope with high-speed and large-capacity. For example, only signals which have to be transmitted at high speed or with large capacity are subjected to communication in the millimeter-wave band. In any system configuration, the communication apparatuses 100Y and 200Y include an interface (connection through a terminal or connector) of the related art using an electrical wiring for low-speed and small-quantity signaling or power supply at a portion thereof.

The signal creation section 107 performs signal processing for an input signal input from the LSI functional section 104 to create a millimeter-wave signal. The signal creation section 107 is connected to the transmission path linking section 108, for example, through a transmission line, such as a microstrip line, a strip line, a coplanar line, a slot line, or the like. The created millimeter-wave signal is supplied to the millimeter-wave signal transmission path 9 through the transmission path linking section 108.

The transmission path linking section 108 has an antenna structure, and has a function for converting the transmitted millimeter-wave signal to an electromagnetic wave and for sending the electromagnetic wave. The transmission path linking section 108 is linked to the millimeter-wave signal transmission path 9. The electromagnetic wave converted by the transmission path linking section 108 is supplied to one end of the millimeter-wave signal transmission path 9. The transmission path linking section 208 of the second communication apparatus 200Y is linked to the other end of the millimeter-wave signal transmission path 9. The millimeter-wave signal transmission path 9 is provided between the transmission path linking section 108 of the first communication apparatus 100Y and the transmission path linking section 208 of the second communication apparatus 200Y, such that the electromagnetic wave in the millimeter-wave band propagates through the millimeter-wave signal transmission path 9.

The transmission path linking section 208 of the second communication apparatus 200Y is linked to the millimeter-wave signal transmission path 9. The transmission path linking section 208 receives the electromagnetic wave transmitted to the other end of the millimeter-wave signal transmission path 9, converts the electromagnetic wave to a millimeter-wave signal, and supplies the millimeter-wave signal to the signal creation section 207 (baseband signal creation section). The signal creation section 207 performs signal processing for the converted millimeter-wave signal to create an output signal (baseband signal) and supplies the output signal to the LSI functional section 204.

Although signal transmission from the first communication apparatus 100Y toward the second communication apparatus 200Y has been described, a case where a signal from the LSI functional section 204 of the second communication apparatus 200Y to the first communication apparatus 100Y may be similarly taken into consideration. Thus, the millimeter-wave signal can be transmitted bidirectionally.

In comparison with the radio transmission system 1Y of the basic configuration, first, a signal transmission system which performs signal transmission through an electrical wiring has the following problems.

i) Although transmission data has to be transmitted with large capacity and at high speed, there is a limitation on the transmission speed and transmission capacity of the electrical wiring.

ii) In order to cope with a problem regarding high-speed of transmission data, it is possible to increase the number of wirings or to reduce the transmission speed per signal line through signal parallelization. However, this countermeasure results in an increase in the number of input/output terminals. As a result, a printed substrate or a cable wiring is complicated, and the physical size of a connector or an electrical interface increases. Further, the shapes of such elements are complicated, reliability is deteriorated, and costs are increased.

iii) With an enormous increase in the amount of information, such as movie video or computer image, the band of the baseband signal is widened, and a noticeable problem regarding EMC (Electromagnetic Compatibility) appears. For example, when an electrical wiring is used, the wiring serves as an antenna, causing an interference of a signal corresponding to the tuning frequency of the antenna. Reflection or resonance due to mismatching of impedance of the wiring causes unnecessary radiation. If there is resonance or reflection, resonance or reflection is easily accompanied by radiation, and a problem regarding EMI (Electromagnetic Interference) becomes serious. In order to cope with such a problem, the configuration of the electronic instrument is complicated.

iv) If there is reflection, in addition to EMC or EMI, a transmission error due to interference between symbols on the reception side or a transmission error due to the jumping-in of interruption is problematic.

In contrast, the radio transmission system 1Y of the basic configuration performs signal transmission with millimeter waves, instead of using an electrical wiring. A signal from the LSI functional section 104 to the LSI functional section 204 is converted to a millimeter-wave signal, and the millimeter-wave signal is transmitted between the transmission path linking sections 108 and 208 through the millimeter-wave signal transmission path 9.

For radio transmission, it is not necessary to pay attention to the wiring shape or the position of the connector, thus there is no limitation on the layout in practice. With regard to the signals which are substituted for signal transmission with millimeter waves, the wiring or terminal can be omitted, overcoming the problem regarding EMC or EMI. In general, in the communication apparatuses 100Y and 200Y, there is no functional section which uses a frequency in a millimeter-wave band, thus it is possible to easily realize a countermeasure against EMC or EMI.

Radio transmission is performed in a state where the first communication apparatus 100Y and the second communication apparatus 200Y are close to each other, and signal transmission is performed between the fixed positions or in accordance with the known positional relationship. Thus, the following advantages are obtained.

1) It is easy to accurately design the propagation channel (waveguide structure) between the transmission side and the reception-side.

2) The dielectric structure of the transmission path linking section sealing the transmission side and the reception side and the propagation channel (the waveguide structure of the millimeter-wave signal transmission path 9) are designed in conjunction with each other, thus satisfactory transmission with high reliability is possible compared with free-space transmission.

3) Unlike general radio communication, it is not necessary to perform control of the controller (in this example, the LSI functional section 104), which manages radio transmission, dynamically, adaptively, and frequently, it is possible to reduce an overhead according to the control compared to general radio communication. As a result, compactness, low power consumption, and high-speed can be achieved.

4) If a radio transmission environment is calibrated at the time of manufacturing or design to grasp an individual variation, transmission is performed with reference to relevant data, allowing high-quality communication.

5) Even when there is reflection, reflection is fixed, thus it is possible to easily eliminate the effect of reflection with a small equalizer on the reception side. The setting of the equalizer can be preset or made under static control, and can be easily realized.

Radio communication is performed in a millimeter-wave band with a short wavelength. Thus, the following advantages are obtained.

a) Millimeter-wave communication takes a wide communication band, thus it is possible to simply increase a data rate.

b) A frequency which is used for transmission can be separated from a frequency of another baseband signal processing, such that frequency interference scarcely occurs between the millimeter wave and the baseband signal.

c) Since the millimeter-wave band has a short wavelength, it is possible to reduce the size of the antenna or waveguide structure in accordance with the wavelength. Further, since distance attenuation is large and diffraction is small, electromagnetic shielding is easily performed.

d) In the case of general radio communication in the field, there is a strict restriction on the degree of stability of the carrier wave so as to prevent interference or the like. In order to realize such a carrier wave having a high degree of stability, an external frequency reference component and a multiplier having a high degree of stability, a PLL (phase-locked loop circuit), or the like is used, causing an increase in the circuit scale. However, a millimeter wave (in particular, when signal transmission between the fixed positions or in accordance with the known positional relationship is also performed) can be easily shielded and suppress leakage to the outside. Further, it is possible to use a carrier wave having a high degree of stability for transmission and to suppress an increase in the circuit scale. When a signal which is transmitted with a carrier wave having a relaxed degree of stability is demodulated by a small circuit on the reception side, it is preferable to use an injection locking scheme (the details will be described below).

Although in this embodiment, a system which performs communication in a millimeter-wave band is illustrated as an example of the radio transmission system, the application range is not limited to the system which performs communication in the millimeter-wave band. It may be possible to apply communication in a frequency band which falls below the millimeter-wave band or in a frequency band which exceeds the millimeter-wave band. For example, a microwave band may be applied. Meanwhile, in the in-housing signal transmission or inter-instrument signal transmission, from a viewpoint of the use of MIMO processing (inverse matrix operation processing), it may be most effective to use a millimeter-wave band, which is not extremely long or short, in the context of the relationship between the size of each of various members and the wavelength.

<Application Method of Space Division Multiplex>

Figure 2A:
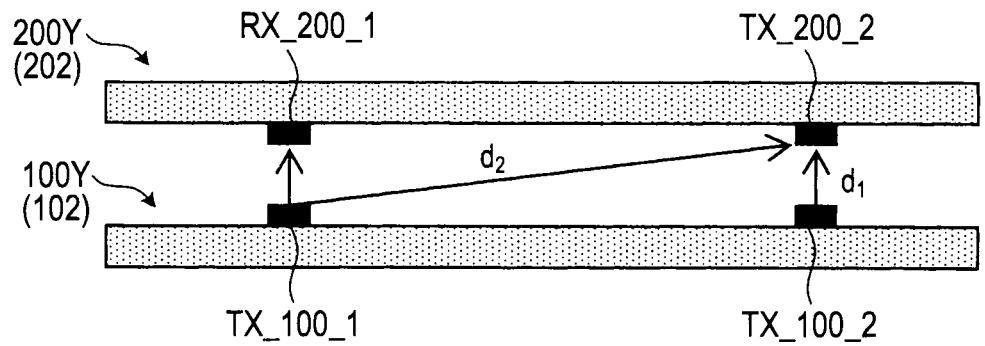
FIG. 2A is a diagram illustrating an appropriate condition (application condition) of "space division multiplex" which is used in this embodiment.
Figure 2A:
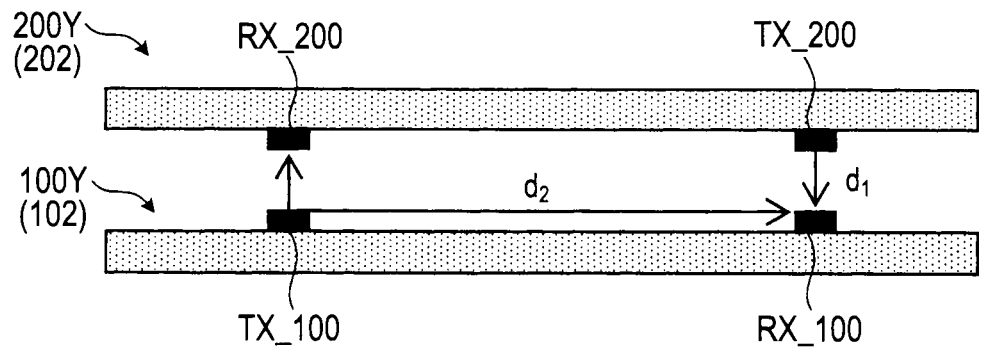

FIG. 2A is a diagram illustrating an appropriate condition (application condition) of "space division multiplex" which is used in this embodiment. FIG. 2B is a diagram (image view) showing the outline of the structure of a millimeter-wave signal transmission path 9 for application of "space division multiplex".

[Appropriate Condition of Space Division Multiplex]

FIG. 2A shows a way of setting an appropriate condition when space division multiplex is applied. For example, as shown in (1) of FIG. 2A, when a distance is d and a wavelength is $\lambda$, a propagation loss L of a free space L can be expressed by "$L[dB]=10 \log_{10}((4\pi d/\lambda)^2) \ldots (A)$".

As shown in FIG. 2A, two types of communication of space division multiplex are taken into consideration. In the drawing, a transmitter is denoted by "TX", and a receiver is denoted by "RX". A reference numeral "_100" denotes the first communication apparatus 100Y, and a reference numeral "_200" denotes the second communication apparatus 200Y. Referring to (2) of FIG. 2A, the first communication apparatus 100Y includes transmitters TX_100_1 and TX_100_2 in two systems, and the second communication apparatus 200Y includes receivers RX_200_1 and RX_200_2 in two systems. That is, signal transmission from the first communication apparatus 100Y toward the second communication apparatus 200Y is performed between the transmitter TX_100_1 and the receiver RX_200_1 and between the transmitter TX_100_2 and the receiver RX_200_2. That is, in this mode, signal transmission from the first communication apparatus 100Y toward the second communication apparatus 200Y is performed through the two systems.

Referring to (3) of FIG. 2A, the first communication apparatus 100Y includes a transmitter TX_100 and a receiver RX_100, and the second communication apparatus 200Y includes a transmitter TX_200 and a receiver RX_200. That is, signal transmission from the first communication apparatus 100Y toward the second communication apparatus 200Y is performed between the transmitter TX_100 and the receiver RX_200, and signal transmission from the second communication apparatus 200Y toward the first communication apparatus 100Y is performed between the transmitter TX_200 and the receiver RX_100. In this mode, different communication channels are used for transmission and reception, such that full-duplex communication is realized in which both parties perform data transmission (TX) and reception (RX) simultaneously.

When an antenna having no directionality is used, the relationship between an inter-antenna distance d1 and a spatial channel interval (specifically, a separation distance between of the free-space transmission paths 9B) d2 necessary for obtaining a necessary DU [dB] (the ratio of a desired wave and an unnecessary wave) becomes "$d2/d1=10^{(DU/20)} \ldots (B)$" by the expression (A).

For example, when DU=20 dB, d2/d1=10, and d2 has to be ten times larger than d1. Usually, since an antenna has directionality to some extent, even in the free-space transmission path 9B, it is possible to set d2 to be shorter.

For example, if the antenna of a communication party is at a short distance, it is possible to suppress transmission power of each antenna low. If transmission power is sufficiently low, and the antenna pairs (also referred to as channels) can be provided at positions sufficiently separated from each other, it is possible to minimize interference between the antenna pairs. In particular, in the case of millimeter-wave communication, since the wavelength of the millimeter wave is short, distance attenuation is large and diffraction is small, making it easy to realize space division multiplex. For example, in the free-space transmission path 9B, the spatial channel interval (the separation distance between the free-space transmission paths 9B) d2 can be set to be smaller than ten times the inter-antenna distance d1.

In the case of a dielectric transmission path or a hollow waveguide having a millimeter wave-confinement structure, the millimeter wave can be confined and then transmitted. Thus, the spatial channel interval (the separation distance between the free-space transmission paths) d2 can be set to be smaller than ten times the inter-antenna distance d1. In particular, in comparison with the free-space transmission path 9B, it is possible to further reduce the channel interval.

[Structure Example of Millimeter-Wave Signal Transmission Path for Space Division Multiplex]

FIG. 2B shows a structure example of a millimeter-wave signal transmission path for space division multiplex. With regard to multichanneling of the transmission channel, when space division multiplex is not applied, for example, it is possible to apply frequency division multiplex and to use a different carrier frequency for each channel. Meanwhile, if space division multiplex is applied, signal transmission can be performed simultaneously even with the same carrier frequency with no effect of interference.

That is, with regard to "space division multiplex", it should suffice that the separate millimeter-wave signal transmission paths 9 in the multiple systems are formed in the three-dimensional space where a millimeter-wave signal (electromagnetic wave) can be transmitted. Space division multiplex is not limited to a case where the free-space transmission paths 9B in multiple systems are constituted in the free space at a distance with no interference (see (1) of FIG. 2B).

For example, as shown in (2) of FIG. 2B, when the free-space transmission paths 9B in the multiple systems are provided in the free space, in order to suppress interference between the transmission channels, a structure (millimeter wave shield body MX) which obstructs electric wave propagation may be arranged between the transmission channels. The millimeter wave shield body MX may be a conductor or not.

Each of the millimeter-wave signal transmission paths 9 in the multiple systems may propagate through the space in the housing as the free-space transmission path 9B. Meanwhile, the invention is not limited to the free space, and a millimeter wave-confinement structure may be used. The millimeter wave-confinement structure is preferably a waveguide structure, such as a waveguide, a transmission line, a dielectric line, or an in-dielectric, such that an electromagnetic wave in a millimeter-wave band is efficiently transmitted.

For example, as shown in (3) of FIG. 2B, a dielectric transmission path 9A may be used which is formed of a dielectric material having a relative dielectric constant in a predetermined range and a dielectric tangent in a predetermined range. For example, a dielectric material is filled in the entire housing, such that the dielectric transmission path 9A, instead of a free-space transmission path, is arranged between the transmission path linking section 108 and the transmission path linking section 208. Further, the antenna of the transmission path linking section 108 and the antenna of the transmission path linking section 208 may be connected by a dielectric line, which is a linear member having a certain line diameter formed of a dielectric material, to form the dielectric transmission path 9A.

The term "predetermined range" means that the relative dielectric constant or dielectric tangent of the dielectric material may be in a range such that the effect of this configuration is obtained, and for this reason, a predefined value may be set in advance. That is, a dielectric material may be used which has a property to an extent such that the effect of this configuration is obtained and can transmit a millimeter wave. Although the predetermined range is not necessarily defined clearly because the predetermined range is not defined according to the dielectric material itself and has a relation with the transmission path length or the frequency of the millimeter wave, as an example, the predetermined range is set as follows.

In order that a millimeter-wave signal is transmitted in the dielectric transmission path 9A at high speed, the dielectric material preferably has the relative dielectric constant of about 2 to 10 (preferably, 3 to 6) and the dielectric tangent of about 0.00001 to 0.01 (preferably, 0.00001 to 0.001). As the dielectric material which satisfies such a condition, for example, acrylic resin, urethane resin, epoxy resin, silicon, polyimide, or cyanoacrylate may be used. Such ranges of the relative dielectric constant and dielectric tangent of the dielectric material are applied to this configuration unless otherwise noted.

When a millimeter wave-confinement structure is made by using the dielectric transmission path 9A, as shown in (4) of FIG. 2B, a shield material (millimeter wave shield member MY) formed of a conductor, such as a metal member, may be provided in the periphery of the dielectric transmission path 9A so as to suppress external radiation of the millimeter-wave signal. The millimeter wave shield member MY is preferably at a fixed potential (for example, ground potential) on the substrate. The millimeter wave shield member MY is formed of a conductor, reliably shielding the millimeter-wave signal compared to a case where a conductor is not used.

As another example of the millimeter wave-confinement structure, a hollow waveguide 9L may be used in which a shield member surrounds the periphery and the inside is hollow. For example, as shown in (5) of FIG. 2B, a structure may be made in which a conductor as an example of a shield member surrounds the periphery and the inside is hollow. The enclosure of the conductor MZ may be provided in one of two substrates arranged to be opposite each other. The distance L between the enclosure of the conductor MZ and the substrate (the length of a gap from an end of the conductor MZ to the opposing substrate) is set to a value sufficiently smaller than the wavelength of the millimeter wave. The enclosure (shield member) is formed of the conductor MZ, reliably shielding the millimeter-wave signal compared to a case where a conductor is not used.

In comparison between (2) and (5) of FIG. 2B, a vacuum waveguide 9L is similar to a structure in which the millimeter wave shield body MX is arranged in the free-space transmission path 9B, except that a conductor MZ as an example of a millimeter wave shield member is provided so as to surround the antenna. The inside of the conductor MZ is hollow, thus the millimeter-wave signal transmission path 9 can be constituted simply at low cost without using a dielectric material. The conductor MZ is preferably at a fixed potential (for example, ground potential) on the substrate.

The vacuum waveguide 9L is not limited to the structure in which the enclosure is formed of the conductor MZ on the substrate. For example, as shown in (6) of FIG. 2B, a hole (which may or may not pass through the substrate) may be formed in a comparatively thick substrate, and the wall of the hole may be used for the enclosure. The sectional shape of the hole is arbitrary, such as a circle, a triangle, or a rectangle. In this case, the substrate functions as a shield member. The hole may be formed in one or both of the two substrates arranged to be opposite each other. The sidewall of the hole may be or may not be covered with a conductor. When the hole passes through the substrate, the antenna may be arranged (attached) on the rear surface of the semiconductor chip. When the hole does not pass through the substrate and stops in the halfway (is a non-through hole), the antenna may be provided at the bottom of the hole.

In the case of the dielectric transmission path 9A and the vacuum waveguide 9L, the millimeter wave is confined in the dielectric transmission path 9A or the vacuum waveguide 9L by the enclosure. Thus, the millimeter wave can be efficiently transmitted with small transmission loss, external radiation of the millimeter wave is suppressed, and the EMC countermeasure becomes easy.

As another example of the millimeter wave-confinement structure, when the three-dimensional space where the millimeter-wave signal (electromagnetic wave) can be transmitted is formed of a dielectric material (tangible object), the separate millimeter-wave signal transmission paths 9 in the multiple systems (in detail, the dielectric transmission path 9A: in this paragraph, the same is applied) may be formed. For example, a printed substrate on which an electronic circuit component is mounted may be formed of a dielectric material, and the printed substrate may be used as the dielectric transmission path 9A. At this time, a plurality of separate dielectric transmission paths 9A may be formed in the board.

When space division multiplex is applied, a system may be made such that various millimeter-wave signal transmission paths 9 are combined, that is, a part is handled by the free-space transmission path 9B, and the other part is handled by the millimeter wave-confinement of the dielectric transmission path 9A or the vacuum waveguide 9L.

Modulation and Demodulation

First Example

Figure 3:
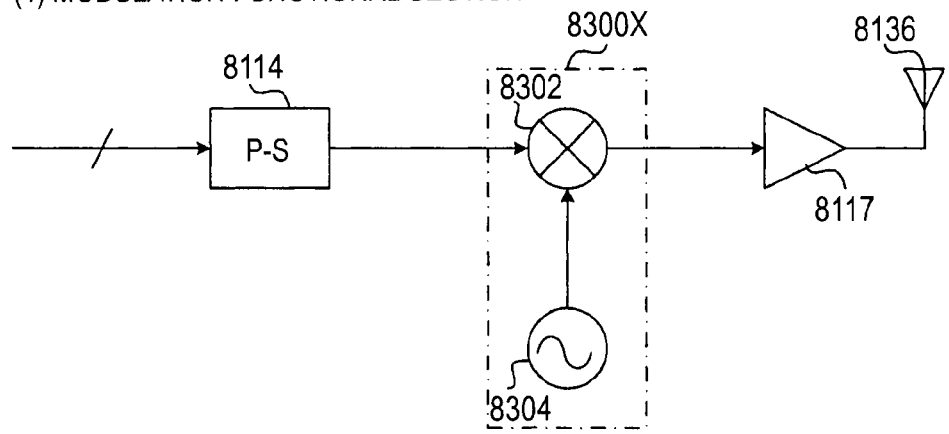
FIG. 3 is a diagram illustrating a first example of a modulation functional section and a demodulation functional section in a communication processing system.
Figure 3:
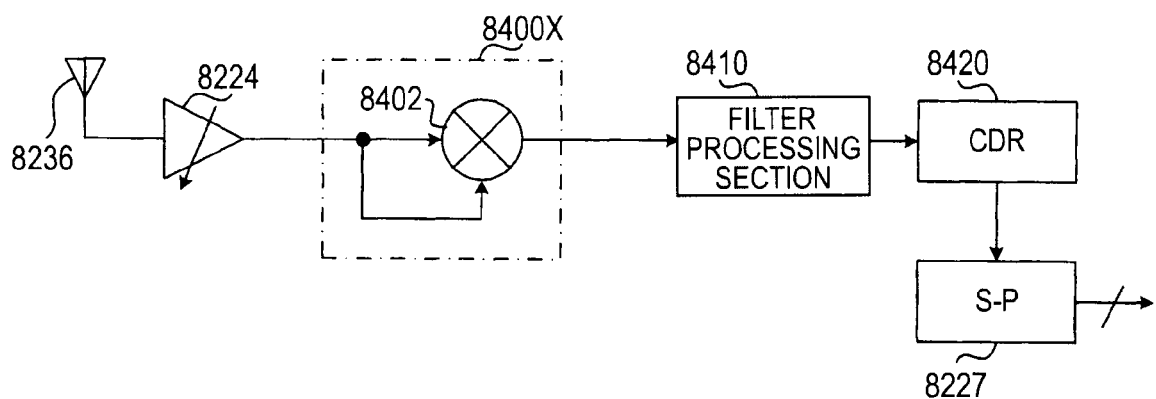

FIG. 3 is a diagram illustrating a first example of a modulation functional section and a demodulation functional section in a communication processing system.

Modulation Functional Section

First Example

Shown in (1) of FIG. 3 is the configuration of a modulation functional section 8300X of a first example provided on the transmission side. A transmission-target signal (for example, a 12-bit image signal) is converted to high-speed serial data series by the parallel-serial conversion section 114 and then supplied to the modulation functional section 8300X.

As the modulation functional section 8300X, various types of circuit configuration may be used in accordance with a modulation scheme. For example, in the case of an amplitude modulation scheme, configuration may be used which includes a frequency mixing section 8302 and a transmission-side local oscillation section 8304. In the case of a two-axis phase modulation scheme, for example, the configuration corresponding to quadrature modulation may be used.

The transmission-side local oscillation section 8304 (first carrier signal creation section) creates a carrier signal (modulation carrier signal) for use in modulation. The frequency mixing section 8302 (first frequency conversion section) multiplies (modulates) the carrier wave in the millimeter-wave band generated by the transmission-side local oscillation section 8304 with a signal from the parallel-serial conversion section 8114 (corresponding to the parallel-serial conversion section 114) to create a modulated signal in the millimeter-wave band and supplies the modulated signal to an amplification section 8117 (corresponding to the amplification section 117). The modulated signal is amplified by an amplification section 8117 and then radiated from an antenna 8136.

Demodulation Functional Section

First Example

Shown in (2) of FIG. 3 is the configuration of a demodulation functional section 8400X of the first example on the reception side. For the demodulation functional section 8400X, various types of circuit configuration may be used in accordance with a transmission-side modulation scheme. In this case, description will be provided for the amplitude modulation scheme so as to correspond to the above description of the modulation functional section 8300X. In the case of the phase modulation scheme, the configuration corresponding to quadrature detection or synchronous detection may be used.

The demodulation functional section 8400X of the first example includes a two-input frequency mixing section 8402 (mixer circuit) which is an example of an amplitude detection circuit, and uses a square-law detection circuit which obtains a detection output in proportion to the square of the amplitude of (the envelope of) the received millimeter-wave signal. The amplitude detection circuit may use a simple envelope detection circuit with no square property, instead of the square-law detection circuit. In the shown example, a filter processing section 8410, a clock reproduction section 8420 (CDR: Clock Data Recovery), and a serial-parallel conversion section 8127 (S-P: corresponding to the serial-parallel conversion section 127) are provided at the back of the frequency mixing section 8402. The filter processing section 8410 is provided with, for example, a low-pass filter (LPF).

The millimeter-wave signal received by the antenna 8236 is input to a variable gain-type amplification section 8224 (corresponding to the amplification section 224), subjected to amplitude adjustment, and then supplied to the demodulation functional section 8400X. The received signal subjected to amplitude adjustment is input to the two input terminals of the frequency mixing section 8402 simultaneously, such that a square signal is created and supplied to the filter processing section 8410. A high-frequency-band component of the square signal created by the frequency mixing section 8402 is removed by the low-pass filter of the filter processing section 8410, such that the waveform (baseband signal) of the input signal transmitted from the transmission side is created and then supplied to the clock reproduction section 8420.

The clock reproduction section 8420 (CDR) reproduces a sampling clock on the basis of the baseband signal, and samples the baseband signal with the reproduced sampling clock to create received data series. The created received data series is supplied to the serial-parallel conversion section 8227 (S-P), and a parallel signal (for example, a 12-bit image signal) is reproduced. As the clock reproduction scheme, there are various schemes, and, for example, a symbol locking scheme is used.

Problem of First Example

When the radio transmission system is constituted by the modulation functional section 8300X and the demodulation functional section 8400X of the first example, there are the following problems.

First, with regard to the oscillation circuit, there are the following problems. For example, in the case of filed (outdoors) communication, it is necessary to take into consideration multichanneling. In this case, the strict specification on the degree of stability of the transmission-side carrier wave has to be provided because of the effect of a frequency fluctuation component of the carrier wave. In the case of in-housing signal transmission or inter-instrument signal transmission, if a usual method which is used in outdoors radio communication is used on the transmission side and the reception side in transmitting data with millimeter waves, the carrier wave has to have stability, thus an oscillation circuit has to be provided which has a high degree of frequency stability of about ppm (parts per million) order.

In realizing a carrier signal with a high degree of frequency stability, for example, a millimeter-wave oscillation circuit having a high degree of stability may be realized on a silicon integrated circuit (CMOS: Complementary Metal-oxide Semiconductor). However, since a silicon substrate which is usually used for the CMOS has a low insulation property, a tank circuit having a high Q value (Quality Factor) may not be easily formed, making it difficult to realize the oscillation circuit. For example, as described in Reference Literature A, when an inductance is formed on a CMOS chip, the Q value is in a range of about 30 to 40.

Reference Literature A: A. Niknejad, "mm-Wave Silicon Technology 60 GHz and Beyond" (in particular, 3.1.2 Inductors, pp 70-71), ISBN 978-0-387-76558-7

Thus, in realizing an oscillation circuit with a high degree of stability, for example, a method may be used in which a tank circuit with a high Q value, such as a crystal oscillator, is provided outside the CMOS where the main body of the oscillation circuit is constituted and oscillates with a low frequency, and the oscillation output is multiplied and raised to the millimeter-wave band. However, in realizing a function for substituting signal transmission through a wiring, such as LVDS (Low Voltage Differential Signaling) with signal transmission through millimeter waves, it is not preferable to provide such an external tank in all chips.

If an amplitude modulation scheme, such as OOK (On-Off-Keying), is used, it should suffice that envelope detection is performed on the reception side. Thus, the oscillation circuit may not be provided, making it possible to reduce the number of tank circuits. However, if the signal transmission distance is extended, reception amplitude decreases. For this reason, in a scheme which uses a square-law detection circuit as an example of envelope detection, it is disadvantageous in that the effect of the decrease in reception amplitude noticeably appears, causing signal distortion. In other words, the square-law detection circuit is disadvantageous from a viewpoint of sensitivity.

As another method which realizes a carrier signal with a high degree of frequency stability, for example, a frequency multiplier circuit with a high degree of stability or a PLL circuit may be used, causing an increase in the circuit scale. For example, in Reference Literature B, a push-push oscillation circuit is used and a 60 GHz oscillation circuit is eliminated, reducing the circuit scale. In this case, however, a 30 GHz oscillation circuit or a divider, a phase frequency detector (PFD), an external reference (in this example, 117 MHz), and the like have to be still provided. For this reason, the circuit scale is apparently large.

Reference Literature B: "A 90 nm CMOS Low-Power 60 GHz Transceiver with Integrated Baseband Circuitry", ISSCC 2009/SESSION 18/RANGING AND Gb/s COMMUNICATION/18.5, 2009 IEEE International Solid-State Circuits Conference, pp 314-316

The square-law detection circuit extracts only an amplitude component from the received signal. For this reason, an available modulation scheme is limited to the amplitude modulation scheme (for example, ASK, such as OOK), and it is difficult to use the phase or frequency modulation scheme. If it is difficult to use the phase modulation scheme, this means that it is impossible to orthogonalize the modulated signal to increase the data transmission rate.

When multichanneling is realized through a frequency division multiplex scheme, in the case of the scheme which uses the square-law detection circuit, there are the following problems. It is necessary to arrange a band-pass filter for frequency selection on the reception-side in front of the square-law detection circuit, but it is not easy to realize a steep band-pass filter of a compact size. Further, when a steep band-pass filter is used, the strict specification on the degree of stability of the transmission-side carrier frequency has to be provided.

Modulation and Demodulation

Second Example

Figure 4:
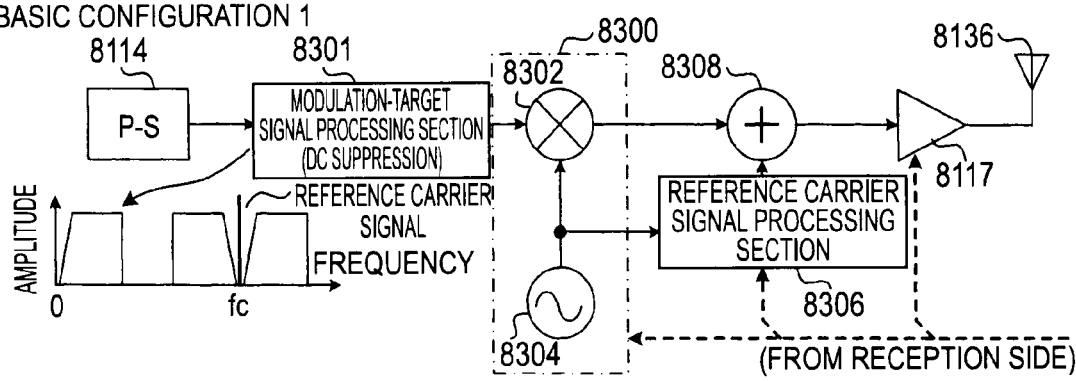
FIG. 4 is a diagram illustrating a second example of a transmission-side signal creation section including a modulation functional section provided on a transmission side and a peripheral circuit.
Figure 4:
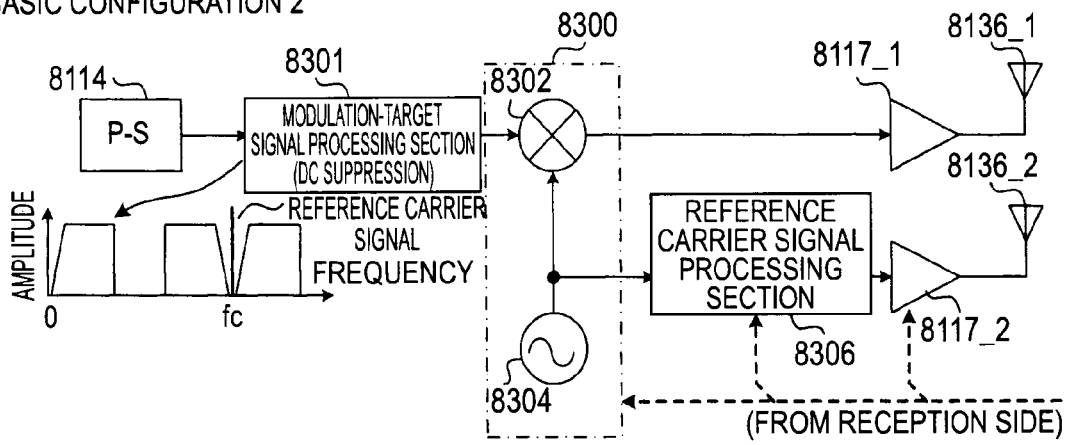
Figure 4:
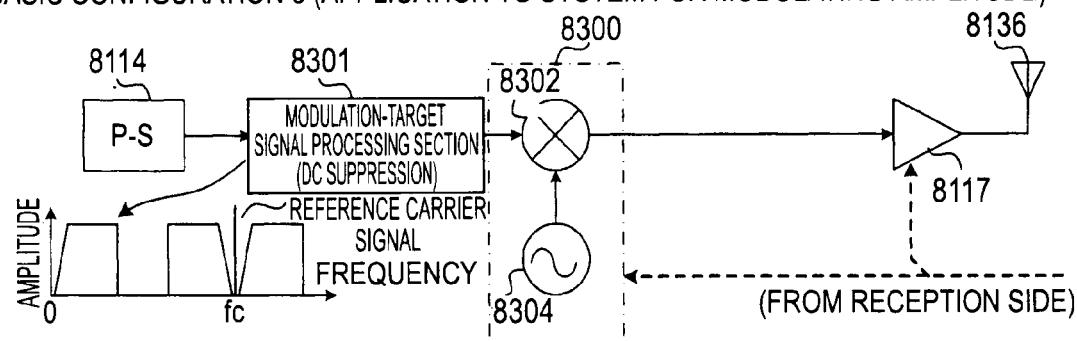
Figure 4:
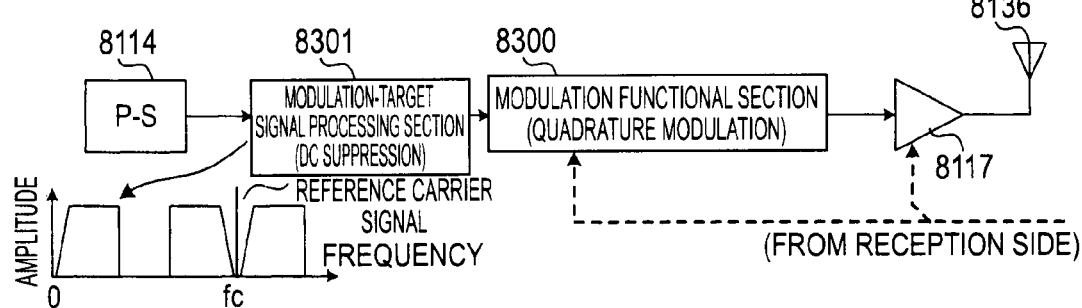
Figure 5A:
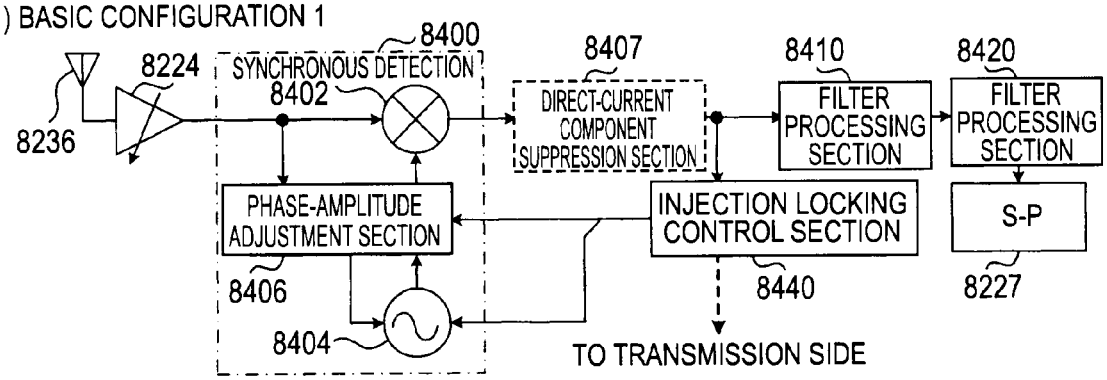
FIG. 5A is a diagram showing a configuration example of a reception-side signal creation section including a demodulation functional section of a second example provided on a reception side and a peripheral circuit.
Figure 5A:
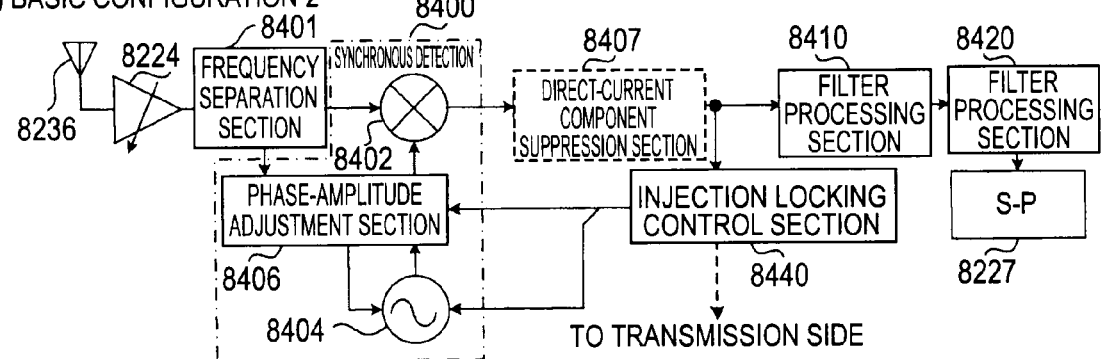
Figure 5A:
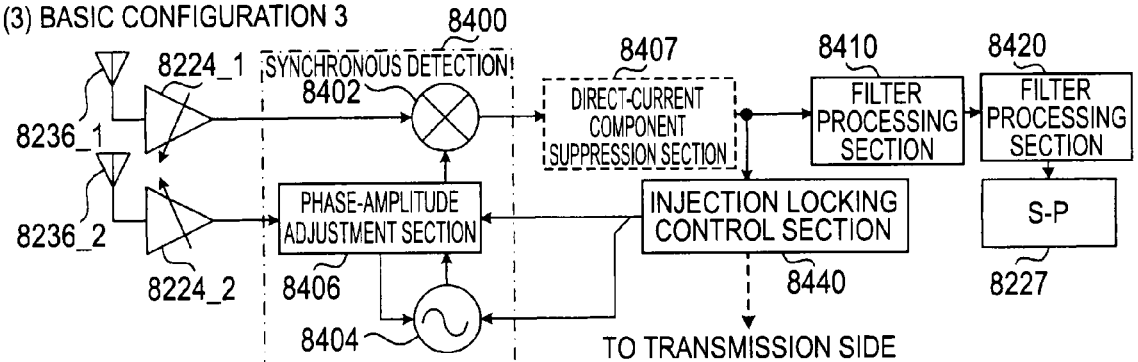
Figure 5A:
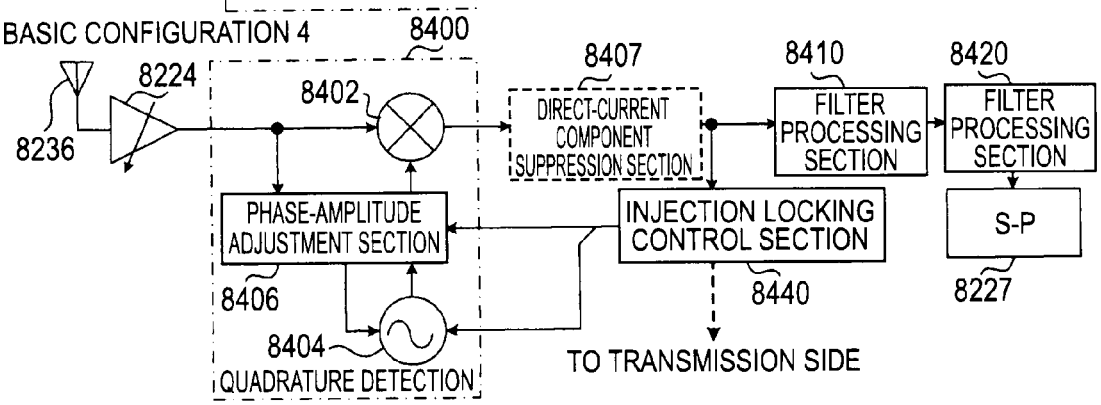
Figure 5B:
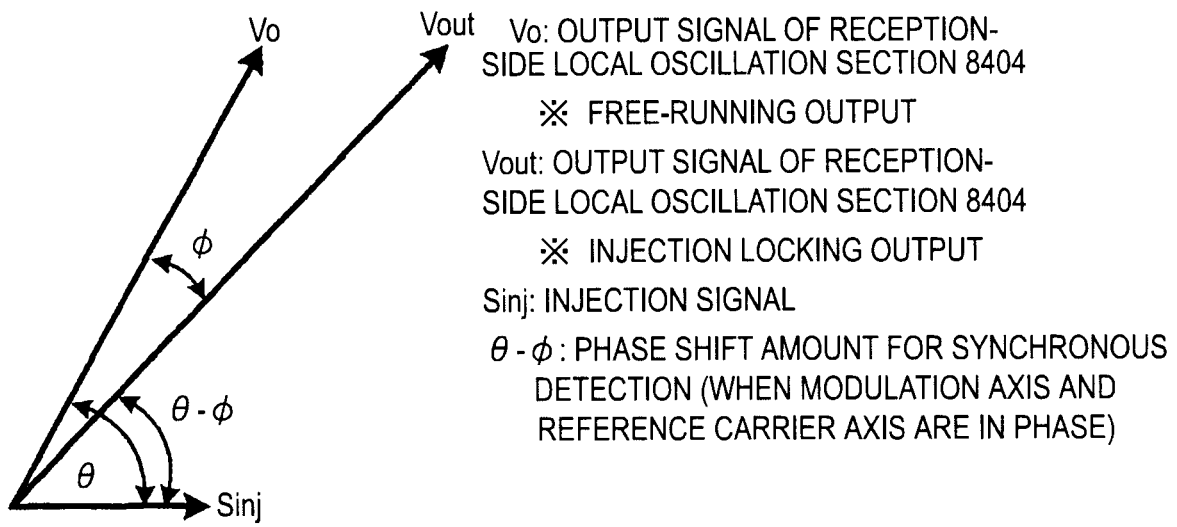
FIG. 5B is a diagram illustrating the phase relationship of injection locking.

FIGS. 4 to 5B are diagrams illustrating a second example of a modulation function and a demodulation function in a communication processing system. FIG. 4 is a diagram illustrating a second example of a transmission-side signal creation section 8110 (transmission-side communication section) which includes a modulation functional section 8300 (modulation sections 115 and 215 and frequency conversion sections 116 and 216) on the transmission side and peripheral circuits. FIG. 5A is a diagram illustrating a configuration example of a reception-side signal creation section 8220 (reception-side communication section) which includes a demodulation functional section 8400 (frequency conversion sections 125 and 225 and demodulation sections 126 and 226) of the second example on the reception side and peripheral circuits. FIG. 5B is a diagram illustrating the phase relationship of injection locking.

As a countermeasure against the problems of the above-described first example, the demodulation functional section 8400 of the second example uses an injection locking scheme.

When the injection locking scheme is used, preferably, appropriate correction processing is performed for a modulation-target signal in advance such that injection locking on the reception side is easily made. Usually, modulation is performed for the modulation-target signal while a near-direct-current component is suppressed, that is, modulation is performed while a low-frequency-band component including DC (direct current) is suppressed (cut), such that a modulated signal component near a carrier frequency fc is reduced as much as possible, and injection locking on the reception side is easily made. In the case of a digital scheme, for example, DC-free encoding is performed so as to eliminate occurrence of a DC component due to succession of the same code.

It is preferable to send a reference carrier signal, which is used as a reference of injection locking on the reception side in correspondence with the carrier signal used for modulation along with the signal (modulated signal) modulated in the millimeter-wave band. The reference carrier signal is a signal whose frequency and phase (preferably, also amplitude) corresponding to the carrier signal used for modulation output from the transmission-side local oscillation section 8304 are constant (invariable) at anytime. Usually, the reference carrier signal is the carrier signal used for modulation itself. The reference carrier signal is, not limited to, at least synchronized with the carrier signal. For example, a signal (for example, a harmonic signal) with a different frequency synchronized with the carrier signal used for modulation or a signal with the same frequency and a different phase (for example, a quadrature carrier signal which is quadrature to the carrier signal used for modulation) may be used.

In any modulation scheme or modulation circuit, there is a case where the carrier signal is included in the output signal of the modulation circuit (for example, standard amplitude modulation, ASK, or the like), or a case where the carrier wave is suppressed (carrier wave suppression-type amplitude modulation, ASK, PSK, or the like). Thus, in order to send the reference carrier signal from the transmission side along with the signal modulated in the millimeter-wave band, the circuit configuration is used according to the type of reference carrier signal (whether or not the carrier signal used for modulation itself is used as the reference carrier signal), the modulation scheme, or the modulation circuit.

Modulation Functional Section

Second Example

FIG. 4 shows the configuration of the second example of the modulation functional section 8300 and the peripheral circuits. A modulation-target signal processing section 8301 is provided in front of the modulation functional section 8300 (frequency mixing section 8302). Each example shown in FIG. 4 shows a configuration example corresponding to the digital scheme. The modulation-target signal processing section 8301 performs DC-free encoding, such as 8-9 transform encoding (8B/9B encoding), 8-10 transform encoding (8B/10B encoding), or scrambling, for data supplied from the parallel-serial conversion section 8114 so as to eliminate occurrence of a DC component due to the succession of the same codes. Though not shown, in the case of an analog modulation scheme, high-pass filtering (or band-pass filtering) is preferably performed for a modulation-target signal.

In the case of 8-10 transform encoding, 8-bit data is transformed to 10-bit codes. For example, as the 10-bit codes, the codes with equal numbers of "1" and "0" from among 1024 are used as data codes, such that the DC-free property is exhibited. A part of the 10-bit codes which are not used as data codes are used, for example, as special codes which indicate idle, packet separation, and the like. Scrambling is used, for example, in wireless LAN (IEEE802.11a) or the like.

A basic configuration 1 shown in (1) of FIG. 4 is made such that a reference carrier signal processing section 8306 and a signal synthesis section 8308 are provided to synthesize (mix) the output signal of the modulation circuit (first frequency conversion section) and the reference carrier signal. This can be regarded as a versatile scheme which does not depend on the type of reference carrier signal, the modulation scheme, or the modulation circuit. However, the synthesized reference carrier signal may be detected as a direct-current offset component at the time of demodulation on the reception side in accordance with the phase of the reference carrier signal and may affect the reproducibility of the baseband signal. In this case, a countermeasure is taken on the reception side so as to suppress the direct-current component. In other words, the reference carrier signal preferably has a phase relationship such that it is not necessary to eliminate the direct-current offset component at the time of demodulation.

The reference carrier signal processing section 8306 adjust the phase or amplitude of the modulation carrier signal supplied from the transmission-side local oscillation section 8304, if necessary, and supplies the output signal to the signal synthesis section 8308 as the reference carrier signal. For example, in the case of a scheme in which the output signal of the frequency mixing section 8302 itself does not include the carrier signal with a constant frequency or phase (a frequency or phase modulation scheme), or when the harmonic signal of the carrier signal used for modulation or the quadrature carrier signal is used as the reference carrier signal, the basic configuration 1 is used.

In this case, it is possible to use the harmonic signal of the carrier signal used for modulation or the quadrature carrier signal as the reference carrier signal, and to adjust the amplitudes or phases of the modulated signal and the reference carrier signal separately. That is, the amplification section 8117 performs gain adjustment focusing on the amplitude of the modulated signal, and the amplitude of the reference carrier signal is also adjusted simultaneously at this time. Meanwhile, the reference carrier signal processing section 8306 can adjust only the amplitude of the reference carrier signal such that desirable amplitude is obtained in relation to injection locking.

Although in the basic configuration 1, the signal synthesis section 8308 is provided to synthesize the modulated signal and the reference carrier signal, this is not indispensable. Like a basic configuration 2 shown in (2) of FIG. 4, the modulated signal and the reference carrier signal may be sent to the reception side through different antennas 8136_1 and 8136_2, preferably, through different millimeter-wave signal transmission paths 9, such that there is no interference. In the basic configuration 2, it is possible to send the reference carrier signal, which also has constant amplitude, to the reception side, thus from a viewpoint of ease of injection locking, this can be regarded to the optimum scheme.

In the case of the basic configuration 1 and 2, it is advantageous in that it is possible to adjust the amplitudes or phases of the carrier signal used for modulation (in other words, the sent modulated signal) and the reference carrier signal separately. Therefore, the above configuration can be regarded as a configuration which is suitable for where the modulation axis on which transmission-target information is placed and the axis (reference carrier axis) of the reference carrier signal used for injection locking are out of phase, not in phase, such that no direct-current offset occurs in the demodulation output.

When the carrier signal with constant frequency or phase is included in the outputs signal of the frequency mixing section 8302, a basic configuration 3 shown in (3) of FIG. 4 may be used in which the reference carrier signal processing section 8306 or the signal synthesis section 8308 is not provided. It should suffice that only the modulated signal which is modulated in the millimeter-wave band is sent by the frequency mixing section 8302, and the carrier signal included in the modulated signal is handled as the reference carrier signal. It is not necessary to add a different reference carrier signal to the output signal of the frequency mixing section 8302 and to send the resultant signal to the reception side. For example, in the case of an amplitude modulation scheme (for example, ASK scheme), the basic configuration 3 may be used. At this time, it is preferable to perform the DC-free processing.

Meanwhile, in the case of amplitude modulation or ASK, the frequency mixing section 8302 may be actively used as a carrier wave suppression-type circuit (for example, a balanced modulation circuit or a double-balanced modulation circuit), and, like the basic configuration 1 and 2, the reference carrier signal may also be sent along with the output signal (modulated signal).

In the case of the phase or frequency modulation scheme, like a basic configuration 4 shown in (4) of FIG. 4, the modulation functional section 8300 (which uses, for example, quadrature modulation) may send only the modulated signal modulated (frequency-converted) in the millimeter-wave band. However, injection locking on the reception side is also related to an injection level (the amplitude level of a reference carrier signal input to an injection locking-type oscillation circuit), the modulation scheme, the data rate, a carrier frequency, and the like. Thus, the application range is limited.

In any of the basic configuration 1 to 4, as indicated by a dotted line in the drawing, a mechanism may be used in which information based on the injection locking detection result on the reception side is received from the reception side, and the frequency of the modulation carrier signal or the phase of the millimeter wave (in particular, a millimeter wave which is used as an injection signal on the reception side: for example, the reference carrier signal or the modulated signal) or the reference carrier signal is adjusted. With regard to transmission of information from the reception side toward the transmission side, the use of millimeter waves is not indispensable, and an arbitrary may be used regardless of wired or wireless.

In any of the basic configuration 1 to 4, the frequency of the modulation carrier signal (or the reference carrier signal) is adjusted by controlling the transmission-side local oscillation section 8304.

In the basic configuration 1 and 2, the amplitude or phase of the reference carrier signal is adjusted by controlling the reference carrier signal processing section 8306 or the amplification section 8117. In the basic configuration 1, the amplitude of the reference carrier signal may be adjusted by the amplification section 8117 which adjusts transmission power. In this case, however, there is a problem in that the amplitude of the modulated signal is also adjusted.

In the basic configuration 3 which is suitable for the amplitude modulation scheme (analog amplitude modulation or digital ASK), the direct-current component with respect to the modulation-target signal is adjusted, or the carrier frequency component of the modulated signal (corresponding to the amplitude of the reference carrier signal) is adjusted by controlling the degree of modulation (modulation rate). For example, a case where a signal obtained by adding a direct-current component to the transmission-target signal is modulated is taken into consideration. In this case, when the degree of modulation is constant, the amplitude of the reference carrier signal is adjusted by controlling the direct-current component. When the direct-current component is constant, the amplitude of the reference carrier signal is adjusted by controlling the degree of modulation.

Meanwhile, in this case, only the modulated signal output from the frequency mixing section 8302 is sent to the reception side without using the signal synthesis section 8308, such that a signal is sent in which the modulated signal obtained by modulating the carrier signal with the transmission-target signal and the carrier signal used for modulation are synthesized. Inevitably, the reference carrier signal is placed on the same axis (that is, in phase with the modulation axis) as the modulation axis, on which the transmission-target signal of the modulated signal is placed. On the reception side, the carrier frequency component of the modulated signal is used for injection locking as the reference carrier signal. Although the details will be described below, when a phase plane is taken into consideration, the modulation axis on which transmission-target information is placed and the axis of the carrier frequency component (reference carrier signal) which is used for injection locking are in phase, such that a direct-current offset due to the carrier frequency component (reference carrier signal) occurs in the demodulation output.

Demodulation Functional Section

Second Example

FIG. 5A shows the configuration of a second example of the demodulation functional section 8400 and peripheral circuits. The demodulation functional section 8400 of the second example includes a reception-side local oscillation section 8404, and supplies an injection signal to the reception-side local oscillation section 8404 to acquire an output signal corresponding to the carrier signal used for modulation on the transmission side. Usually, an oscillation output signal synchronized with the carrier signal used on the transmission side is acquired. Then, the frequency mixing section 8402 multiplies (performs synchronous detection for) the received millimeter-wave modulated signal and a carrier signal for demodulation (demodulation carrier signal: referred to as reproduction carrier signal) based on the output signal of the reception-side local oscillation section 8404 to acquire a synchronously detected signal. A high-frequency-band component of the synchronously detected signal is eliminated by the filter processing section 8410, such that the waveform (baseband signal) of the input signal transmitted from the transmission side is obtained. Hereinafter, the same description as in the first example is applied.

The frequency mixing section 8402 performs frequency conversion (down-conversion and demodulation) through synchronous detection. Thus, for example, the bit error rate property is excellent, and phase modulation or frequency modulation can be applied through expansion to quadrature detection.

In supplying the reproduction carrier signal based on the output signal of the reception-side local oscillation section 8404 to the frequency mixing section 8402 and performing demodulation, it is necessary to take into consideration a phase shift, and what is important is to provide a phase adjustment circuit in a synchronous detection system. For example, as described in Reference Literature C, this is because there is a phase difference between the received modulated signal and the oscillation output signal output from the reception-side local oscillation section 8404 through injection locking.

Reference Literature C: L. J. Paciorek, "Injection Lock of Oscillators", Proceeding of the IEEE, Vol. 55 NO. 11, November 1965, pp 1723-1728

In this example, the phase-amplitude adjustment section 8406 which has a function for adjusting injection amplitude as well as the function of the phase adjustment circuit is provided in the demodulation functional section 8400. The phase adjustment circuit may be provided with respect to one of the injection signal to the reception-side local oscillation section 8404 and the output signal of the reception-side local oscillation section 8404, or may be applied to both of them. The reception-side local oscillation section 8404 and the phase-amplitude adjustment section 8406 constitute a demodulation-side (second) carrier signal creation section which creates a demodulation carrier signal synchronized with the modulation carrier signal and supplies the demodulation carrier signal to the frequency mixing section 8402.

As indicated by a dotted line in the drawing, a direct-current component suppression section 8407 is provided at the back of the frequency mixing section 8402. The direct-current component suppression section 8407 eliminates a direct-current offset, which may be included in the synchronously detected signal, in accordance with the phase of the reference carrier signal synthesized with the modulated signal (specifically, when the modulated signal and the reference carrier signal are in phase).

Referring to Reference Literature C, when the free-running oscillation frequency of the reception-side local oscillation section 8404 is fo($\omega$o), the center frequency of the injection signal (in the case of the reference carrier signal, the frequency of the reference carrier signal) is fi($\omega$i), the injection voltage to the reception-side local oscillation section 8404 is Vi, the free-running oscillation voltage of the reception-side local oscillation section 8404 is Vo, and the Q value (Quality Factor) is Q, a lock range is expressed by a maximum pulling frequency range $\Delta$fomax as prescribed by Expression (A). From Expression (A), it can be seen that the Q value affects the lock range, and as the Q value is small, the lock range is widened.

$$\Delta fomax = fo/(2*Q)*(Vi/Vo)*1/\text{sqrt}(1-(Vi/Vo)^2) \quad (A)$$

From Expression (A), it can be understood that the reception-side local oscillation section 8404 which acquires the oscillation output signal through injection locking may be locked (synchronized) with a component within $\Delta$fomax of the injection signal but may not be locked with a component out of $\Delta$fomax, exhibiting a band-pass effect. For example, when a modulated signal having a frequency band is supplied to the reception-side local oscillation section 8404 and an oscillation output signal is obtained through injection locking, the oscillation output signal synchronized with the average frequency of the modulated signal (the frequency of the carrier signal) is obtained, and the component out of Δfomax is removed.

In supplying the injection signal to the reception-side local oscillation section 8404, like a basic configuration 1 shown in (1) of FIG. 5A, the received millimeter-wave signal may be supplied to the reception-side local oscillation section 8404 as the injection signal. In this case, it is not preferable that there are many frequency components of the modulated signal within Δfomax. That is, the amount of frequency components is preferably as small as possible. If "the amount of frequency components is preferably as small as possible", this means that, even when there is a small amount of frequency components, injection locking can be made by appropriately adjusting the signal input level or the frequency. That is, a frequency component unnecessary for injection locking may also be supplied to the reception-side local oscillation section 8404, it may be difficult to take injection locking. However, if the modulation-target signal is modulated while the low-frequency-band component is suppressed in advance on the transmission side (DC-free encoding or the like), no modulated signal component is present near the carrier frequency, even the basic configuration 1 is permissible.

Like a basic configuration 2 shown in (2) of FIG. 5A, the frequency separation section 8401 may be provided to frequency-separate the modulated signal and the reference carrier signal from the received millimeter-wave signal and to supply the separated reference carrier signal component to the reception-side local oscillation section 8404 as the injection signal. The signal is supplied while frequency component unnecessary for injection locking is suppressed in advance, thus it is easy to take injection locking.

A basic configuration 3 shown in (3) of FIG. 5A corresponds to a case where the basic configuration 2 shown in (2) of FIG. 4 is used. In this scheme, the modulated signal and the reference carrier signal are received by different antennas 8236_1 and 8236_2, preferably, by different millimeter-wave signal transmission paths 9 such that there is no interference. In the reception-side basic configuration 3, the reference carrier signal which also has constant amplitude can be supplied to the reception-side local oscillation section 8404, thus from a viewpoint of ease of injection locking, this can be regarded to the optimum scheme.

A basic configuration 4 shown in (4) of FIG. 5A corresponds to a case where the basic configuration 4 shown in (4) of FIG. 4 is used when the phase or frequency modulation scheme is used on the transmission side. Although the same configuration as the basic configuration 1 is made, in practice, the demodulation functional section 8400 becomes a demodulation circuit, such as a quadrature detection circuit, which corresponds to phase modulation or frequency modulation.

The millimeter-wave signal received by the antenna 8236 is supplied to the frequency mixing section 8402 and the reception-side local oscillation section 8404 by a divider (demultiplexer). When injection locking functions, the reception-side local oscillation section 8404 outputs the reproduction carrier signal synchronized with the carrier signal used for modulation on the transmission side.

The possibility of injection locking on the reception side (the possibility that the reproduction carrier signal synchronized with the carrier signal used for modulation on the transmission side can be acquired) also depends on the injection level (the amplitude level of the reference carrier signal input to the injection locking-type oscillation circuit), the modulation scheme, the data rate, the carrier frequency, and the like. What is necessary is to reduce a component of the modulated signal within an injection lockable band. Thus, DC-free encoding is preferably performed on the transmission side such that the center (average) frequency of the modulated signal is substantially equal to the carrier frequency and the center (average) phase is substantially equal to zero (the origin on the phase plane).

For example, Reference Literature D describes an example where a modulated signal modulated by a BPSK (Binary Phase Shift Keying) scheme is used as an injection signal. In the BPSK scheme, the injection signal to the reception-side local oscillation section 8404 undergoes a phase change of 180 degrees in according to a symbol time T of the input signal. Even in this case, for injection locking of the reception-side local oscillation section 8404, if the maximum pulling frequency range of the reception-side local oscillation section 8404 is Δfomax, it is necessary that the symbol time T satisfies T<1/(2Δfomax). This means that the symbol time T has to be set short with a margin. If the symbol time T is as short as possible, this means that the data rate increases. This is available for the purpose of high-speed data transfer.

Reference Literature D: P. Edmonson, et al., "Injection Locking Techniques for a 1-GHz Digital Receiver Using Acoustic-Wave Devices", IEEE Transactions on Ultrasonics, Ferroelectrics, and Frequency Control, Vol. 39, No. 5, September, 1992, pp 631-637

Reference Literature E describes an example where a modulated signal modulated by a 8PSK (8-Phase Shift Keying) scheme is used as an injection signal. Reference Literature E also describes that, if the injection voltage or the carrier frequency is under the same condition, as the data rate is high, it is easy to take injection locking. This is available for the purpose of high-speed data transfer.

Reference Literature E: Tarar, M. A.; Zhizhang Chen, "A Direct Down-Conversion Receiver for Coherent Extraction of Digital Baseband Signals Using the Injection Locked Oscillators", Radio and Wireless Symposium, 2008 IEEE, Volume, Issue, 22-24 January 2008, pp 57 to 60

In any of the basic configuration 1 to 4, the lock range is controlled by controlled the injection voltage Vi or the free-running oscillation frequency fo on the basis of Expression (A). In other words, what is information is to adjust the injection voltage Vi or the free-running oscillation frequency fo such that injection locking is taken. For example, an injection locking control section 8440 is provided at the back of the frequency mixing section 8402 (in the example of the drawing, at the back of the direct-current component suppression section 8407) to determine the state of injection locking on the basis of the synchronously detected signal (baseband signal) acquired by the frequency mixing section 8402 and to control each section as an adjustment target on the basis of the determination result such that injection locking is taken.

At this time, one or both of a method which takes action on the reception side and a method which, as indicated by a dotted line in the drawing, supplies information (control information and detection signals as the basis of control information) conductive to control to the transmission side and takes action on the transmission side may be used. The method which takes action on the reception side has a difficulty from a viewpoint of power consumption or interference resistance because there may be a case where injection locking is not taken on the reception side if the millimeter-wave signal (in particular, reference carrier signal component) is not transmitted with certain intensity, but the method has an advantage in that it is possible to take action on the reception side alone.

In contrast, according to the method which takes action on the transmission side, while it is necessary to transmit information from the reception side to the transmission side, it is possible to transmit the millimeter-wave signal with minimum power subjected to injection locking on the reception side, to reduce power consumption, and to improve interference resistance.

In the case of in-housing signal transmission or inter-instrument signal transmission, if the injection locking scheme is applied, the following advantages are obtained. The transmission-side local oscillation section 8304 can relax the specification on the degree of stability of the frequency of the carrier signal for modulation. As will be apparent from Expression (A), the reception-side local oscillation section 8404 in which injection locking is taken, the Q value has to be low to follow the transmission-side frequency fluctuation.

This is available when the entire reception-side local oscillation section 8404 including a tank circuit (inductance component and capacitance component) is formed on the CMOS. On the reception side, the reception-side local oscillation section 8404 may have a low Q value. The same is applied to the transmission-side local oscillation section 8304. The transmission-side local oscillation section 8304 may have a low degree of frequency stability and a low Q value.

The miniaturization of the CMOS further progresses in future, and the operation frequency further increases. In realizing a compact transmission system in a high frequency band, a high carrier frequency has to be used. In the injection locking scheme of this example, it is possible to relax the specification on the degree of stability of the oscillation frequency, thus it is possible to easily use a carrier signal with a higher frequency.

If the degree of frequency stability may be low even with high frequency (in other words, the Q value may be low), this means that, in realizing a carrier signal having a high degree of stability with high frequency, it is not necessary to use a frequency multiplier circuit with a high degree of stability or a PLL circuit for carrier locking, thus it is possible to simply realize a communication function of a small circuit scale even with a higher carrier frequency.

The reproduction carrier signal synchronized with the carrier signal used by the reception-side local oscillation section 8404 on the transmission side is acquired and supplied to the frequency mixing section 8402, and synchronous detection is performed. Thus, a band-pass filter for wavelength selection may not be provided in front of the frequency mixing section 8402. With regard to the selection working of the reception frequency, in practice, control is preferably performed such that the transmission and reception local oscillation circuits are completely synchronized (that is, injection locking is taken), making it easy to select the reception frequency. In the case of a millimeter-wave band, the time necessary for injection locking is short compared to a low frequency, such that the selection working of the reception frequency can be completed in a short time.

Since the transmission and reception local oscillation circuits are completely synchronized, the fluctuation component of the transmission-side carrier frequency is cancelled, ensuring application of various modulation schemes, such as phase modulation. For example, in the case of digital modulation, there is known phase modulation, such as QPSK (Quadrature Phase Shift Keying) modulation or 16QAM (Quadrature Amplitude Modulation). In these phase modulation schemes, quadrature modulation is performed between the baseband signal and the carrier wave. Quadrature modulation is performed with input data as I-phase and Q-phase baseband signals. That is, the I-axis and Q-axis carrier signals are respectively modulated with the I-phase signal and the Q-phase signal. Injection locking may be applied to a quadrature modulation scheme, such as QPSK or 16QAM, as well as 8PSK modulation as described in Reference Literature E, such that the modulated signal is orthogonalized to increase the data transmission rate.

If injection locking is applied, in combination with synchronous detection, even when the band-pass filter for wavelength selection is not used on the reception side, interference scarcely affects simultaneous and separate transmission by a plurality of transmission and reception pairs, such as multi-channeling or full-duplex bidirectionality.

[Relationship Between Injection Signal and Oscillation Output Signal]

FIG. 5B shows the phase relationship between signals in injection locking. Here, as a basic configuration, a case will be described where the injection signal (in this case, the reference carrier signal) and the carrier signal used for modulation are in phase.

With regard to the working of the reception-side local oscillation section 8404, two modes of an injection locking mode and an amplifier mode may be used. When the injection locking scheme is used, the injection locking mode is used as the basic working, and the amplifier mode is used in a special case. The special case refers to a case where, when the reference carrier signal is used as the injection signal, the carrier signal used for modulation and the reference carrier signal are out of phase (usually, have quadrature relationship).

When the injection locking mode is carried out while the reception-side local oscillation section 8404 is outputting the oscillation output signal Vo in a free-running manner, as shown in the drawing, there is a phase difference between a received reference carrier signal Sinj and an oscillation output signal Vout output from the reception-side local oscillation section 8404 through injection locking. It is necessary to correct the phase difference so as to perform quadrature detection in the frequency mixing section 8402. As will be understood from the drawing, the phase shift amount is "θ−φ" in the drawing when the phase-amplitude adjustment section 8406 performs phase adjustment such that a modulated signal SI is substantially in phase with the output signal of the reception-side local oscillation section 8404.

In other words, the phase-amplitude adjustment section 8406 may shift the phase so as to cancel the phase difference "θ−φ" between the phase of the output signal Vout when the reception-side local oscillation section 8404 is working in the injection locking mode and the output signal Vout when injection locking is taken with the injection signal Sinj to the reception-side local oscillation section 8404. The phase difference between the injection signal Sinj to the reception-side local oscillation section 8404 and the free-running output Vo of the reception-side local oscillation section 8404 is θ. The phase difference between the output signal Vout of the reception-side local oscillation section 8404 when injection locking is taken and the free-running output Vo of the reception-side local oscillation section 8404.

<Relationship Between Multichanneling and Space Division Multiplex>

Figure 6A:
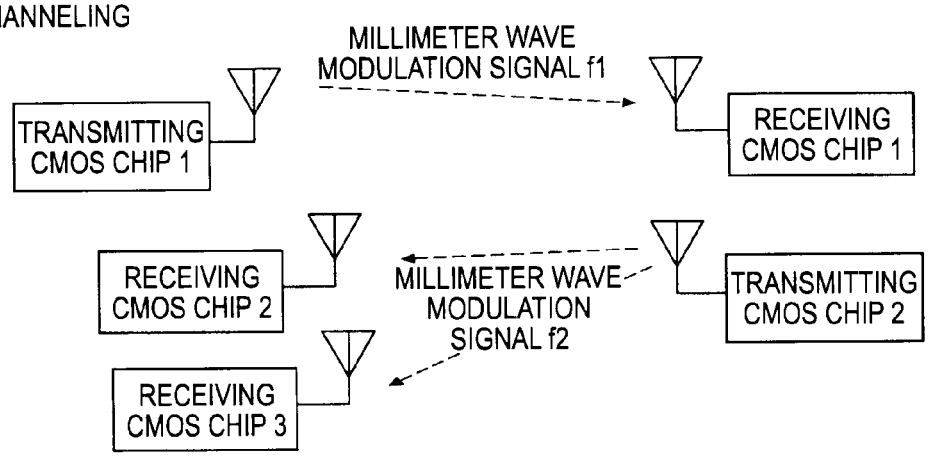
FIG. 6A is a diagram illustrating the relationship between multichanneling and space division multiplex.
Figure 6A:
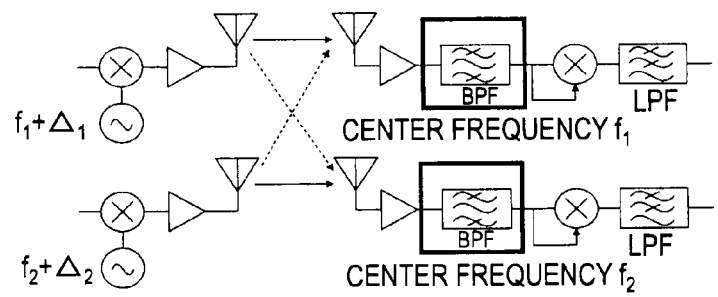
Figure 6A:
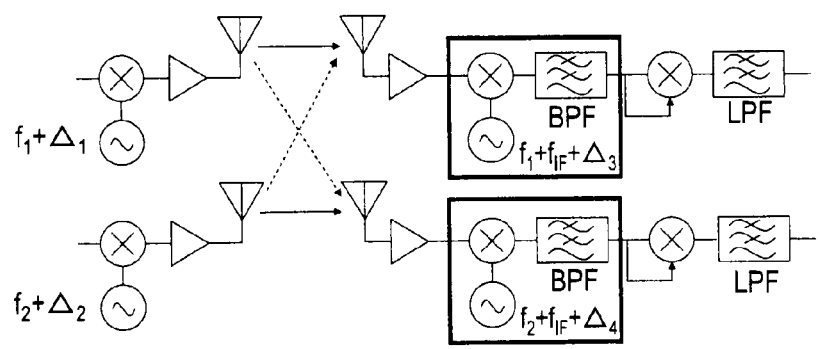
Figure 6A:
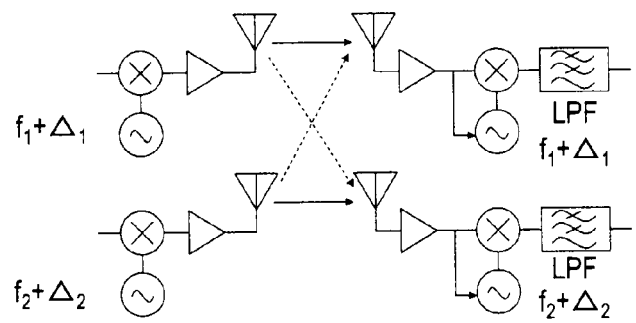
Figure 6B:
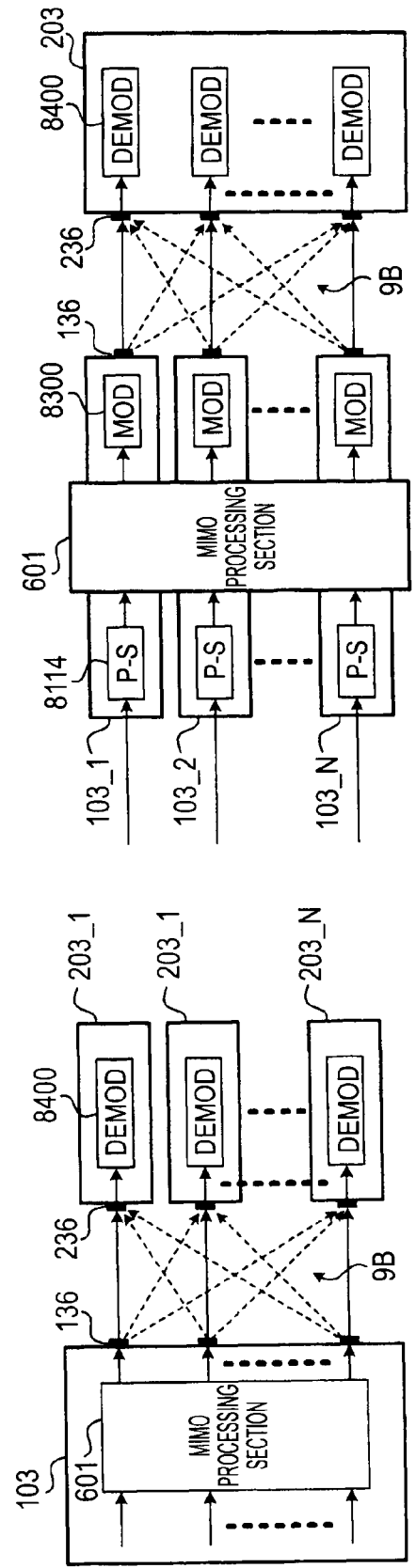
FIG. 6B is a diagram showing a basic mechanism for relaxation of an interference countermeasure in regard to the relationship between multichanneling and space division multiplex.
Figure 6B:
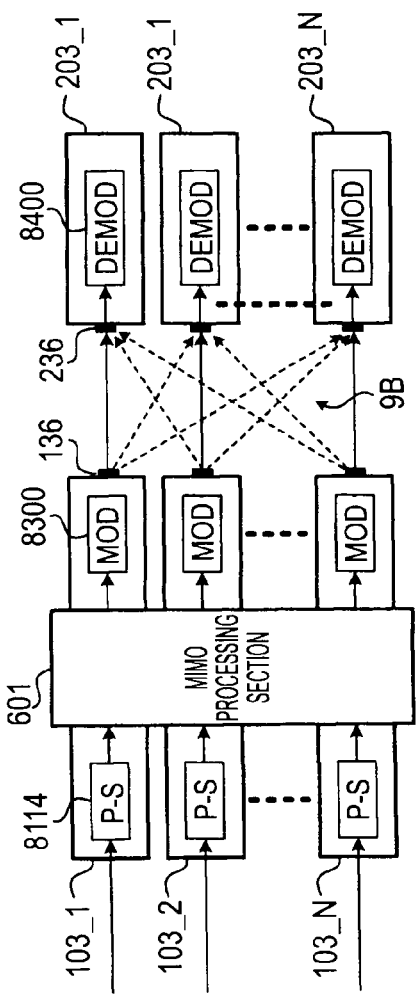
Figure 6B:
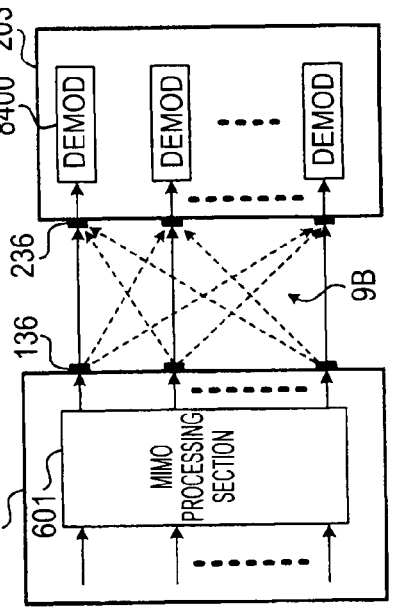

FIGS. 6A and 6B are diagrams illustrating the relationship between multichanneling and space division multiplex and the basic principle of a countermeasure against interference. FIG. 6A is a diagram illustrating the relationship between multichanneling and space division multiplex. FIG. 6B is a diagram showing a basic mechanism for relaxation of an interference countermeasure in regard to the relationship between multichanneling and space division multiplex.

As a method which achieves multichanneling, as described with reference to FIGS. 1A to 2A, space division multiplex may be applied. Further, as shown in (1) of FIG. 6A, a transmission and reception pair having different carrier frequencies may be used. That is, multichanneling is realized through frequency division multiplex.

If different carrier frequencies are used, it is possible to easily realize full-duplex bidirectionality, and to realize a situation in which a plurality of semiconductor chips (a set of transmission-side signal creation section 110 and reception-side signal creation section 220, or a set of transmission-side signal creation section 210 and reception-side signal creation section 120) perform communication separately in the housing of the electronic instrument.

[Problem]

For example, as shown in (2) to (4) of FIG. 6A, a case where two transmission and reception pairs perform transmission simultaneously and separately. In the drawing, $\Delta 1$, $\Delta 2$, $\Delta 3$, and $\Delta 4$ are frequency components which temporally fluctuates.

As shown in (2) of FIG. 6A, when a square-law detection scheme is applied, as described above, in the case of multichanneling in the frequency division multiplex scheme, it is necessary to provide a band-pass filter (BPF) for frequency selection on the reception-side. It is not easy to realize a steep band-pass filter of a compact size, and it is necessary to provide a band-pass filter so as to change the selected frequency. Since the square-law detection scheme extracts only amplitude information, the modulation scheme is limited to ASK, OOK, or the like, and it is difficult to say that the modulated signal is orthogonalized to increase the data transmission rate.

When no PLL for carrier locking is provided on the reception side so as to reduce the size, for example, as shown in (3) of FIG. 6A, square-law detection may be performed through down-conversion for the IF (Intermediate Frequency). In this case, a block is added to perform frequency conversion to a sufficiently high IF, making it possible to select a signal to be received with no band-pass filter in an RF band. Meanwhile, in this case, it is necessary to provided a circuit which performs frequency conversion to the IF band or a band-pass filter in the IF band, complicating the circuit as much. There is also the effect of the frequency component (frequency fluctuation component $\Delta$) which temporally fluctuates during down-conversion on the reception-side, as well as the frequency fluctuation component $\Delta$ on the transmission side. For this reason, the modulation scheme is limited to a scheme (for example, ASK, OOK, or the like) which extracts amplitude information such that the effect of the frequency fluctuation component $\Delta$ is negligible.

In contrast, as shown in (4) of FIG. 6A, if the injection locking scheme is applied, the transmission-side local oscillation circuit 8304 and the reception-side local oscillation section 8404 are completely synchronized, making it possible to easily realize various modulation schemes. It is not necessary to provide a PLL for carrier locking, reducing the circuit size and making it easy to select the reception frequency. In addition, an oscillation circuit in a millimeter-wave band can be realized by using a tank circuit having a smaller time constant than a low frequency, shortening the time necessary for injection locking compared to a low frequency and achieving high-speed transmission. As described above, if the injection locking scheme is applied, it is possible to easily increase the transmission speed and to reduce the number of input/output terminals compared to a signal between the chips with the normal baseband signal. It is possible to constitute a compact millimeter-wave antenna on a chip and to provide a remarkably high degree of freedom in extracting a signal from the chip. Furthermore, the transmission-side frequency fluctuation component $\Delta$ is cancelled through injection locking, enabling various types of modulation, such as phase modulation (for example, quadrature modulation).

In realizing multichanneling through frequency division multiplex, on the reception side, a signal which is synchronized with the carrier signal used for modulation on the transmission side is reproduced and frequency conversion is performed through synchronous detection. Thus, even when there is a frequency fluctuation $\Delta$ of the carrier signal, it is possible to restore the transmitted signal with no effect of the frequency fluctuation (so-called effect of interference). As shown in (4) of FIG. 6A, a band-pass filter serving as a frequency selection filter may not be provided in front of a frequency conversion circuit (down-converter).

Meanwhile, if multichanneling is used through frequency division multiplex in such a manner, as will be understood from the description of frequency multiplex with reference to FIG. 1B, it is necessary to widen the use band of the entire millimeter-wave signal transmission path 9. While the free-space transmission path 9B can cope with such demand, a transmission path with a limited bandwidth, such as the dielectric transmission path 9A, has a problem.

In the case of in-instrument or inter-instrument radio transmission, it is easy to apply space division multiplex, and the same carrier frequency is used in the respective channels, releasing the restriction on the transmission bandwidth. Meanwhile, in the case of space division multiplex, it is necessary to provide a countermeasure against interference, as described with reference to FIG. 2B. For example, in the free-space transmission path 9B shown in (1) of FIG. 2B, what is important is that the transmitting (receiving) antennas are at a sufficient distance. However, this means that there is a restriction on the inter-channel distance, and there is a problem when it is necessary to arrange multiple antenna pairs (transmission channels) in a narrow space.

As another countermeasure against interference, for example, as shown in (2) of FIG. 2B, a structure may be used which obstructs electric wave propagation between the transmitting (receiving) antennas. As shown in (3) to (6) of FIG. 2B, the confinement structure, such as the dielectric transmission path 9A or the hollow waveguide 9L, may be used to shorten the inter-channel distance. However, these methods have a problem regarding an increase in cost compared to the free-space transmission path 9B.

[Principle of Countermeasure Against Problem]

In the radio transmission system 1 of this embodiment, when multiplex transmission is realized through space division multiplex, even when the millimeter-wave signal transmission path 9 is the free-space transmission path 9B, a system is suggested which is capable of relaxing the degree of demand for the countermeasure against interference. If "the degree of demand for the countermeasure against interference is relaxed", this means that it is possible to shorten the inter-channel distance with no millimeter wave shield body MX, or it is possible to reduce the countermeasure against interference.

Although the basic concept is shown in FIG. 1A, as shown in FIG. 6B, MIMO processing sections 601 and 602 are provided on the transmission side to take the countermeasure against interference from a viewpoint of baseband signal processing, narrowing the antenna interval.

The MIMO processing sections 601 and 602 are an example of a transfer characteristic correction section which, for each of a plurality of transmission-target signals corresponding to a plurality of antennas 136 (transmitting antenna), performs a correction operation based on the transfer characteristic of the millimeter-wave signal transmission path 9 (transmission space) between the antenna 136 and the antenna 236 (receiving antenna). The transfer characteristic is expressed by a channel matrix, and as the correction operation, an inverse matrix operation is performed for the transmission-target signal of each channel.

The intrinsic meaning of the correction operation (inverse matrix operation) resides in transmission with the amount of transfer characteristic corrected in advance and allowing the reception side to receive a transmission-target signal with no effect of the transfer characteristic. The component of an unnecessary signal received by the antenna 236 is completely cancelled, and only the signal component based on the desired signal is input to the demodulation functional section 8400.

MIMO processing in the MIMO processing sections 601 and 602 of this embodiment has a feature in that MIMO processing is performed only for a direct wave between transmission and reception in each antenna. This is significantly different from signal processing in which, during the case of MIMO processing in normal inter-instrument or in-housing radio transmission, electric waves transmitted from the transmission side are reflected and diffracted due to the components in the housing or the wall, and, for a countermeasure against multi-path when the same electric waves from a plurality of paths reach the reception side, a single receiving antenna handles a plurality of received signals including a reflected wave through a path different from a direct wave from the same transmitting antenna.

This is because a millimeter wave (or microwave) having a comparatively short wavelength is used in radio signal transmission in the instrument or between the instruments, and no obstacle which substantially interferes with radio transmission may exist in the space where the millimeter-wave signal transmission path 9 is formed to which space division multiplex is applied. In this case, it can be said that it is not necessary to take into consideration the effect of the reflected wave.

Under the multi-path environment, if electric waves from a plurality of paths are received on the reception side, the time until the electric waves from the transmission side to the reception side differs between the paths due to the difference in the distance between a plurality of paths. For this reason, a plurality of electric waves with the phase shifted are received on the reception side, and as a result, the waveform of the received signal may be distorted and the signal may not be decoded. As a countermeasure against these problems, it is possible to apply MIMO processing. In this case, the concept of the channel matrix becomes, of course, suitable for the countermeasure against multi-path.

However, in the MIMO processing of this embodiment, unlike such MIMO processing for the countermeasure against multi-path, the concept of the channel matrix is different from that for the countermeasure against multi-path.

Under the environment in which there are abundant reflected waves, it is easy to solve the inverse matrix of the channel matrix. Meanwhile, under the practical environment in which only direct waves exist and no reflected waves exist, it may be difficult to obtain the inverse matrix of the channel matrix. In this embodiment, the antenna arrangement is restricted to easily obtain the inverse matrix of the channel matrix.

At this time, although the details will be described below, in this embodiment, the antenna arrangement (the interval between the antennas on the transmission side and the reception side) is determined such that the number of multipliers (elements of amplifiers) and adders necessary for the MIMO processing can be reduced, and the MIMO processing on the transmission side is performed according to the antenna arrangement. That is, the antenna arrangement is determined such that the number of times of MIMO processing can be reduced, and the MIMO processing on the transmission side is performed only for the direct waves according to the antenna arrangement.

The necessity for quadrature modulation in the modulation functional section, the demodulation method (injection locking scheme, or envelope detection or square-law detection), and the like depend on the above relationship.

In any case, the MIMO processing is applied to the transmission side to relax the demand for the countermeasure against interference when the free-space transmission path 9B is used. The common carrier frequency is used in the channels, such that the MIMO processing is performed in the baseband on the transmission side. The antenna arrangement is restricted to reduce the amount of MIMO processing (the amount of inverse matrix operation).

Although in the embodiments described below, the common carrier frequency is used in the channels, this is not indispensable. It should suffice that the carrier frequencies of the channels are at least synchronized. As the basic concept of space division multiplex, usually, the frequencies of the carrier signals are in common (identical). If the frequencies of the transmission-side carrier signals are in common, the effect of the carrier frequency in each channel is reliably identical, performing the MIMO processing in the baseband region reliably and efficiently. When the carrier frequency differs between the channels, on the reception side, it is necessary to provide a countermeasure, for example, a demodulation circuit or a frequency selection filter corresponding to each carrier frequency has to be provided for each channel, leading to an increase in the system scale. From this viewpoint, it is significantly advantageous that the carrier frequencies of the channels are in common.

The MIMO processing is generally accompanied by a complex number operation (or corresponding processing), causing an increase in the circuit scale. In contrast, the antenna arrangement is restricted focusing on the point that only the direct waves will be subjected to processing, and signal processing is performed according to the antenna arrangement, reducing the amount of MIMO processing (the amount of inverse matrix operation).

When the configuration of the first example is used, the transmission side has a single-chip configuration, thus the modulation functional section 8300 in the transmission-side signal creation section 110 does not necessarily include the transmission-side local oscillation section 8304 by system. The above configuration is available to apply the same mechanism as a countermeasure for reduction in the number of injection locking circuits described below. That is, the transmission-side local oscillation section 8304 may be provided only for a single system, and in the remaining systems, frequency conversion (modulation) may be performed with the carrier signal created by the transmission-side local oscillation section 8304.

In the first example shown in (1) of FIG. 6B, with regard to the N systems, the transmission side has a single-chip configuration, and the reception side has a configuration such that the semiconductor chip 203 which accommodates the demodulation functional section 8400 (DEMOD) is used by system (1-to-N configuration). However, this is not necessarily provided when the MIMO processing is applied to the transmission side.

For example, in a second example shown in (2) of FIG. 6B, the transmission side has a single-chip configuration, and the reception side also has a single-chip configuration, that is, a 1-to-1 configuration is made. When the configuration of the second example is used, the reception side has a single-chip configuration. Thus, the demodulation functional section 8400 in the reception-side signal creation section 220 is not necessarily provided with the reception-side local oscillation section 8404 by system. The above configuration is available when the same mechanism as the countermeasure for reduction in the number of injection locking circuits described below is applied. That is, the reception-side local oscillation section 8404 may be provided only for a single system, and in the remaining systems, the received signal may be demodulated through synchronous detection with the reproduction carrier signal created by the reception-side local oscillation section 8404.

In a third example shown in (3) of FIG. 6B, the reception side has a single-chip configuration, and the transmission side has a configuration (N-to-1 configuration) such that different chips are used for the systems. In a fourth example shown in (4) of FIG. 6B, the transmission side has a configuration such that different chips are used for the systems, and the reception side also has a configuration such that different chips are used for the systems (N-to-N configuration). In the third example or the fourth example, the MIMO processing section 601 is provided between the modulation functional section 8300 (MOD) and the parallel-serial conversion section 8114 of each channel so as to be shared by all the systems.

<Relationship Between Multichanneling and Injection Locking>

Figure 7:
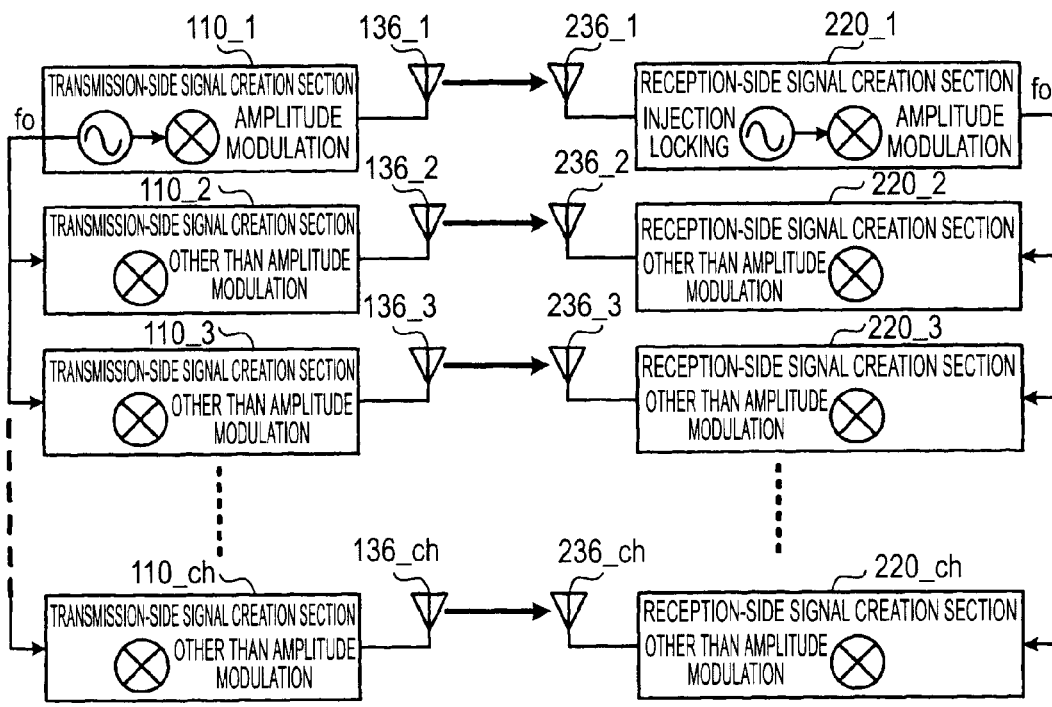
FIG. 7 is a diagram illustrating a basic mechanism for reduction in a circuit scale in regard to the relationship between multichanneling and injection locking.
Figure 7:
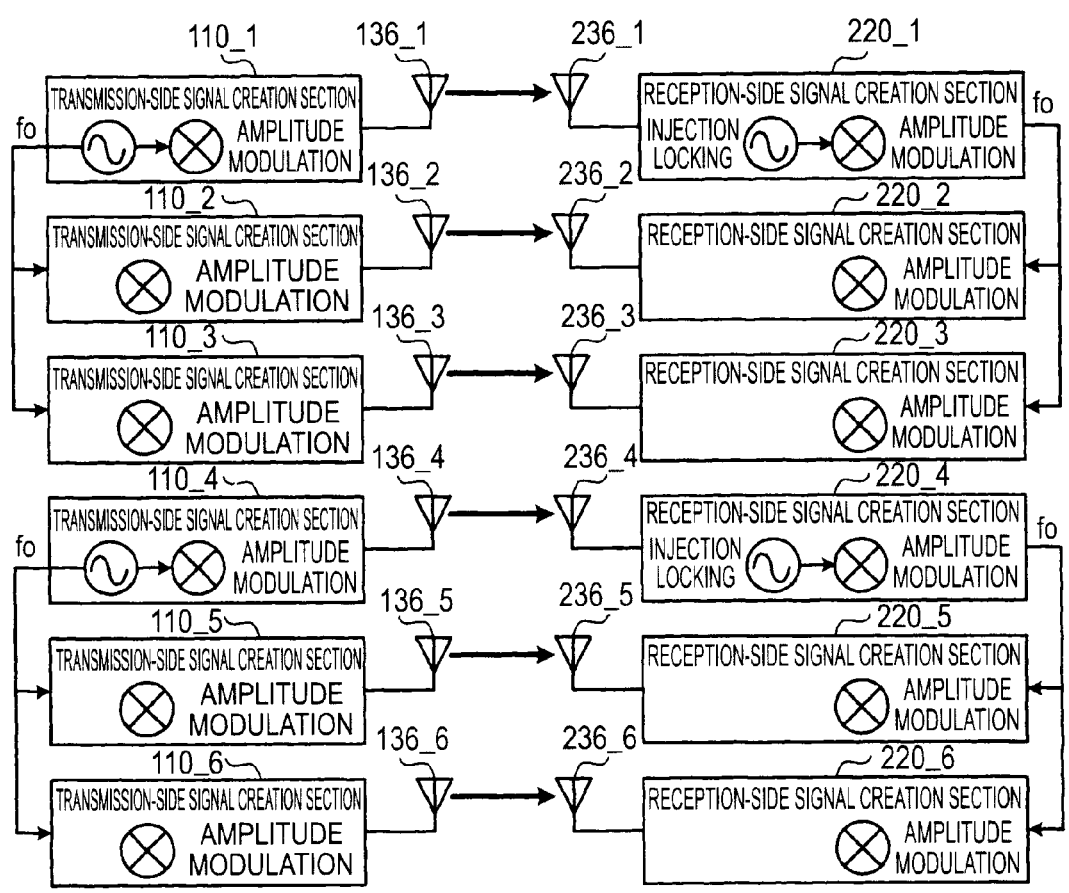

FIG. 7 is a diagram illustrating a basic mechanism for reduction in a circuit scale in regard to the relationship between multichanneling and injection locking.

In realizing multiplex transmission (multichanneling), there is another problem in that, when multichanneling is realized by using the injection locking scheme, in this state, the injection locking circuit has to be prepared by channel on the reception side.

In the radio transmission system 1 of this embodiment, a system may be constituted such that, when there are multiple systems on the reception side with the application of MIMO processing, preferably, with the use of the injection locking scheme, even when the injection locking circuit is not prepared by system, no trouble occurs. With regard to the basic concept of the above method, as shown in (1) of FIG. 7, in order to reduce the number of injection locking circuits on the reception side, at least one system does not use the injection locking scheme, instead of all the systems using the injection locking scheme. In the systems where the injection locking scheme is not used, modulation or demodulation is performed by using the carrier signal synchronized with the carrier signal created by each of the local oscillation sections 8304 and 8404 (synchronous detection is performed on the reception side).

Although a single-chip configuration is preferably made such that the transmission-side signal creation sections 110 are accommodated in the same chip, this is not indispensable. Similarly, although a single-chip configuration is preferably made such that the reception-side signal creation sections 220 are accommodated in the same chip, this is not indispensable. Meanwhile, when the wiring length for the carrier signal fo is taken into consideration, the transmission side and the reception-side preferably have a single-chip configuration.

(2) of FIG. 7 is a diagram illustrating a modification of the configuration shown in (1) of FIG. 7. This modification has a feature in that, "although the injection locking scheme is not prepared by system on the reception side, and the injection locking circuit has multiple systems, instead of a single system. Referring to (1) of FIG. 7, although, when the reception side has multiple systems, only one system corresponds to injection locking, and all the remaining systems perform synchronous detection on the basis of the reproduction carrier signal acquired through injection locking in one system, this is not indispensable.

In summary, configuration may be made such that the number of systems having an injection locking circuit is smaller than the number of systems on the reception-side, and with regard to the systems having no injection locking circuit, synchronous detection is performed on the basis of the reproduction carrier signal acquired through injection locking. That is, when the number of systems on the reception-side is P and the number of systems having an injection locking circuit is Q, the system configuration may be made so as to satisfies the relationship P>Q, and with regard to the "P-Q" systems, synchronous detection may be performed on the basis of the reproduction carrier signal acquired through injection locking. In this case, a system is made such that, "when the injection locking scheme is used and the reception side has multiple systems, the injection locking circuit is not provided by system".

For example, in the configuration shown in (2) of FIG. 7, six channels are divided by three channels. Then, in the first to third channels (systems with reference numerals _1 to _3), only one system (a system with reference numeral _1) corresponds to injection locking, and in the fourth to sixth channels (systems with reference numerals _4 to _6), only one system (a system with reference numeral _4) corresponds to injection locking.

In this example, preferably, a single-chip configuration is made such that the transmission-side signal creation sections 110 of the first to third channels on the reception side are accommodated in the same chip, and a single-chip configuration is made such that the transmission-side signal creation sections 110 of the fourth to sixth channels on the reception side are accommodated in the same chip. With regard to the corresponding reception side, preferably, a single-chip configuration is made such that the reception-side signal creation section 220 of the first to third channels are accommodated in the same chip, and a single-chip configuration is made such that the reception-side signal creation sections 220 of the fourth to sixth channels are accommodated in the same chip. Of course, this is not indispensable.

From a viewpoint that the number of systems having the injection locking circuit is smaller than the total number of channels to realize the compact system configuration, the optimum configuration is made such that only one system has the injection locking circuit. However, when the wiring length for the reproduction carrier signal for synchronous detection is added on the basis of the reproduction carrier signal acquired through injection locking in other systems, the configuration such that only one system has the injection locking circuit is not necessarily appropriate in terms of layout. In such a case, the configuration shown in (2) of FIG. 7 is effective.

<Relationship Between Multichanneling and Necessary Transmission Power>

Figure 8A:
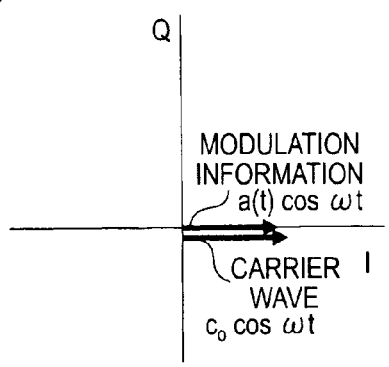
FIG. 8A is a diagram illustrating an amplitude modulated signal in an ASK scheme when a carrier signal and a reference carrier signal are in phase with the same frequency.
Figure 8A:
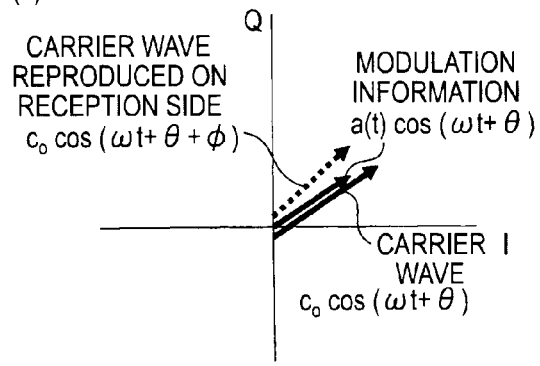
Figure 8A:
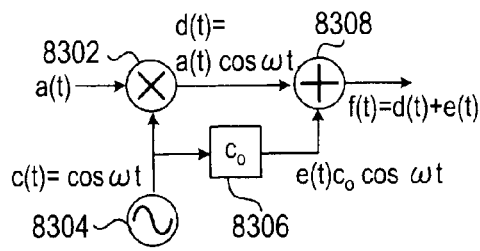
Figure 8A:
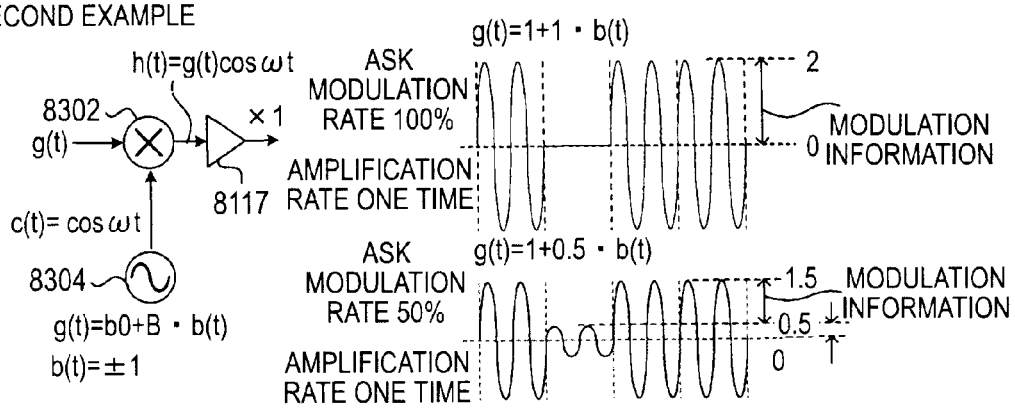
Figure 8A:
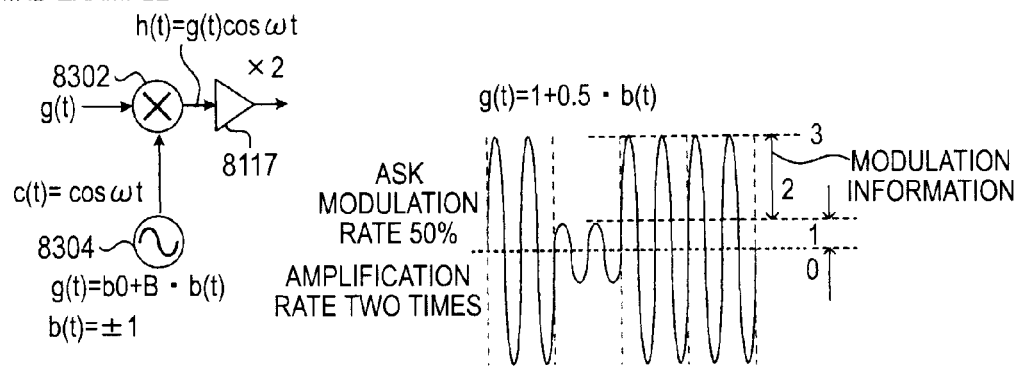
Figure 8B:
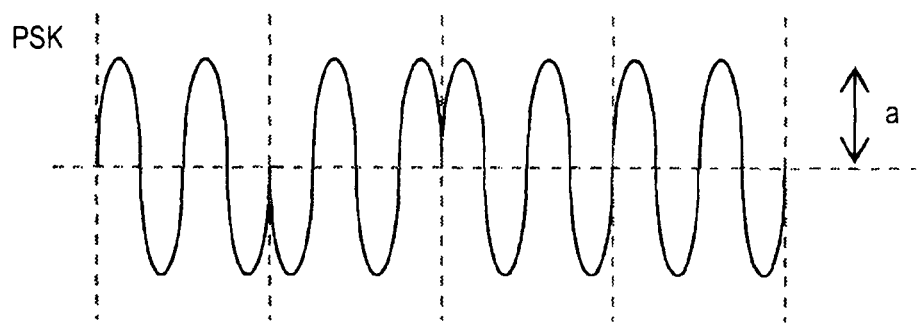
FIG. 8B is a diagram illustrating the relationship between transmission power of an ASK scheme and transmission power of a PSK scheme.
Figure 8B:
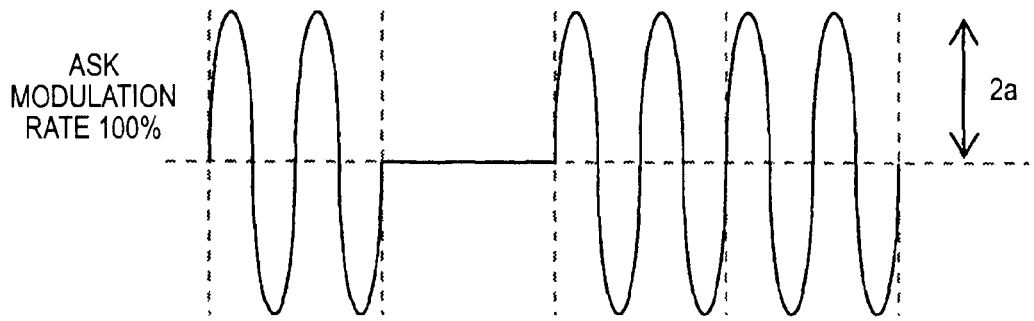
Figure 8B:
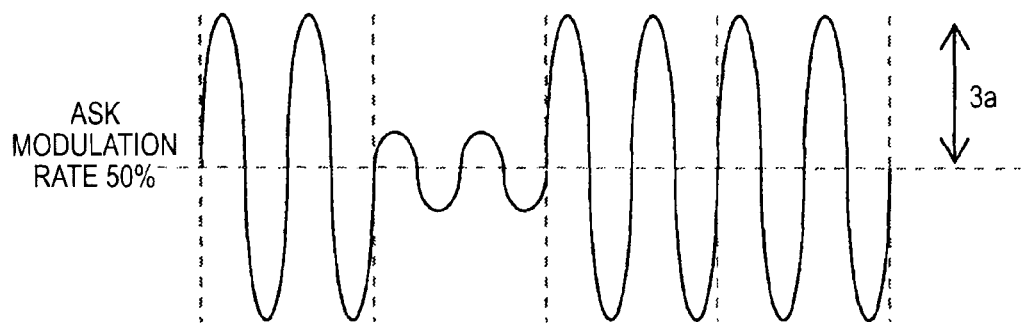
Figure 8C:
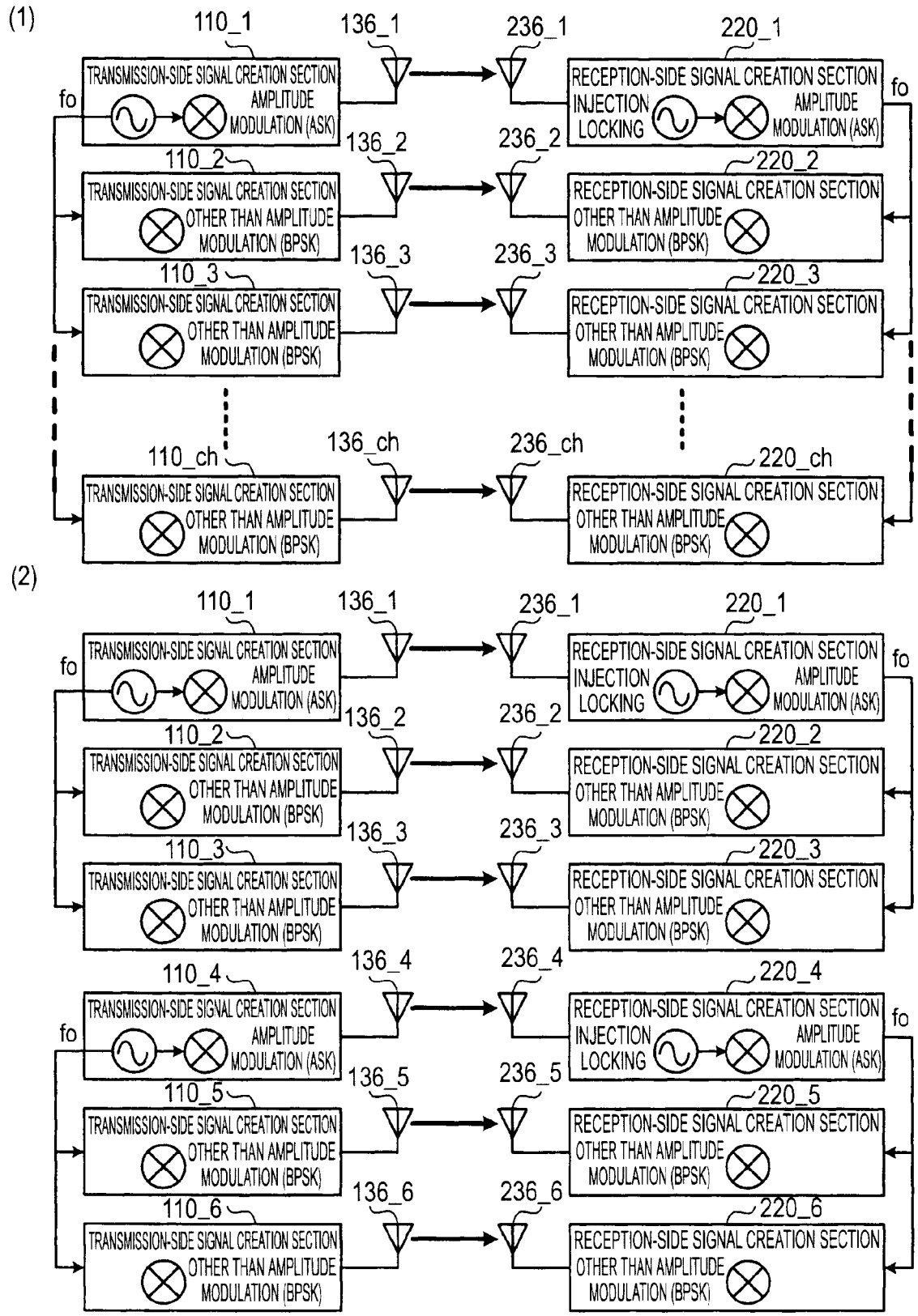
FIG. 8C is a diagram showing a basic mechanism for reduction in transmission power when multiplex transmission is performed.

FIGS. 8A to 8C are diagrams illustrating the relationship between multichanneling and necessary transmission power. FIG. 8A is a diagram illustrating an amplitude modulated signal in an ASK scheme when a carrier signal and a reference carrier signal are in phase with the same frequency. FIG. 8B is a diagram illustrating the relationship between transmission power of an ASK scheme and transmission power of a PSK scheme. FIG. 8C is a diagram showing a basic mechanism for reduction in transmission power when multiplex transmission is performed.

In realizing multiplex transmission (multichanneling), there is another problem in that necessary transmission power increases. For example, as will be understood from the above description of injection locking, injection locking is effective for in-instrument or inter-instrument radio signal transmission. Further, when the injection locking scheme is used, from a viewpoint of ease of locking on the reception side, an amplitude modulation scheme, such as an ASK scheme, is suitably used as the modulation scheme. For example, if the ASK scheme is used for injection locking, no filter has to be provided, simplifying the configuration of the receiving circuit and reducing deterioration of the reception characteristic. However, the amplitude modulation scheme (the ASK scheme is an example of the amplitude modulation scheme) has transmission power higher than other modulation schemes. Hereinafter, this will be described with reference to the drawings.

[For Amplitude Modulated Signal]

In the ASK scheme, the amplitude of the carrier signal is modulated with the transmission-target signal. It should suffice that one of the I-phase signal and the Q-phase signal is used on the phase plane expressed by the I axis and the Q axis, and the signal amplitude of the modulated signal is in a range of 0 to +F. A case where modulation is performed with two values of 0 and +F is simplest, and when the degree of modulation is 100%, the modulation scheme becomes OOK. "F" is normalized and regarded as "1", thus two-value ASK is realized.

A case is taken into consideration where a signal having the same frequency and phase as the carrier signal used for modulation is used as the reference carrier signal. For example, as shown in (1) of FIG. 8A, information can be transmission while being placed on the I axis, and the reference carrier signal is in phase with information (I axis).

When the carrier signal used for modulation and the reference carrier signal are in phase, for example, the following method may be used.

A first example shown in (2) of FIG. 8A is an example of a method which applies the basic configuration 1 shown in (1) of FIG. 4. A transmission-target signal a (t) and a carrier signal $c(t)=\cos \omega$ are supplied to the frequency mixing section 8302. The frequency mixing section 8302 performs amplitude modulation with the carrier wave being suppressed by using a balanced modulation circuit or a double-balanced modulation circuit to create $d(t)=a(t)\cos \omega t$ and to supply $d(t)=a(t)\cos \omega t$ to the signal synthesis section 8308. The transmission-target signal a(t) has two values of 0 and +1. The reference carrier signal processing section 8306 adjusts the amplitude of the carrier signal $c(t)=\cos \omega t$ output from the transmission-side local oscillation section 8304 to Co (in a range of 0 to 1) and supplies the resultant signal to the signal synthesis section 8308 as a reference carrier signal $e(t)=Co \cos \omega t$. The signal synthesis section 8308 performs signal synthesis, that is, $d(t)+e(t)$, to create a transmitted signal f(t). Co=0 is equivalent to 100% modulation.

A second example shown in (3) of FIG. 8A and a third example shown in (4) of FIG. 8A is an example of a method which applies the basic configuration 3 shown in (3) of FIG. 4. For the frequency mixing section 8302, a circuit configuration is used such that carrier wave suppression is not applied, and amplitude modulation is performed with a signal g(t) obtained by adding a direct-current component b0 to the transmission-target signal b(t) to create $h(t)=g(t)\cos \omega t$. The transmission-target signal b(t) has two values of −1 and +1.

With regard to the degree of modulation (modulation rate), there are a concept which takes action with a value Ma=Vs/Vc when the amplitude of the carrier signal is Vc and the amplitude of the transmission-target signal is Vs, and a concept which takes action with a value $M=(x-y)/(x+y)$ when the maximum amplitude is x and the minimum amplitude is y as the result of amplitude modulate (amplitude modulated wave). In this specification, it is assumed that the former is used, and the amplitude B of the transmission-target signal b(t) corresponds to the degree of modulation (modulation rate).

In the second example shown in (3) of FIG. 8A, the direct-current component b0 is constant (=1), and the amplitude (amplitude in the period of b(t)=−1) of the reference carrier signal is adjusted by controlling the degree B of modulation in a range of 0 to 1. It is assumed that the amplification rate of the amplification section 8117 is one time.

In the third example shown in (4) of FIG. 8A, a case is described where the same signal quality as at the time of 100% modulation is obtained by adjusting the amplification rate of the amplification section 8117 with respect to the state at the time of 50% modulation in the second example shown in (3) of FIG. 8A. In the second example, the difference between the amplitude in the period of b(t)=−1 and the amplitude in the period of b(t)=+1 is modulation information. While the modulation information is 2.0 at the time of 100% modulation, the modulation information is 1.0 at the time of 50% modulation. In this state, the signal quality at the time of 50% modulation decreases less than that at the time of 100% modulation. In order that the signal quality at the time of 50% modulation is identical to that at the time of 100% modulation, it should suffice that the amplification rate of the amplification section 8117 are two times. In this case, the amplitude in the period of b(t)=−1 becomes 1.0, and the amplitude in the period of b(t)=+1 becomes 3.0.

The waveform state of the third example shown in (4) of FIG. 8A can be created by setting the degree B of modulation to "1" and controlling the direct-current component b0 in a range of 1 to 2 (in this case, set to "2") to adjust the amplitude (amplitude in the period of b(t)=−1) of the reference carrier signal even when the amplification rate of the amplification section 8117 is one time in the second example (or the third example). In terms of the above-described way of handling of the degree of modulation, this mode may be regarded as the degree of modulation being 100%.

In any of the first to third examples, when information is transmitted while being placed only on the I axis, the reference carrier signal is in phase with the information (I axis). In this case, as will be understood from (5) of FIG. 8A, a direct-current offset component occurs on the reception side.

For example, in the first example, if the amplitude of the transmission-target signal a(t) is set to 0 and +1 with the I axis as a real number component and the Q axis as an imaginary number component, the received signal point moves to 0 and +1 on the I axis. If the reference carrier wave is placed on the I axis, the signal point becomes "0+Co" and "+1+Co", and as a result, the direct-current component for +Co is placed.

In the second example or the third example, if the transmission-target signal b(t) is set to −1 and +1, the received signal point moves to −1 and +1 on the I axis. If the reference carrier wave is placed on the I axis, the signal point becomes "−1+Co" and "+1+Co", and as a result, the direct-current component for +Co is placed. When BPSK is applied, the modulation-target signal is processed through signal processing in advance such that the reference carrier wave is placed on the I axis, and then modulation is performed. This concept is equivalent to ASK.

In order to solve this problem, as shown in FIG. 5A, the direct-current component suppression section 8407 is provided on the reception side to control the direct-current offset component. However, there is a problem in that individual adjustment has to be made in accordance with the size of the direct-current offset due to a different variation by instrument, and there is the effect of a temperature drift.

As a method which solves this problem without providing the direct-current component suppression section 8407 on the reception side, the reference carrier signal may be placed on a phase axis different from (preferably, a phase axis most away from) a phase axis (the phase axis of the modulated signal) on which transmission information is placed, and then transmitted.

For example, in the ASK mode in which transmission information is placed on one of the I axis and the Q axis, on the transmission side, it is possible to orthogonalize the reference carrier signal and the modulation information. That is, one of the I axis and the Q axis is used, instead of two-axis modulation of the I-phase signal and the Q-phase signal, no modulation is performed for the other axis, and the non-modulated signal is used as the reference carrier signal.

The relationship between the transmission information (modulation) and the reference carrier signal, and the I axis and the Q axis may be reversed. For example, on the transmission side, the transmission information may be placed on the I-axis, and the reference carrier signal may be placed on the Q axis. To the contrary, the transmission information may be placed on the Q axis, and the reference carrier signal may be placed on the I axis.

[For Transmission Power]

Meanwhile, in the amplitude modulation scheme, there is a problem in that transmission power is higher than other modulation schemes, regardless of the relationship between the modulation axis of the axis of the signal of the reference carrier signal. In achieving multichanneling (in performing multiplex transmission), an increase in necessary transmission power noticeably appears, and there is demand for resolution of the problem.

For example, FIG. 8B shows examples of modulated signals of the ASK scheme (100% modulation/50% modulation) and the BPSK scheme and the relationship with necessary transmission power.

As shown in (1) of FIG. 8B, when the BPSK amplitude is a, transmission power necessary for obtaining the same distance (same ber) between the signal points is expressed by Expression (B-1). In contrast, in order to obtain the same signal quality as the BPSK, in the ASK scheme (100% modulation), as shown in (2) of FIG. 8B, the maximum amplitude becomes 2a, and necessary transmission power is expressed by Expression (B-2). Thus, in the ASK scheme (100% modulation), transmission power has to be two times higher than in the BPSK scheme.

Similarly, in the ASK scheme (50% modulation), as shown in (3) of FIG. 8B, the amount for the carrier wave in the maximum amplitude of 3a becomes a, and necessary transmission power is expressed by Expression (B-3). Thus, in the ASK scheme (50% modulation), transmission power has to be five times higher than in the BPSK scheme.

As will be understood from this, in order to obtain the same signal quality, in the ASK, necessary transmission power increases higher than in the BPSK, regardless of the degree of modulation. This causes a significant problem when the number of channels increases through multiplex transmission.

If the ASK is applied to all systems and the number of channels increases through multiplex transmission, the difference in necessary transmission power increases compared to a case where the BPSK scheme is applied to all systems and the number of channels increases through multiplex transmission. In particular, if the modulation rate is low, the power difference noticeably appears.

Although the ASK (100% and 50%) and the BPSK are compared with each other, the invention is not limited to BPSK, for another PSK, such as QPSK or 8PSK, or an amplitude phase modulation scheme, such as QAM, in order to obtain the same quality, the amplitude modulation of the ASK or the like has high transmission power. In comparison with the frequency modulation scheme, instead of the phase modulation scheme, the scheme of modulating only amplitude has high transmission power.

Thus, in this embodiment, the reduction in necessary transmission power at the time of multiplex transmission is taken into consideration. With simple speculation from the above description, in order to obtain the same signal quality, the scheme of modulating only amplitude has to have transmission power higher than a scheme other than the scheme of modulating only amplitude. Thus, a scheme other than the scheme of modulating only amplitude for all systems is first taken into consideration. However, from a viewpoint of ease of injection locking, the scheme of modulating only amplitude is advantageous, and it is not preferable to use a scheme other than the scheme of modulating only amplitude.

For this reason, in this embodiment, the scheme of modulating only amplitude and a different scheme are mixed, instead of using a scheme other than the scheme of modulating only amplitude. With regard to a scheme other than the scheme of modulating only amplitude, from a viewpoint that "the same signal quality is obtained", a scheme is used which has transmission power lower than the scheme of modulating only amplitude. As the specific index of signal quality, a known index, such as an error rate, may be used.

As a scheme other than the scheme of modulating only amplitude, there are a scheme of modulating only phase, a scheme of modulating amplitude and phase, and a scheme of modulating only frequency. From a view point of simplicity of the circuit configuration, it is possible to increase the use priority in order of the scheme of modulating only phase, the scheme of modulating amplitude and phase, and the scheme of modulating only frequency. For example, when digital modulation is taken into consideration, PSK, QAM, or the like is preferably used.

For example, as shown in (1) of FIG. 8C, when the injection locking scheme is used and multiple transmission is performed, a single channel uses the scheme (ASK is a representative example) of modulating only amplitude from a viewpoint of ease of injection locking, and the remaining systems use a different modulation scheme (a scheme other than the scheme of modulating only amplitude). In a usual example, a single channel performs transmission through the ASK, and other channels perform transmission through the BPSK having low necessary transmission power. Thus, when multiplex transmission is performed through space division multiplex or frequency division multiplex, it is possible to suppress an increase in necessary transmission power while the injection locking scheme is being used.

Preferably, in order to achieve the reduction in the number of injection locking circuits, injection locking is taken by a single system (or a smaller number of systems than the number of systems on the reception-side), and in the remaining systems, modulation and demodulation are performed by using the carrier signal (in space division multiplex, with the same frequency in an extreme case) synchronized with injection locking. Of course, a combination with a mechanism for the reduction in the number of injection locking circuits is not indispensable, and all the systems on the reception side may use individually the injection locking scheme.

When only the reduction in necessary transmission power is taken into consideration, all the systems may use a system other than the scheme of modulating only amplitude. However, when the injection locking scheme is also used, at least one system may use a the scheme of modulating only amplitude from a viewpoint of ease of injection locking.

(2) of FIG. 8C is a diagram illustrating a modification of (1) of FIG. 8C. This modification has a feature in that, at the time of multiplex transmission, "although amplitude modulation is not performed for all the systems, amplitude modulation is performed for multiple systems, not a single system". Although in (1) of FIG. 8C, at the time of multiplex transmission, only one system uses the amplitude modulation scheme, and all the remaining systems use a scheme other than the amplitude modulation scheme, this is not indispensable.

In summary, it should suffice that the number of channels using the amplitude modulation scheme is smaller than the total number of channels at the time of multiplex transmission, and with regard to the systems not using the amplitude modulation scheme, the phase modulation scheme (for example, PSK) or the amplitude phase modulation scheme (for example, QAM) other than the amplitude modulation scheme is used. That is, when the total number of channels is S, and the number of channels using the amplitude modulation scheme is T, the system configuration may be made so as to satisfy the relationship S>T, and with regard to the "S-T" channels, a modulation scheme other than the amplitude modulation scheme may be used. In this case, a system is constituted such that, "at the time of multiplex transmission, although amplitude modulation is not performed for all the systems, a part of the systems use a modulation scheme (phase modulation, amplitude phase modulation, or the like) having necessary transmission power lower than the amplitude modulation scheme".

For example, in the configuration shown in (2) of FIG. 8C, six channels are divided by three channels. Then, with regard to the first to third channels (systems with reference numerals _1 to _3), only one system (a system with reference numeral _1) uses the ASK scheme and corresponds to injection locking. With regard to the fourth to sixth channels (systems with reference numerals _4 to _6), only one system (a system with reference numeral _4) use the ASK scheme and corresponds to injection locking. With regard to the remaining systems not using the ASK scheme, the BPSK scheme is used which has necessary transmission power lower than the ASK scheme.

In this example, preferably, a single-chip configuration is made such that the transmission-side signal creation sections 110 of first to third channels on the reception side are accommodated in the same chip, and a single-chip configuration is made such that the transmission-side signal creation sections 110 of the fourth to sixth channels on the reception side are accommodated in the same chip. With regard to the corresponding reception side, preferably, a single-chip configuration is made such that the reception-side signal creation section 220 of the first to third channels are accommodated in the same chip, and a single-chip configuration is made such that the reception-side signal creation sections 220 of the fourth to sixth channels are accommodated in the same chip. Of course, this is not indispensable.

From a viewpoint that the number of systems using the amplitude modulation scheme (for example, ASK) having high necessary transmission power is smaller than the total number of channels while the injection locking scheme is applied to reduce in necessary transmission power, the optimum configuration is made such that only one system uses the amplitude modulation scheme. However, when a combination with the injection locking scheme is taken into consideration, and when the wiring length for the reproduction carrier signal for synchronous detection is added on the basis of the reproduction carrier signal acquired through injection locking in other systems, the configuration such that only one system uses the ASK scheme and has the injection locking circuit is not necessarily appropriate in terms of layout. In such a case, the configuration shown in (2) of FIG. 8C is effective.

Hereinafter, the radio transmission system 1 of this embodiment which performs the MIMO processing will be specifically described focusing on the MIMO processing. Unless otherwise noted, for simplification of description, unidirectional communication from the first communication apparatus 100 toward the second communication apparatus 200 will be described. With regard to the chip configuration of the transmission system, as the optimum form, a case will be described where the transmission-side signal creation sections 110 (accommodating the modulation functional section 8300) in the M systems are accommodated in the single semiconductor chip 103. With regard to the reception system, a case will be described where the reception-side signal creation sections 220 (accommodating the demodulation functional section 8400) in the M systems are respectively accommodated in the semiconductor chips 203. That is, unidirectional communication will be described which is performed from the first communication apparatus 100, on which the single semiconductor chip 103 accommodating the transmission-side signal creation sections 110 in the M systems is mounted, toward the second communication apparatus 200, on which the M semiconductor chips 203 each accommodating the reception-side signal creation section 220 in the single system are mounted.

<Outline of MIMO Processing for Application on Transmission Side>

Figure 9A:
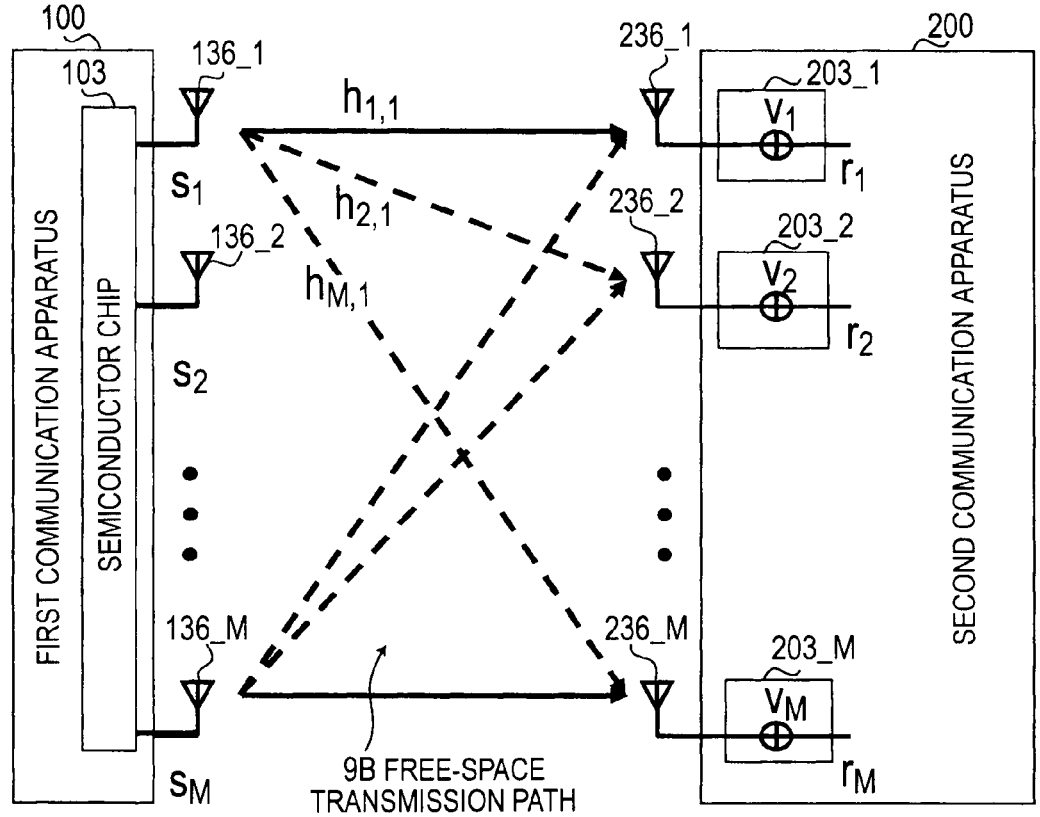
FIG. 9A is a diagram illustrating an operation of MIMO processing for application on a transmission side.
Figure 9A:
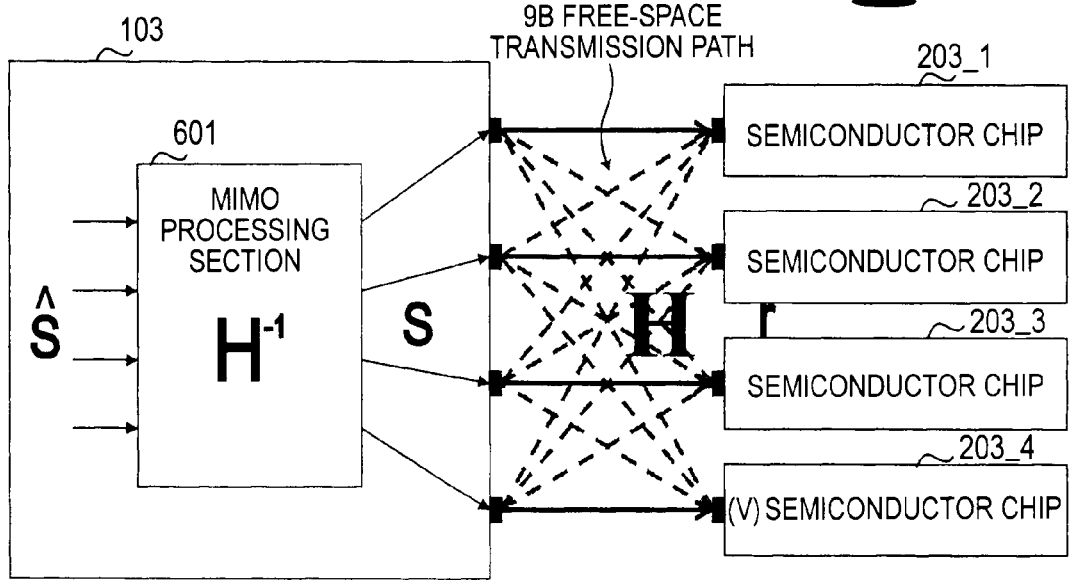
Figure 10A:
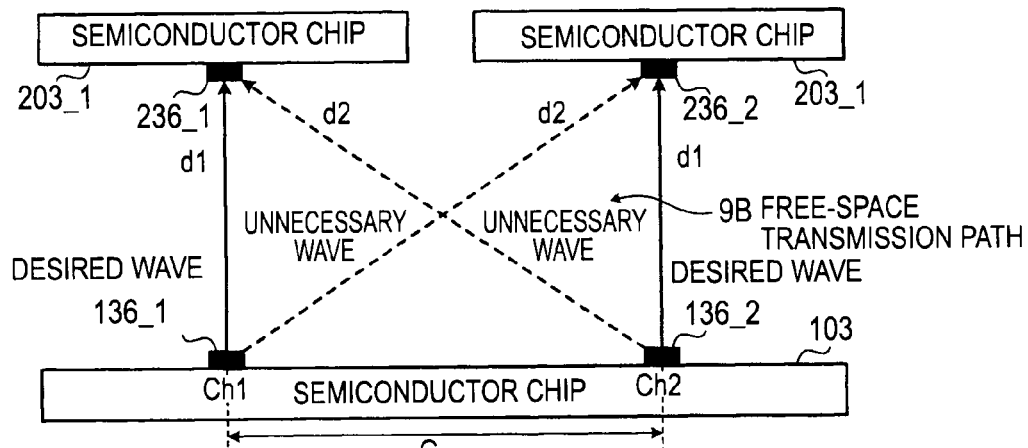
FIG. 10A is a diagram illustrating the basis of MIMO processing on a transmission side in the case of two channels.
Figure 10A:
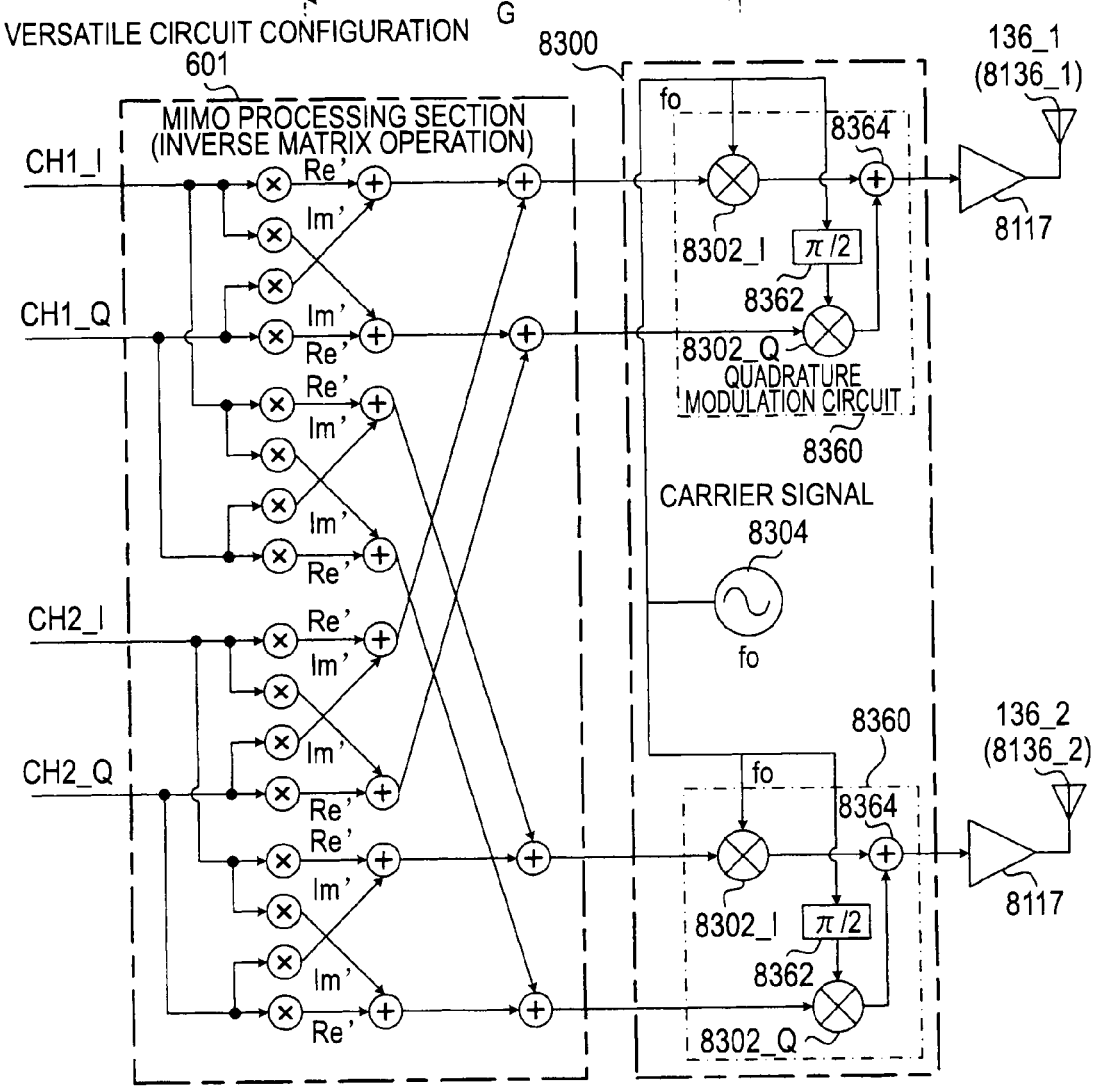
Figure 10B:
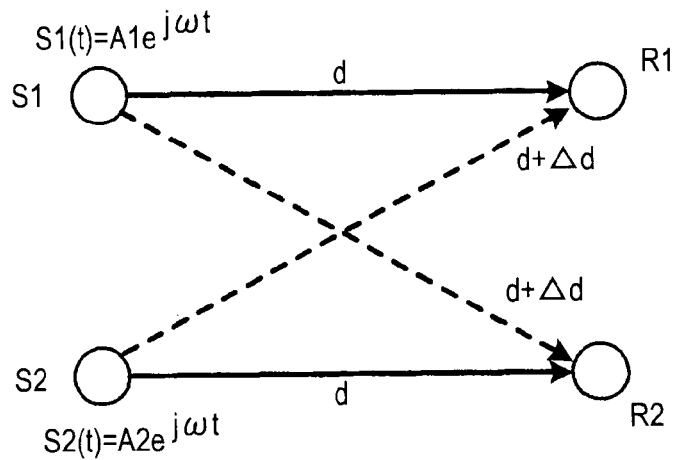
FIG. 10B is a diagram illustrating the relationship between a path difference and a channel matrix in the case of two channels.
Figure 10B:
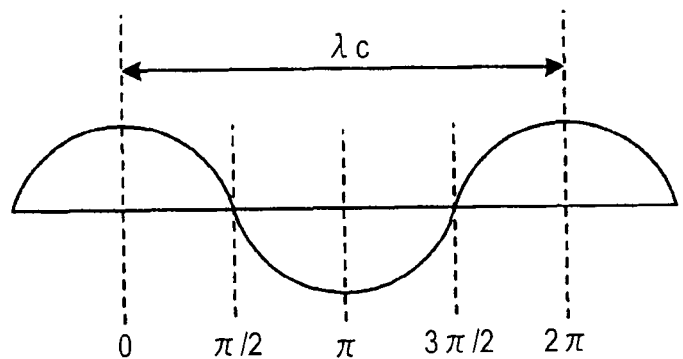
Figure 10B:
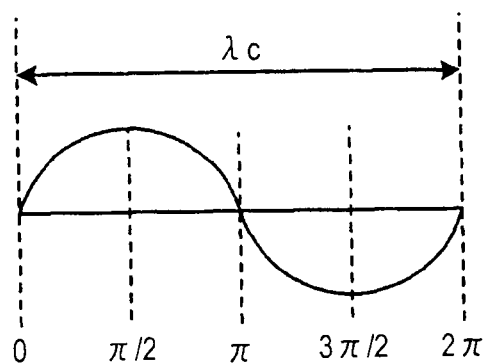
Figure 11A:
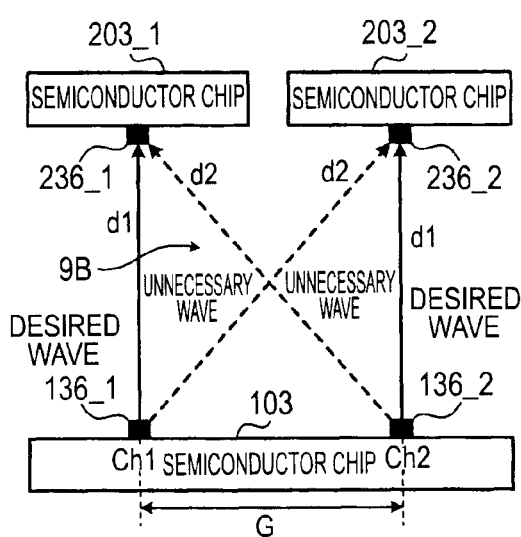
FIG. 11A is a diagram illustrating a first example of the constraints of an antenna arrangement in the case of two channels.
Figure 11A:
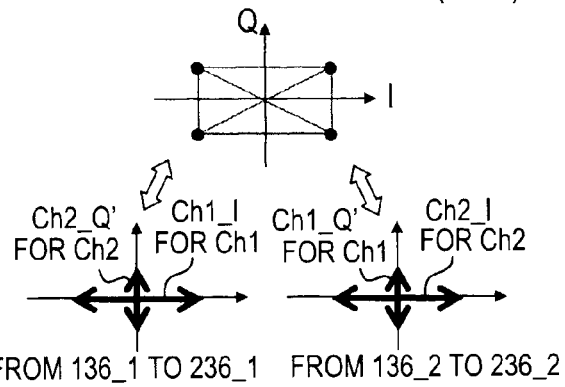
Figure 11A:
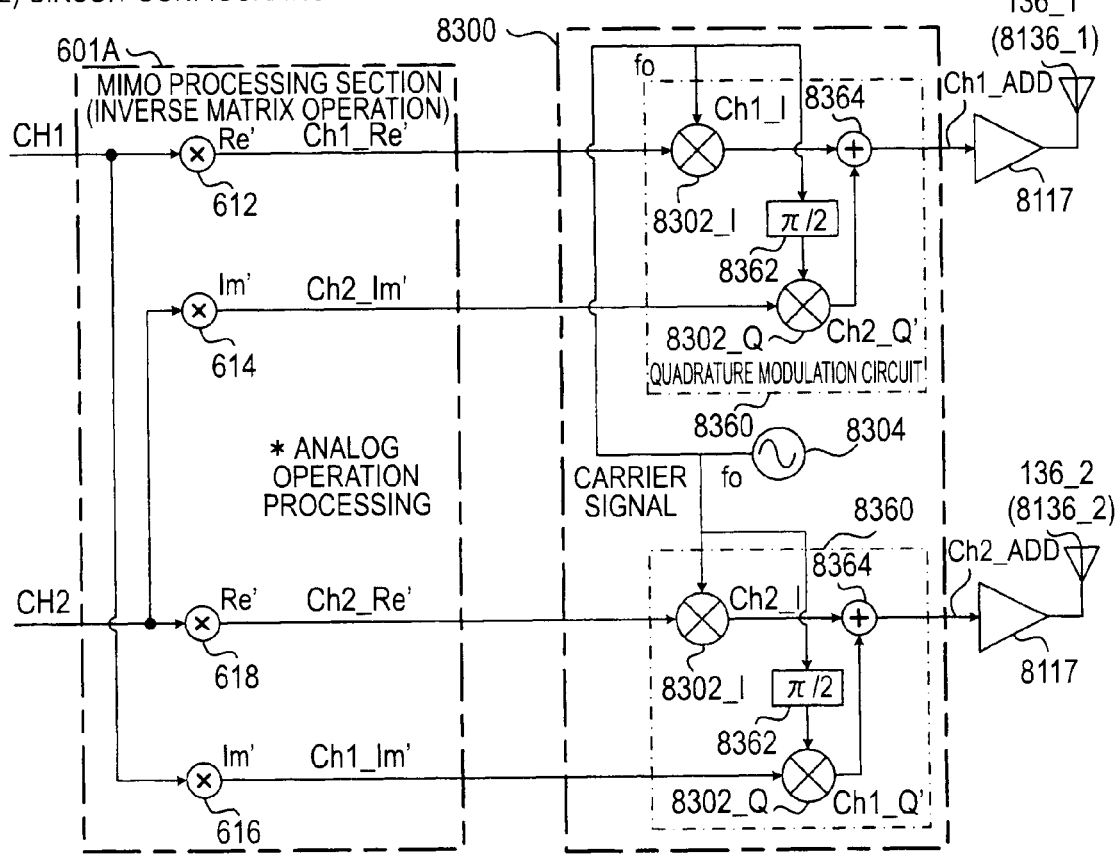
Figure 11B:
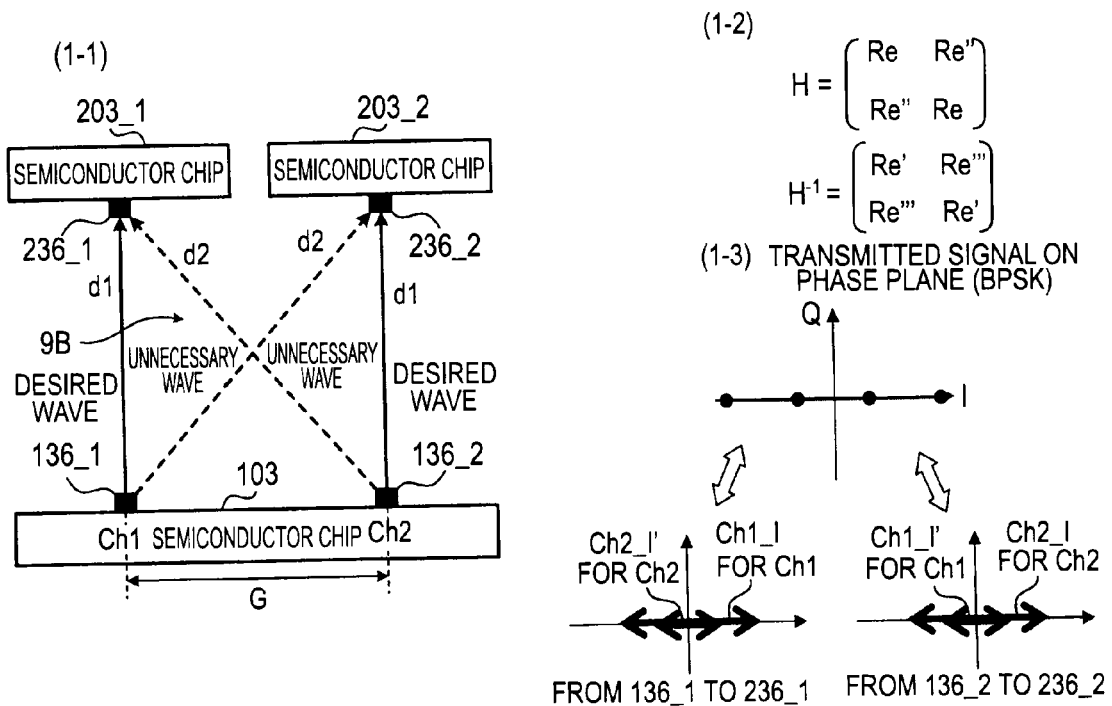
FIG. 11B is a diagram illustrating a second example of the constraints of an antenna arrangement in the case of two channels.
Figure 11B:
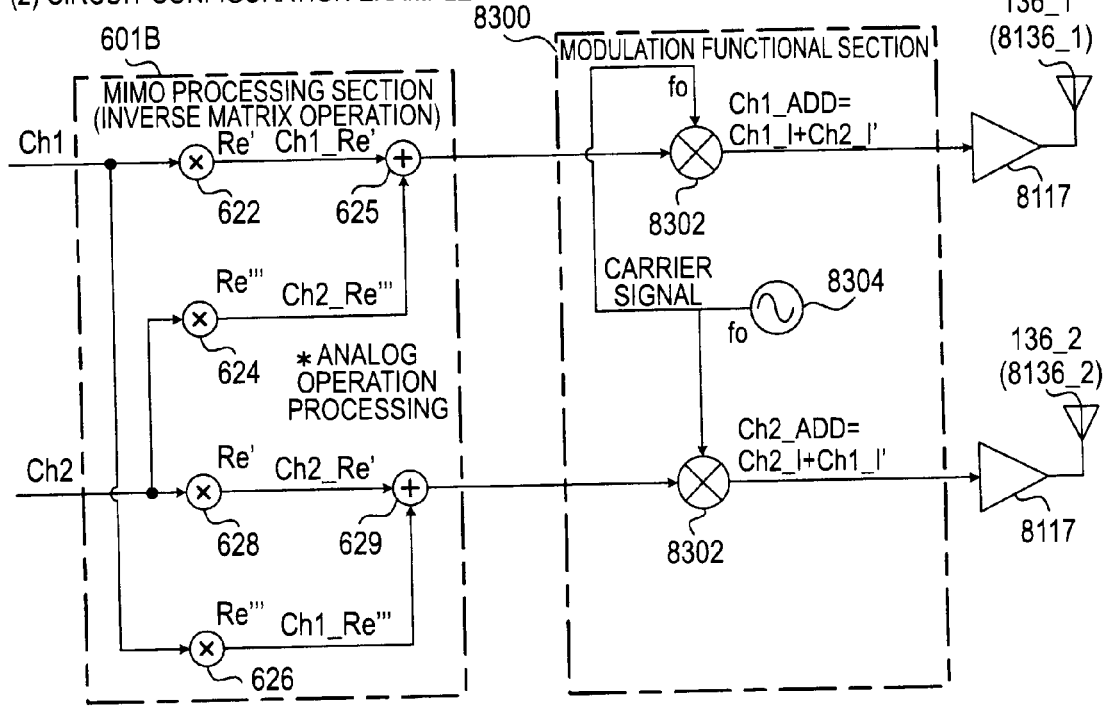
Figure 11C:
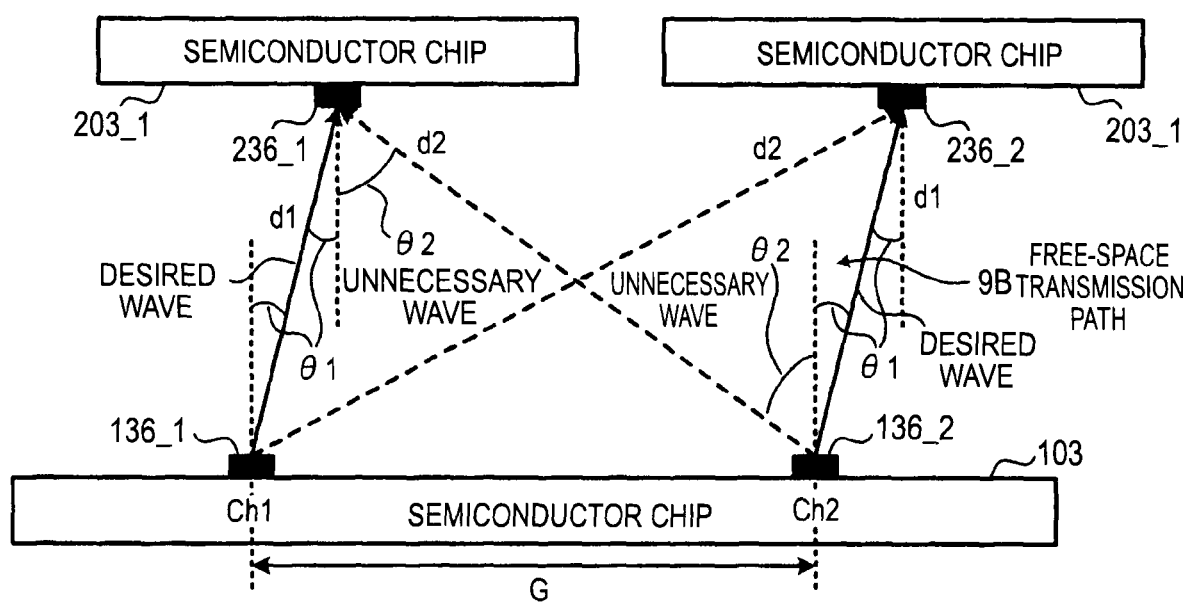
FIG. 11C is a diagram illustrating an adjustment method of a path difference Δd when antennas have phase characteristics depending on directionality.
Figure 12A:
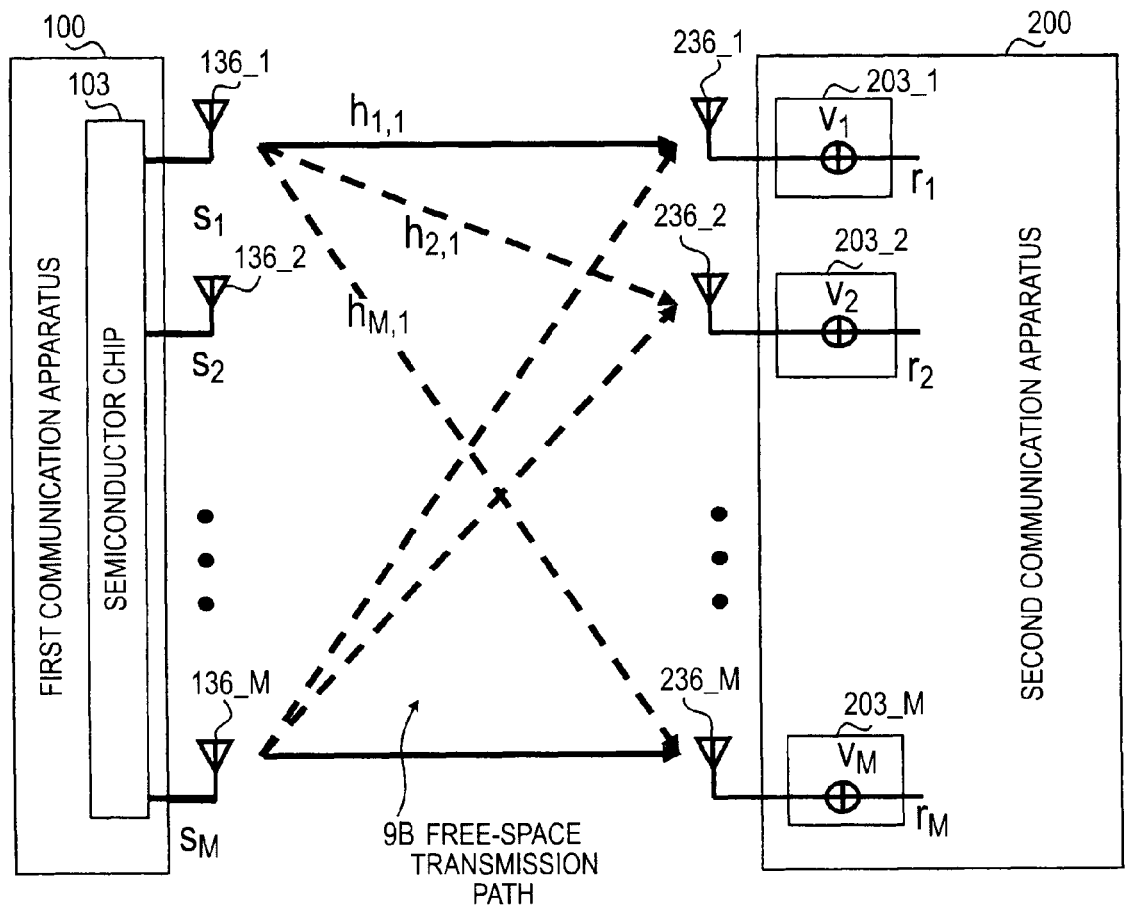
FIG. 12A is a diagram (first view) illustrating an application method of MIMO processing when the number of antenna pairs is equal to or greater than 3.
Figure 12B:
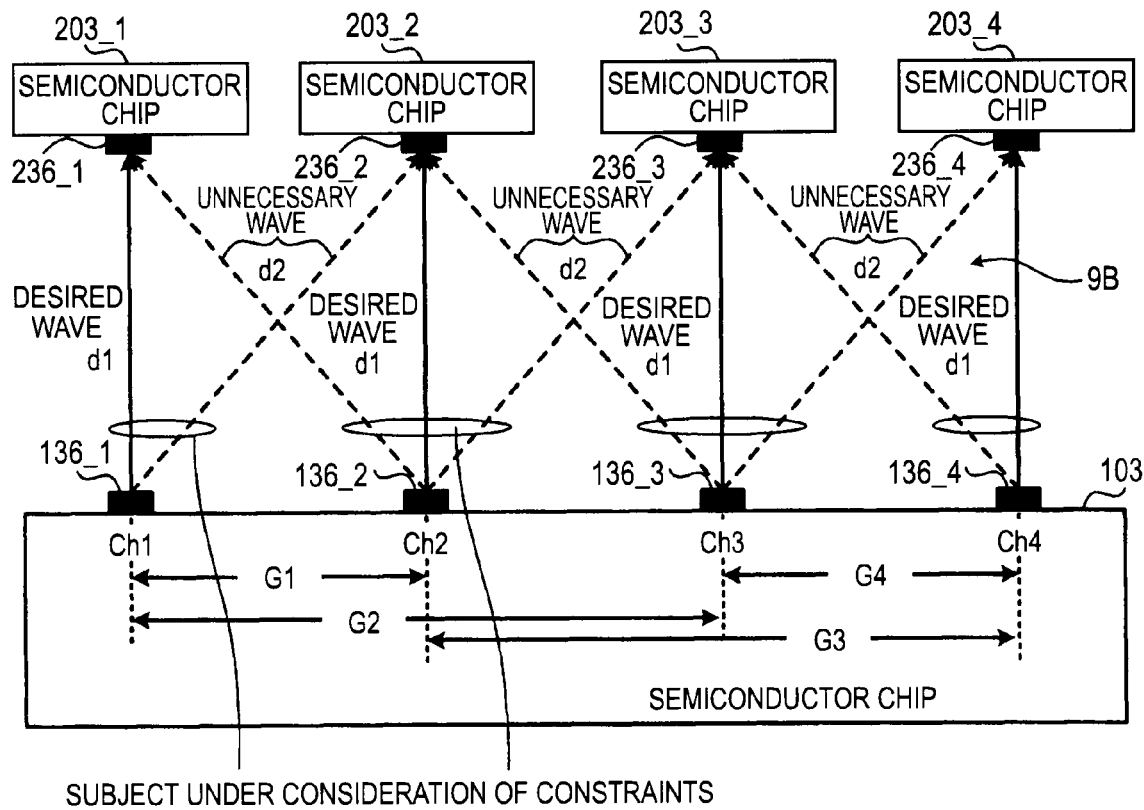
FIG. 12B is a diagram (second view) illustrating an application method of MIMO processing when the number of antenna pairs is equal to or greater than 3.
Figure 12C:
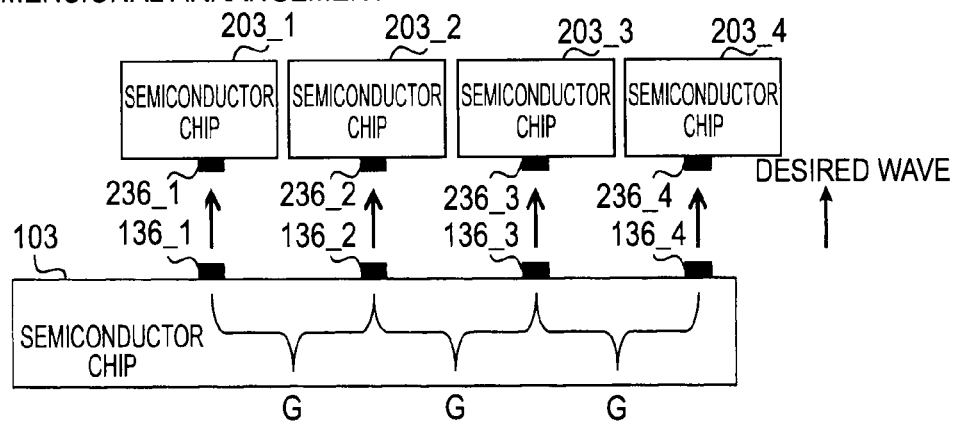
FIG. 12C is a diagram illustrating an application method when transmitting and receiving antennas are arranged in a three-dimensional shape.
Figure 12C:
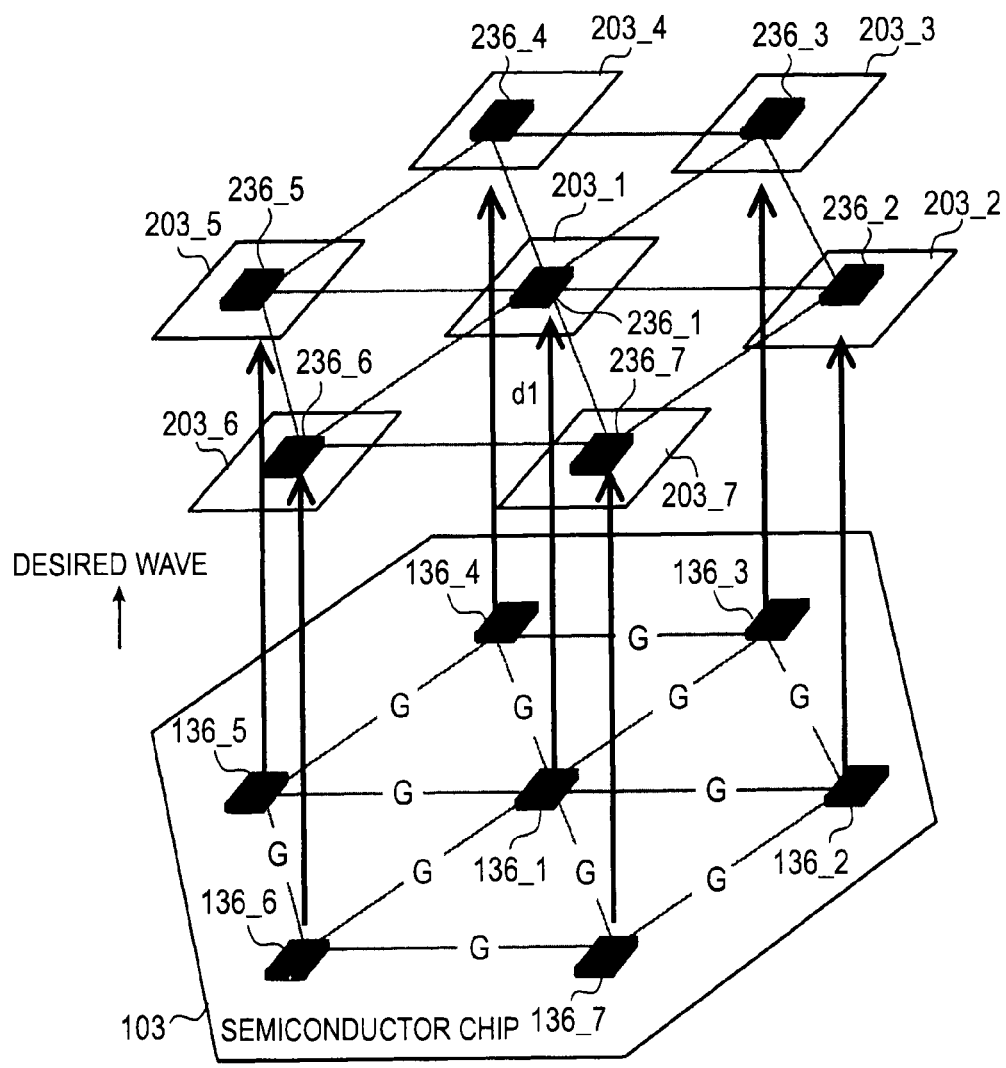
Figure 12D:
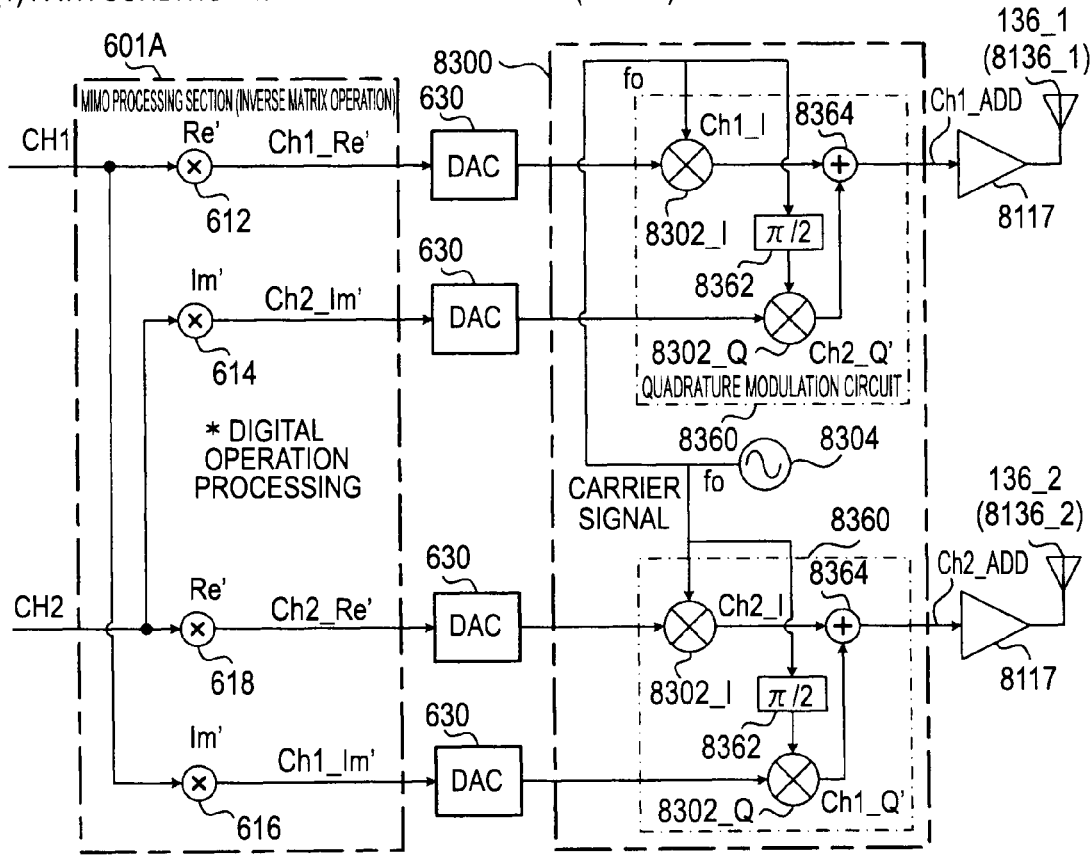
FIG. 12D is a diagram illustrating the basic configuration when MIMO processing on a transmission side is performed through digital processing.
Figure 12D:
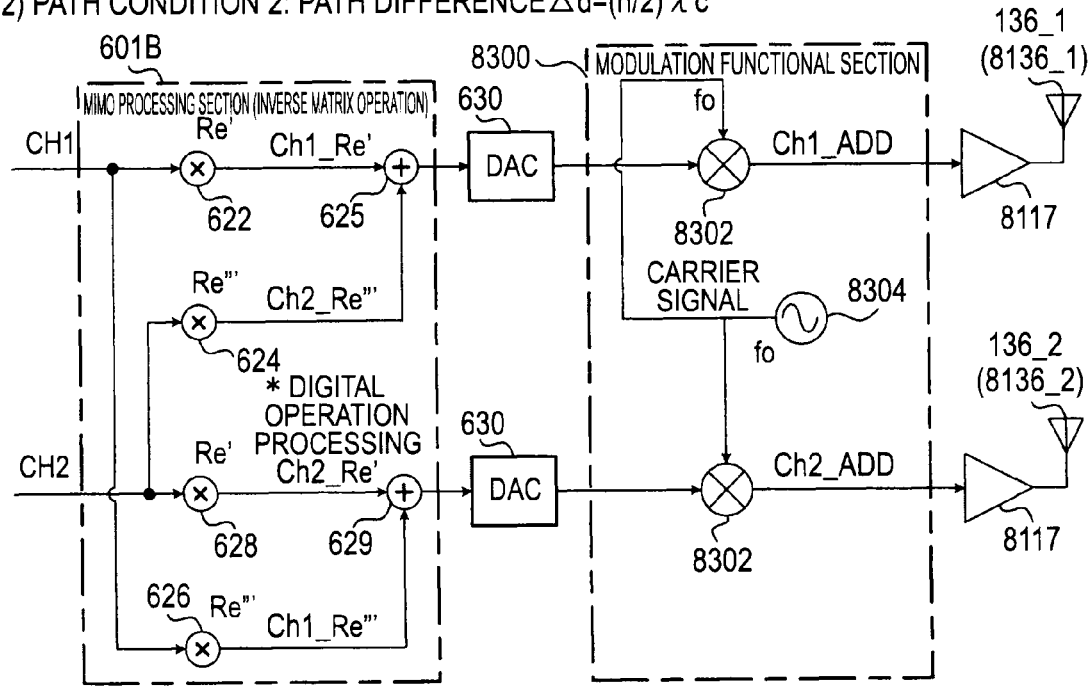

FIGS. 9A to 12D are diagrams illustrating the outline of MIMO processing which is applied on the transmission side. FIG. 9A is a diagram illustrating an operation of MIMO processing for application on a transmission side. FIG. 9B is a diagram illustrating the basis of an operation method of MIMO processing for application on a transmission side. FIG. 10A is a diagram illustrating the basis of MIMO processing on a transmission side in the case of two channels. FIG. 10B is a diagram illustrating the relationship between a path difference and a channel matrix in the case of two channels. FIG. 11A is a diagram illustrating a first example of the constraints of an antenna arrangement in the case of two channels. FIG. 11B is a diagram illustrating a second example of the constraints of an antenna arrangement in the case of two channels. FIG. 11O is a diagram illustrating an adjustment (correction) method of a path difference Δd when antennas have phase characteristics depending on directionality. FIGS. 12A and 12B are diagrams illustrating an application method of MIMO processing when the number of antenna pairs is equal to or greater than 3. FIG. 12C is a diagram illustrating an application method when transmitting and receiving antennas are arranged in a three-dimensional shape. FIG. 12D is a diagram illustrating the basic configuration when MIMO processing on a transmission side is performed through digital processing.

[Operation of MIMO Processing]

FIG. 9A shows the concept of an operation method of MIMO processing which is applied in this embodiment. In the drawing, the number of antennas 136 or 236 are M such that the number of transmission channels in space division multiplex can be M. A millimeter-wave signal is transmitted from each antenna 136 on the transmission-side toward the antenna 236 on the reception side arranged to be opposite the antenna 136.

In FIG. 9A, a solid line represents a desired wave which is transferred from an antenna 136_a directly to an antenna 236_a arranged to be opposite the antenna 136_a. A dotted line represents an unnecessary wave (interference wave) which is transferred from the antenna 136_a directly to an antenna 236_b not arranged to be opposite the antenna 136_a. Any of the desired wave and the unnecessary wave is a direct wave which is transferred from the antenna 136_a directly to the antenna 236_a and 236_b.

A channel matrix H which is applied to a MIMO processing operation is expressed by Expression (1-1). In the channel matrix H of M rows and M columns, the elements with i=j from among the matrix elements hi,j are elements regarding the desired wave (a radio signal of the own channel), and the elements with i≠j are elements regarding the unnecessary wave (a radio signal of another channel). A received signal r at this time is expressed by Expression (1-2). It should be noted that s represents a transmitted signal, and v represents noise.

$$H = \begin{pmatrix} h_{1,1} & h_{1,2} & \cdots & h_{1,M} \\ h_{2,1} & h_{2,2} & \cdots & h_{2,M} \\ & & \ddots & \\ h_{M,1} & h_{M,2} & \cdots & h_{M,M} \end{pmatrix}_{M \times M} \quad (1\text{-}1)$$

$$\begin{pmatrix} r_1 \\ r_2 \\ \vdots \\ r_M \end{pmatrix} = \begin{pmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{M,1} & h_{M,2} & \cdots & h_{M,M} \end{pmatrix} \begin{pmatrix} s_1 \\ s_2 \\ \vdots \\ s_M \end{pmatrix} + \begin{pmatrix} v_1 \\ v_2 \\ \vdots \\ v_M \end{pmatrix} \quad (1\text{-}2)$$

$$r = Hs + v$$

(1)

As shown in (2) of FIG. 9A, with regard to the MIMO processing on the transmission side in the MIMO processing section 601, an inverse matrix H^−1 (also referred to a transmission weight matrix) of the channel matrix H is multiplied by a transmission-target signal s^ (circumflex over s). As a result, on the reception side, a transmission-target signal s^ (+noise v) is obtained. The transmission-target signal s^ is a signal which is input to the MIMO processing section 601.

As will be understood from the above description, if the MIMO processing is applied on the transmission side, it is possible to acquire the transmission-target signal s^ which is not affected by an interference wave. As a result, in realizing multiplex transmission through space division multiplex, even when the millimeter-wave signal transmission path 9 is the free-space transmission path 9B, it is possible to relax the degree of demand for the countermeasure against interference, and it is not necessary to provide or it is possible to reduce the countermeasure against interference.

When this embodiment is not applied, the inverse matrix operation based on the inverse matrix H^−1 in the MIMO processing section 601 becomes processing in which the component of the unnecessary wave based on the transmission-target signal (unnecessary signal) of a different received by the reception-side antenna 236 along with the desired wave based on the transmission-target signal (desired signal) of the own channel is cancelled. Specifically, the inverse matrix operation becomes processing in which the component of the unnecessary wave based on the unnecessary signal and the reverse component are superimposed in advance to be then transmitted as a desired wave.

[Relationship Between MIMO Processing for Application on Transmission Side and Carrier Frequency]

FIG. 9B shows the relationship between the MIMO processing for application on the transmission side and the carrier frequency. The first communication apparatus 100 is provided with the frequency mixing section 8302 serving as the modulation functional section 8300 at the back of the MIMO processing section 601 by channel. Although in this example, the frequency mixing section 8302 performs quadrature modulation, this is not indispensable. The modulation functional section 8300 has the single transmission-side local oscillation section 8304 which is shared by all the channels. The frequency mixing section 8302 of each channel uses the carrier signal created by the transmission-side local oscillation section 8304 to perform modulation. This configuration is available because the transmission-side semiconductor chip 103 has a single-chip configuration.

The second communication apparatus 200 is provided with the modulation functional section 8300, which includes the frequency mixing section 8402 and the reception-side local oscillation section 8404, by channel. In this example, the frequency mixing section 8402 performs quadrature detection so as to correspond to quadrature modulation on the transmission side. If the transmission side does not perform quadrature modulation, the frequency mixing section 8402 may not perform quadrature detection.

As described above, the single transmission-side local oscillation section 8304 which is shared by all the channels is provided, and the frequency mixing section 8302 of each channel uses the carrier signal created by the transmission-side local oscillation section 8304 to perform modulation. Thus, the effect of the carrier frequency in each channel is identical. In order to utilize the basic advantage of the space division multiplex, if the common carrier frequency is used for all the systems, the effect of the carrier frequency is identical, thus the MIMO processing is performed in the baseband.

[Relationship Between Restriction on Antenna Arrangement and Amount of MIMO Processing]

FIGS. 10A to 11B show the relationship between the restriction on the antenna arrangement and the amount of MIMO processing (the amount of inverse matrix operation).

For example, FIG. 10A shows a case where there are two channels (two antenna pairs) as the simplest configuration. As shown in (1) of FIG. 10A, a transmission-side semiconductor chip 103 is provided with antennas 136_1 and 136_2 at a distance G. A semiconductor chip 203_1 is provided with an antenna 236_1 opposed to the antenna 136_1, and a semiconductor chip 203_2 is provided with an antenna 236_2 opposed to the antenna 136_2. The antennas 236_1 and 236_2 are also provided at the distance G. The antenna 136 is equivalent to the antenna 8136, and the antenna 236 is equivalent to the antenna 8236. Hereinafter, the same is applied to other description.

The term "opposed" means that the antenna pair is arranged such that the antennas do not have the phase characteristic depending on directionality. In other words, the term "opposed" means that the radiation angle of the desired wave from the antenna 136 or the incidence angle on the corresponding antenna 236 is zero. The details of the term "opposed" and the phase characteristic depending on directionality of the antenna will be described below. Hereinafter, unless otherwise noted, it is assumed that the antenna pair is arranged in a state where the antennas are opposed to each other.

An inter-antenna distance related to a desired wave is d1. That is, the opposed distance between the antenna 136_1 of the semiconductor chip 103 and the antenna 236_1 of the semiconductor chip 203_1 is d1. Similarly, the opposed distance between the antenna 136_2 of the semiconductor chip 103 and the antenna 236_2 of the semiconductor chip 203_2 is also d1. Meanwhile, an inter-antenna distance related to an unnecessary wave is d2. That is, the opposed distance between the antenna 136_1 of the semiconductor chip 103 and the antenna 236_2 of the semiconductor chip 203_2 is d2. Similarly, the opposed distance between the antenna 136_2 of the semiconductor chip 103 and the antenna 236_1 of the semiconductor chip 203_1 is also d2.

A direct wave transmitted from the antenna 136_1 is received by the antenna 236_1 directly. A desired wave transmitted from the antenna 136_2 is received by the antenna 236_2 directly. An unnecessary wave transmitted from the antenna 136_1 is received by the antenna 236_2 directly. An unnecessary wave transmitted from the antenna 136_2 is received by the antenna 236_1 directly.

Since the distance d1<the distance d2, even the antennas 136_1 and 136_2 are at the same transmission level, the reception level of the desired wave received by the antenna 236_1 (236_2) is greater than the reception level of the unnecessary wave received by the antenna 236_2 (236_1) due to distance attenuation. This causes the inverse matrix of the channel matrix being present inevitably.

In general, in the MIMO processing, a complex number operation (or corresponding processing) has to be performed, leading to an increase in the circuit scale. For example, as shown in (1) of FIG. 10A, when there are two antenna pairs, a general circuit configuration shown in (2) of FIG. 10A is used. Like the QPSK or the like, when two-axis modulation (modulation of I component and Q component) is performed, if a path condition described below is not set, real number multiplication has to be performed 16 times (=2·2·2^2), and addition has to be performed 12 times. In the case of three channels, real number multiplication has to be performed 2·2·3^2 times. In general, in the case of M channels, real number multiplication has to be performed 2·2·M^2 times. Like the ASK scheme, the BPSK scheme, or the like, when one-axis modulation is performed, in the case of M channels, real number multiplication has to be performed 2·M^2 times.

FIG. 10B shows the basic items regarding the relationship between the distance difference Δd (=d2−d1: referred to as a path difference Δd) between the inter-antenna distance d1 of the desired wave and the inter-antenna distance d2 of the unnecessary wave and the channel matrix when there are two channels (two antenna pairs).

(1) of FIG. 10B shows the relationship between a desired wave and an unnecessary wave from the two antennas 136_1 and 136_2 on the transmission side toward the two antennas 236_1 and 236_2 on the reception side. A solid line represents a desired wave, and a dotted line represents an unnecessary wave. (2) of FIG. 10B shows a situation of a real term (cos term) of the elements of the channel matrix H or the inverse matrix H^−1 in relation to phase. (3) of FIG. 10B shows the situation of an imaginary term (sin term) of the elements of the channel matrix H or the inverse matrix H^−1 in relation to a phase.

Two transmitted signals are S1(t)=A1·exp(jωt) and S2(t)=A2·exp(jωt). The distance attenuation element of the unnecessary wave with respect to the desired wave is α (0≤α<1). The frequency of the carrier signal is fo, and the wavelength of the carrier signal is λc. The distance d1 between the transmitting and receiving antennas of the desired wave is "d", and the distance d2 between the transmitting and receiving antennas of the unnecessary wave is "d+Δd". "Δd" refers to the arrival distance difference (path difference) between the desired wave and the unnecessary wave, and is substituted with time as Δt.

A received signal R1(t) of the reception-side antenna 236_1 is obtained by synthesizing a desired wave from the antenna 136_1 which is opposite the antenna 236_1 and an unnecessary wave from the antenna 136_2 which is not opposite the antenna 236_1, and expressed by Expression (2-1). A received signal R2(t) of the reception-side antenna 236_2 is obtained by synthesizing a desired wave from the antenna 136_2 which is opposite the antenna 236_2 and an unnecessary wave from the antenna 136_1 which is not opposite the antenna 236_2, and is expressed by Expression (2-2).

$$\left.\begin{array}{l} R1(t) = S1(t) + \alpha \cdot S2(t-\Delta t) \\ \quad\quad = S1(t) + \alpha \cdot A2 e^{j\omega(t-\Delta t)} \\ \quad\quad = S1(t) + \alpha \cdot S2(t) \cdot e^{-j\omega\Delta t} \end{array}\right\} \quad (2\text{-}1) \\ \left.\begin{array}{l} R2(t) = \alpha \cdot S1(t-\Delta t) + S2(t) \\ \quad\quad = \alpha \cdot A1 e^{j\omega(t-\Delta t)} + S2(t) \\ \quad\quad = \alpha \cdot S1(t) \cdot e^{-j\omega\Delta t} + S2(t) \end{array}\right\} \quad (2\text{-}2) \quad\quad (2)$$

In Expressions (2-1) and (2-2), if e(−jωΔt) is substituted with "D" (=cos ωΔt−j sin ωΔt), Expressions (3-1) and (3-2) are obtained.

$$\left.\begin{array}{l} \left.\begin{array}{l} R1 = S1 + \alpha \cdot D \cdot S2 \\ R2 = \alpha \cdot D \cdot S2 + S1 \end{array}\right\} \quad (3\text{-}1) \\ \begin{pmatrix} R1 \\ R2 \end{pmatrix} = \begin{pmatrix} 1 & \alpha \cdot D \\ \alpha \cdot D & 1 \end{pmatrix} \cdot \begin{pmatrix} S1 \\ S2 \end{pmatrix} \quad (3\text{-}2) \end{array}\right\} \quad (3)$$

Then, the channel matrix H expressed by Expression (4-1) and the inverse matrix H^−1 expressed by Expression (4-2) are obtained from Expression (3-2). In Expression (4-2), the relationship detH=1−(α·D)^2 is established.

$$\left.\begin{array}{l} H = \begin{pmatrix} 1 & \alpha \cdot D \\ \alpha \cdot D & 1 \end{pmatrix} \quad (4\text{-}1) \\ H^{-1} = \frac{1}{\det H} \begin{pmatrix} 1 & -\alpha \cdot D \\ -\alpha \cdot D & 1 \end{pmatrix} \quad (4\text{-}2) \\ \det H = 1 - \alpha^2 \cdot D^2 \end{array}\right\} \quad (4)$$

In this case, if a predetermined condition is set for the path difference Δd, each element of the channel matrix H includes only a real term (cos term) or an imaginary term (sin term). With the presence of the distance attenuation element α, the inverse matrix H^−1 of the channel matrix H is found certainly, and each element of the inverse matrix H^−1 includes only a real term (cos term) or an imaginary term (sin term).

For example, when there are two channels, the channel matrix H is normalized and taken into consideration, the elements (the element in the first row and the first column and the element in the second row and the second column) of the desired wave include a real term (=1) regardless of the path difference Δd. In contrast, the elements (the element in the first row and the second column and the element in the second row and the first column) of the unnecessary wave include only a real term, only an imaginary term, or "real term+ imaginary term" due to the path difference Δd.

For example, when the relationship "Δd=(n/2+¼)λc (where n is 0 or a positive integer equal to or greater than 1)" is satisfied (referred to as path condition 1), the path difference Δd is an odd-numbered multiple of π/2 in terms of the phase, and the real term (cos term) becomes zero. Thus, the relevant element includes only an imaginary term (sin term). If there is a shift from the relationship of the path condition 1, the relevant element includes "real term+imaginary term". Meanwhile, when the relationship of the path condition 1 is approximated, the number of real term components is much smaller than the number of imaginary term components, and the relevant element is substantially handled as including only an imaginary term. That is, although the relationship Δd=(n/2+¼)λc is completely satisfied in the optimum state, there is no problem even when there is a slight shift from the relationship. In this specification, the term "only imaginary term" includes a case where there is such a slight shift.

Specifically, when n is 0 or an even number, the imaginary term becomes "+1". Thus, the phase of the unnecessary wave revolves by π/2 with respect to the desired wave due to the path difference. At this time, since the relationship "detH=1−(α·D)^2=1−(α·−j)^2>1" is established, the inverse matrix H^−1 of the channel matrix H may be present. In the transmission-side MIMO processing, since the relationship "−α·D=−j·α" is established, the unnecessary component becomes "−π/2" with respect to the desired component in terms of the phase.

Meanwhile, when n is an odd number, the imaginary term becomes "−1". Thus, the phase of the unnecessary wave revolves by −π/2 with respect to the desired wave due to the path difference. At this time, since the relationship "detH=1−(α·D)^2=1−(α·j)^2>1" is established, the inverse matrix H^−1 of the channel matrix H may be present. In the transmission-side MIMO processing, since the relationship "−α·D=j·α" is established, the unnecessary component becomes "π/2" with respect to the desired component in terms of the phase.

When the relationship "Δd=(n/2)λc (where n is a positive integer equal to or greater than 1)" is satisfied (referred to as path condition 2), the path difference Δd is an integer multiple of π in terms of the phase, and the imaginary term (sin term) becomes zero. Thus, the relevant element includes only a real term. If there is a shift from the relationship of the path condition 2, the relevant element includes "real term+imaginary term". Meanwhile, when the relationship of the path condition is approximated, the number of imaginary term components is much smaller than the number of real term components, thus the relevant element may be substantially handled as including only a real term. That is, although the relationship Δd=(n/2)λc is completely satisfied in the optimum state, there is no problem even when there is a slight shift from the relationship. In this specification, the term "only real term" includes a case where there is such a slight shift.

In detail, when n is an even number, the real term becomes "+1". Thus, the phase of the unnecessary wave revolves by 2π with respect to the desired wave due to the path difference (that is, in phase and the same polarity). At this time, since the relationship "detH=1−(α·D)^2=1−(α·1)^2>1" is established, the inverse matrix H^−1 of the channel matrix H may be present. In the transmission-side MIMO processing, since the relationship "−α·D=−α" is established, the unnecessary component becomes "−π" (that is, in phase and the same polarity) with respect to the desired component in terms of the phase.

Meanwhile, when n is an odd number, the real term becomes "−1". Thus, the phase of the unnecessary wave revolves by π with respect to the desired wave due to the path difference (that is, becomes in phase and has the same polarity). At this time, since the relationship "detH=1−(α·D)^2=1−(α·−1)^2>1" is established, the inverse matrix H^−1 of the channel matrix H may be present. In the transmission-side MIMO processing, since the relationship "−α·D=α" is established, the unnecessary component becomes "2π" (that is, in phase and the same polarity) with respect to the desired component.

That is, it should suffice that the difference between the inter-antenna distance d1 of the desired wave and the inter-antenna distance d2 of the unnecessary wave between the antenna 136 (transmitting antenna) and the antenna 236 (receiving antenna) is set such that each element of the unnecessary wave in the channel matrix H (or the inverse matrix H^−1) prescribing the transfer characteristic of the free-space transmission path 9B can be substantially expressed only by a real term or an imaginary term.

In this embodiment, focusing on the features based on the set value of the path difference Δd, the antenna arrangement is determined such that the path condition 1 or the path condition 2 is satisfied. When this happens, each element of the unnecessary wave in the channel matrix H can be regarded as including only an imaginary term or a real term. As a result, it is possible to simplify the inverse matrix operation processing in the transmission-side MIMO processing section 601. In particular, when each element is regarded as including only a real term, the modulation functional section 8300 can be constituted without using a quadrature modulation circuit.

[In Case of Path Condition 1]

FIG. 11A shows a first example (referred to as the antenna arrangement of the first example) of the constraints on the antenna arrangement of this embodiment when there are two channels (two antenna pairs). The antenna arrangement of the first example is determined such that the path difference Δd satisfies the path condition 1. That is, the antenna arrangement is determined such that the distance difference Δd (path difference Δd) between the inter-antenna distance d1 of the desired wave and the inter-antenna distance d2 of the unnecessary wave approximates to the relationship "(n/2+¼)λc".

When the path difference Δd satisfies the path condition 1, as described with reference to FIG. 10B, as shown in (1-2) of FIG. 11A, the channel matrix H includes only a real term Re or an imaginary term Im, and the inverse matrix H^−1 also includes only a real term Re' or an imaginary term Im'. That is, the elements of the desired wave in the first row and the first column and in the second row and second column includes only a real term, and the elements of the unnecessary wave in the first row and the second column and in the second row and the first column includes only an imaginary term. For this reason, it is possible to reduce the amount of MIMO processing.

Since the imaginary term Im' (quadrature component) is present, even when a modulation scheme to which this embodiment is not applied performs modulation which is not accompanied by a quadrature component originally, like the ASK scheme or the BPSK scheme, it is necessary to provide a quadrature-component modulation circuit as the modulation functional section 8300.

(1-3) of FIG. 11A shows the state of a transmitted signal in each channel when MIMO processing is performed under the path condition 1 with respect to when a modulation scheme to which this embodiment is not applied is the BPSK scheme. As shown in the drawing, the component of a first channel ch1 is obtained by synthesizing the I-axis component (Ch1_I) of the desired signal and the Q-axis component (Ch2_Q') of the unnecessary signal by the second channel ch2 and transmitted from the antenna 136_1. The component of a second channel ch2 is obtained by synthesizing the I-axis component (Ch2_I) of the desired signal and the Q-axis component (Ch1_Q') of the unnecessary signal by the first channel ch1 and transmitted from the antenna 136_2. As will be understood from the drawing, the modulated signal (Ch1_I, Ch2_I) of the corrected component (Ch1_Re', Ch2_Re') of the desired signal and the modulated signal (Ch2_Q', Ch1_Q') of the corrected component (Ch2_Im', Ch1_Im') of the unnecessary signal are orthogonalized. Thus, it is necessary to provide a quadrature modulation circuit as the modulation functional section 8300.

(2) of FIG. 11A shows a MIMO processing section 601A of the first example corresponding to (1-3) of FIG. 11A and subsequent circuits (the modulation functional section 8300, the amplification section 8117, and the antenna 136).

The MIMO processing section 601A performs inverse matrix operation processing through analog processing, and includes four multipliers 612, 614, 616, and 618. The multiplier 612 multiples (amplifies) the component of the first channel ch1, which becomes the desired signal, by the component (real term Re') in the first row and the first column of the inverse matrix. The multiplier 614 multiplies (amplifies) the component of the second channel ch2, which becomes an unnecessary component with respect to the first channel ch1, by the component (imaginary term Im') in the first row and the second column of the inverse matrix. The multiplier 616 multiplies the component of the first channel ch1, which becomes an unnecessary component with respect to the second channel ch2, by the component (imaginary term Im') in the second row and the first column of the inverse matrix. The multiplier 618 multiplies (amplifies) the component of the second channel ch2, which becomes a desired signal, by the component (real term Re') in the second row and the second column of the inverse matrix. When the components of the matrix are negative, inverting amplification is performed.

The modulation functional section 8300 includes the transmission-side local oscillation section 8304, which creates the carrier signal, in common to the channels, and also includes the quadrature modulation circuit 8360 by channel. Each quadrature modulation circuit 8360 has a frequency mixing section 8302_I which modulates the I-axis component, a frequency mixing section 8302_Q which modulates the Q-axis component, a phase shifter 8362 (an example of a phase-shift section) which shifts the phase of the carrier signal by 90 degrees ($\pi/2$), and an adder 8364. The carrier signal from the transmission-side local oscillation section 8304 is supplied to the frequency mixing section 8302_I. The carrier signal from the transmission-side local oscillation section 8304 is supplied to the frequency mixing section 8302_Q after the phase shifter 8362 has shifted the phase thereof by $\pi/2$.

In the quadrature modulation circuit 8360 for the first channel, a signal Ch1_Re' output from the multiplier 612 is input to the frequency mixing section 8302_I, and a signal Ch2_Im' output from the multiplier 614 is input to the frequency mixing section 8302_Q. In the quadrature modulation circuit 8360 for the second channel, a signal Ch2_Re' output from the multiplier 618 is input to the frequency mixing section 8302_I, and a signal Ch1_Im' output from the multiplier 616 is input to the frequency mixing section 8302_Q. That is, for each transmission channel, the modulation functional section 8300 performs quadrature modulation for the real term-related corrected signal (corrected component) for the desired signal and the imaginary term-related corrected signal (corrected component) for the unnecessary signal.

The adder 8364 for the first channel synthesizes the modulated signal Ch1_I of the corrected component (Ch1_Re') regarding the I axis of the desired signal output from the frequency mixing section 8302_I and the modulated signal Ch2_Q' of the corrected component (Ch2_Im') regarding the Q axis of the unnecessary signal by the second channel Ch2. As a result, a modulated signal Ch1_ADD which is obtained by synthesizing the corrected components of the desired signal and the unnecessary signal and modulating the synthesized signal is transmitted from the antenna 136_1. Similarly, the adder 8364 for the second channel synthesizes the modulated signal Ch2_I of the corrected component (Ch2_Re') regarding the I axis of the desired signal output from the frequency mixing section 8302_I and the modulated signal Ch1_Q' of the corrected component (Ch1_Im') regarding the Q axis of the unnecessary signal by the first channel Ch1. As a result, a modulated signal Ch2_ADD which is obtained by synthesizing the corrected components of the desired signal and the unnecessary signal and modulating the synthesized signal is transmitted from the antenna 136_2.

As described above, when a modulation scheme to which this embodiment is not applied is the BPSK scheme, if there are two antennas, the path condition 1 is applied and the MIMO processing is performed on the transmission side. In the inverse matrix operation of the MIMO processing section 601A, real number multiplication is performed four times, and the number of times of addition becomes zero. It is possible to reduce the number of times of real number multiplication half and it is not necessary to provide an adder compared to a case where the path condition 1 of this embodiment is not applied. In the case of one-axis modulation, such as ASK or BPSK, it is possible to reduce the number of times of real number multiplication ¼.

[In Case of Path Condition 2]

FIG. 11B shows a second example (referred to as the antenna arrangement of the second example) of the constraints of the antenna arrangement of this embodiment when there are two channels (two antenna pairs). The antenna arrangement of the second example is determined such that the path difference Δd satisfies the path condition 2. That is, the antenna arrangement is determined such that the distance difference Δd (path difference Δd) between the inter-antenna distance d1 of the desired wave and the inter-antenna distance d2 of the unnecessary wave approximates to the relationship "(n/2)λc".

When the path difference Δd satisfies the path condition 2, as described with reference to FIG. 10B, as shown in (1-2) of FIG. 11B, the channel matrix H includes the components with only real terms Re and Re", and the inverse matrix H^−1 also includes the components with only real terms Re' and Re'". That is, the elements of the desired wave in the first row and the first column and in the second row and the second column includes only a real term, and the elements of the unnecessary wave in the first row and the second column and in the second row and the first column also include only a real term. For this reason, it is possible to reduce the amount of MIMO processing.

In this case, since there is no imaginary term (quadrature component), if a modulation scheme to which this embodiment is not applied performs modulation which is not accompanied by a quadrature component originally, like the ASK scheme or the BPSK scheme, it is not necessary to provide a quadrature-component modulation circuit as the modulation functional section 8300.

(1-3) of FIG. 11B shows the state of a transmitted signal of each channel when the path condition 2 is applied and the MIMO processing is performed with respect to a case where a modulation scheme to which this embodiment is not applied is the BPSK scheme. As shown in the drawing, the component of the first channel ch1 is transmitted from the antenna 136_1 as a modulated signal Ch1_ADD of the synthesized component of the original corrected component (Ch1_Re') regarding the I axis (for the desired signal) and the corrected component (Ch2_Re''') regarding the I axis for the unnecessary signal by the second channel ch2. The component of the second channel ch2 is transmitted from the antenna 136_2 as a modulated signal Ch2_ADD of the synthesized component of the original corrected component (Ch2_Re') (for the desired signal) and the corrected component (Ch1_Re''') regarding the I axis for the unnecessary signal by the first channel ch1. As will be understood from the drawing, the modulated signal (Ch1_I, Ch2_I) of the corrected component (Ch1_Re', Ch2_Re') of the desired signal and the modulated signal (Ch1_I', Ch2_I') of the corrected component (Ch2_Re''', Ch1_Re''') of the unnecessary signal are in phase, thus it is not necessary to provide a quadrature modulation circuit as the modulation functional section 8300.

(2) of FIG. 11B shows a MIMO processing section 601B of the second example corresponding to (1-3) of FIG. 11B and subsequent circuits (the modulation functional section 8300, the amplification section 8117, and the antenna 136).

The MIMO processing section 601B performs inverse matrix operation through analog processing, and includes four multipliers 622, 624, 626, and 628 and two adders 625 and 629. The multiplier 622 multiplies (amplifies) the component of the first channel ch1, which becomes a desired signal, by the component (real term Re') in the first row and the first column of the inverse matrix. The multiplier 624 multiplies (amplifies) the component of the second channel ch2, which becomes an unnecessary component with respect to the first channel ch1, by the component (real term Re''') in the first row and the second column of the inverse matrix. The multiplier 626 multiplies (amplifies) the component of the first channel ch1, which becomes an unnecessary component with respect to the second channel ch2, by the component (real term Re''') in the second row and the first column of the inverse matrix. The multiplier 628 multiplies (amplifies) the component of the second channel ch2, which becomes a desired signal, by the component (real term Re') in the second row and the second column of the inverse matrix. When the component of the matrix is negative, inverting amplification is performed.

The adder 625 adds a signal Ch1_Re' output from the multiplier 622 and a signal Ch2_Re''' output from the multiplier 624. The adder 629 adds a signal Ch2_Re' output from the multiplier 628 and a signal Ch1_Re''' output from the multiplier 626. That is, each of the adders 625 and 629 adds the real term-related corrected signal for the desired signal and the real term-related corrected signal for the unnecessary component, and supplies the added signal to the modulation functional section 8300.

The modulation functional section 8300 includes the transmission-side local oscillation section 8304, which creates the carrier signal, by channel, and also includes the frequency mixing section 8302 by channel. The carrier signal is supplied from the transmission-side local oscillation section 8304 to each frequency mixing section 8302.

An added signal Ch1_Re'+Ch2_Re''' output from the adder 625 is input to the frequency mixing section 8302 for the first channel, and an added signal Ch2_Re'+Ch1_Re''' output from the adder 629 is input to the frequency mixing section 8302 for the second channel. That is, for each transmission channel, the modulation functional section 8300 modulates the real term-related corrected signal for the desired signal and the real term-related corrected signal for the unnecessary component.

As described above, when a modulation scheme to which this embodiment is not applied is the BPSK scheme, and when there are two antennas, the path condition 2 is applied and the MIMO processing is performed on the transmission side. In the inverse matrix operation of the MIMO processing section 601B, real number multiplication is performed four times, and additions is performed two times. It is possible to reduce the number of times of real number multiplication half and to reduce the number of times of addition compared to a case where the path condition 2 of this embodiment is not applied. In the case of one-axis modulation, such as the ASK or the BPSK, it is possible to reduce the number of times of real number multiplication ¼. In the modulation functional section 8300, it is not necessary to provide a quadrature-component modulation circuit, thus the transmission-side circuit configuration is simplified compared with a case where the path condition 1 is applied.

[For Phase Characteristic Depending on Directionality]

FIG. 11C shows a countermeasure when an antenna has a phase characteristic depending on directionality. The description with reference to FIGS. 10A to 11B has been provided for an "opposed" state where an antenna pair is arranged such that an antenna does not have a phase characteristic depending on directionality. In contrast, when an antenna pair has a phase characteristic φa depending on directionality, it is necessary to take into consideration the effect of the phase characteristic φa as well as the path difference Δd. Basically, it is possible to correct the effect of the phase characteristic φa as follows.

In FIG. 11C, θ1 is the incidence angle on the antenna 236_1 corresponding to the radiation angle of the desired wave from the antenna 136_1 for the first channel (constituting a first antenna pair). θ1 is also the incidence angle on the antenna 236_2 corresponding to the radiation angle of the desired wave from the antenna 136_2 for the second channel (constituting a second antenna pair). θ1 has a value near zero. Meanwhile, θ2 is the incidence angle on the antenna 236_1 corresponding to the radiation angle of the unnecessary wave from the antenna 136_2 for the first channel. Since θ1 is near zero, θ2 is also the incidence angle on the antenna 236_2 corresponding to the radiation angle of the unnecessary wave from the antenna 136_1 for the second channel.

Although description of the detailed course for deriving Expression is omitted, if the effect amount of the phase characteristic φa is converted in terms of distance, the effect amount is expressed by Expression (5-1). If the path condition 1 is calculated again taking into consideration the effect amount, Expression (5-2) is obtained. If the path condition 2 is calculated again taking into consideration the effect amount, Expression (5-3) is obtained. In any case, it is understood that the path difference Δd is corrected by the effect amount of the phase characteristic φa.

$$\left.\begin{array}{ll} \text{Conversion of Effect Amount in terms of Distance:} & (5\text{-}1) \\ \lambda c \left\{ \dfrac{\phi_a(\theta_2) - \phi_a(\theta_1)}{\pi} \right\} & \\ \Delta d = d2 - d1 = \lambda c \left\{ \dfrac{n}{2} + \dfrac{1}{4} - \dfrac{\phi_a(\theta_2) - \phi_a(\theta_1)}{\pi} \right\} & (5\text{-}2) \\ \Delta d = d2 - d1 = \lambda c \left\{ \dfrac{n}{2} - \dfrac{\phi_a(\theta_2) - \phi_a(\theta_1)}{\pi} \right\} & (5\text{-}3) \end{array}\right\} \quad (5)$$

[Application to Three or More Channels]

FIGS. 12A to 12B show a countermeasure when there are three or more antenna pairs. Even when there are three or more antenna pairs, similarly to a case where there are two antenna pairs such that the path difference Δd satisfies the path condition 1, the channel matrix and the inverse matrix includes the components with only a real term or an imaginary term. That is, the elements with i=j of the desired wave become the real term Re, and the elements with i≠j of the unnecessary wave become the imaginary term Im.

As shown in FIG. 12B, even when there are three or more antenna pairs, similarly to a case where there are two antenna pairs such that the path difference Δd satisfies the path condition 2, the channel matrix and the inverse matrix include the components with only a real term. That is, the elements with i=j of the desired wave become a real term Re, and the elements with i≠j of the unnecessary wave become the real term Re. In FIG. 12B, an encircled combination is subjected to consideration of the constraints.

In general, in the case of the M channels, as speculated from the channel matrix, under any of the path conditions 1 and 2, in the case of two-axis modulation, such as the QPSK, real number multiplication has to be performed 2·M^2 times. In the case of one-axis modulation, such as the ASK scheme or the BPSK scheme, the real number multiplication has to be performed M^2 times. This means that, when there are three or more antenna pairs, if the same concept as in the case of two channels is simply applied as it is, the operation amount of real number multiplication increases to the square of the number of antenna pairs.

In this embodiment, when there are three or more antenna pairs, configuration is made on the basis of the feature of the antenna arrangement such that the number of times of real number multiplication does not become the square of the number of channels (an increase in the number of times of real number multiplication is suppressed). Specifically, focusing is made on that the effect of inference waves from adjacent antennas is greatest and the effect of interference waves from other antennas is comparatively small. Thus, the antenna interval is determined in consideration of unnecessary waves (interference waves) from adjacent antennas, and applied to other antennas.

In this way, for example, when the path condition 1 is applied, in the inner channels excluding the channels at both ends, it should suffice that only the real term for the antenna 136 of the desired wave and the imaginary terms for the antenna 136 of unnecessary waves on both sides are taken into consideration. That is, focusing on the i-th channel, only the desired wave from the i-th antenna 136_i toward the antenna 236_i, the unnecessary wave from the (i−1)th antenna 136_i−1 toward the antenna 236_i, and the unnecessary wave from the (i+1)th antenna 136_i+1 toward the antenna 236_i may be taken into consideration. For this reason, with regard to the channel matrix or the inverse matrix, in the i-th row, the element of the desired wave in the i-th column is a real term, and the elements of the unnecessary wave in the (i−1)th column and the (i+1)th column are imaginary terms. Other elements of the unnecessary wave become zero.

When the path condition 2 is applied, in the inner channels excluding the channels at both ends, it should suffice that only the real term for the antenna 136 of the desired wave and the real terms for the antenna 136 of the unnecessary waves on both sides are taken into consideration. That is, focusing on the i-th channel, only the desired wave from the i-th antenna 136_i toward the antenna 236_i, the unnecessary wave from the (i−1)th antenna 136_i−1 toward the antenna 236_i, and the unnecessary wave from the (i+1)th antenna 136_i+1 toward the antenna 236_i may be taken into consideration. For this reason, with regard to the channel matrix or the inverse matrix, in the i-th row, the element of the desired wave in the i-th column is a real term, and the elements of the unnecessary wave in the (i−1)th column and the (i+1)th column are also real terms. Other elements of the unnecessary wave become zero.

Under any of the path conditions 1 and 2, in the channels at both ends, the number of times of real number multiplication is two. In the inner channels excluding the channels at both ends, the number of real number multiplication is 3. Thus, it is possible to reduce the amount of MIMO processing compared to a case where this method is not applied.

That is, in the case of M channels (where M is an integer equal to or greater than 3), under any of the path conditions 1 and 2, in the case of two-axis modulation, such as QPSK, real number multiplication is performed 2·{2·2+(M−2)·3} times. In the case of one-axis modulation, such as the ASK scheme or the BPSK scheme, real number multiplication is performed {2·2+(M−2)·3} times. This means that, when there are three or more antenna pairs, it is possible to reduce the operation amount of real number multiplication compared with a case where the same concept as in the case of two channels is simply applied as it is.

[Application to Three-Dimensional Arrangement]

FIG. 12C is a diagram illustrating an application method of MIMO processing for application on the transmission side described with reference to FIGS. 9A to 12B when transmitting and receiving antennas are arranged in a three-dimensional shape.

As shown in (1) of FIG. 12C, the particulars described with reference to FIGS. 9A to 12B are the application examples when the transmission-side antenna 136 and the reception-side antenna 236 are arranged in a two-dimensional shape.

However, the mechanism for reducing the amount of MIMO processing on the transmission-side of this embodiment is not limited to a case where the transmitting and receiving antennas are arranged in a two-dimensional shape. For example, as shown in (2) of FIG. 12C, the same is applied to a case where the transmitting and receiving antennas are arranged in a three-dimensional shape.

For example, referring to (2) of FIG. 12C, the transmission-side semiconductor chip 103 is provided with seven antennas 136_1 to 136_7 at a distance G, and the semiconductor chips 203_@ are respectively provided with antennas 236_@ correspondingly opposed to the antennas 136_@. The antennas 236_@ are also provided at the distance G.

Although in the drawing, only seven desired waves from the transmission-side semiconductor chip 103 toward the seven semiconductor chips 203_1 to 203_7 on the reception side are shown, unnecessary waves between the antennas arranged to be opposite to each other may be the same as in the two-dimensional arrangement. In the three-dimensional arrangement, the path difference Δd between the desired wave and the unnecessary wave satisfies the path condition 1 or the path condition 2, such that the same advantages as described above are obtained.

The place where each antenna 236 of the semiconductor chip 203 is arranged with respect to each antenna 136 of the semiconductor chip 103 is basically on a plane which is parallel to the plane of the semiconductor chip 103 (each antenna 136). A minimum cell formed by the antennas 136 or the antennas 236 is a regular triangle.

When a desired wave and unnecessary waves (interference waves) from adjacent antennas on both sides are taken into consideration, as shown in (2) of FIG. 12C, focusing is made on a channel matrix which is applied three-dimensionally to be a regular hexagon. For example, a space between the antennas 136_1 and 236_1 at the center of the regular hexagon is regarded as the channel of the desired wave. That is, the desired wave is transferred from the antenna 136_1 at the center of the regular hexagon on the transmission side toward the antenna 236_1 at the center of the regular hexagon on the reception side similarly. At this time, adjacent antennas which become the analysis target of the unnecessary wave of the antenna 236_1 are the antennas 136_2 to 136_7 arranged at the vertexes of the regular hexagon.

[Digital MIMO Processing]

FIG. 12D shows a basic method when transmission-side MIMO processing is performed through digital processing. The configuration shown in (2) of FIG. 11A when the antenna arrangement is set so as to satisfy the path condition 1 or the configuration shown in (2) of FIG. 11B when the antenna arrangement is set so as to satisfy the path condition 2 indicates a case where the MIMO processing section 601 (601A, 601B) corresponds to analog processing.

However, the inverse matrix operation in the MIMO processing section 601 is not limited to an analog circuit being supposed. If the processing speed is not low, the inverse matrix operation may be performed through digital signal processing. In this case, a digital signal subjected to the MIMO processing (inverse matrix operation processing) output from the MIMO processing section 601 may be converted to an analog signal, and the analog signal may be supplied to the modulation functional section 8300.

For example, (1) of FIG. 12D shows an example where (2) of FIG. 11A corresponding to the path condition 1 is handled, and (2) of FIG. 12D shows an example where (2) of FIG. 11B corresponding to the path condition 2 is handled. In any case, a DA converter 630 (DAC) is interposed between the MIMO processing section 601 and the modulation functional section 8300. Other parts are not changed.

Transmission MIMO

First Embodiment

Figure 13A:
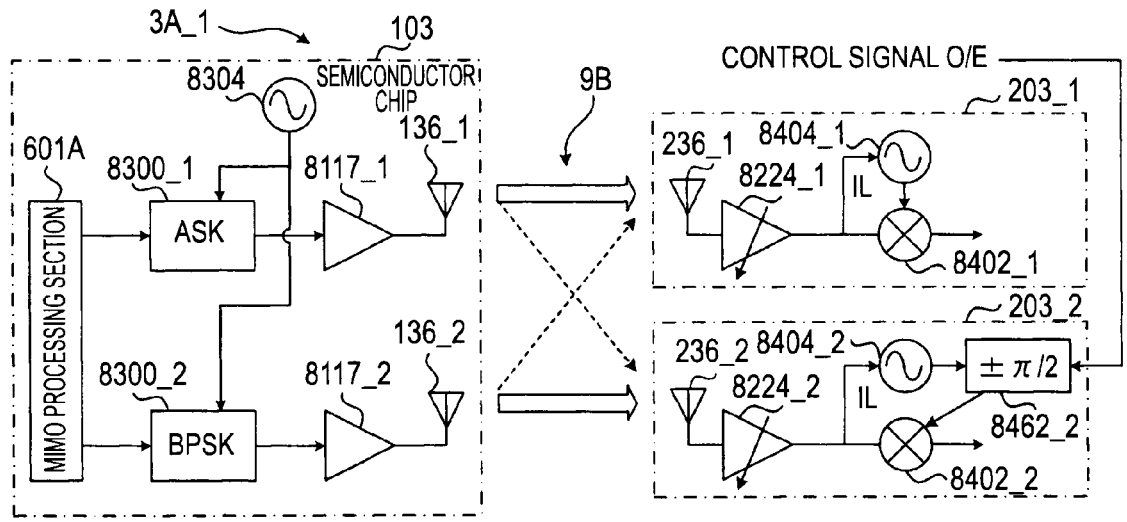
FIG. 13A is a diagram illustrating a transmission MIMO system of a first embodiment (first example).
Figure 13A:
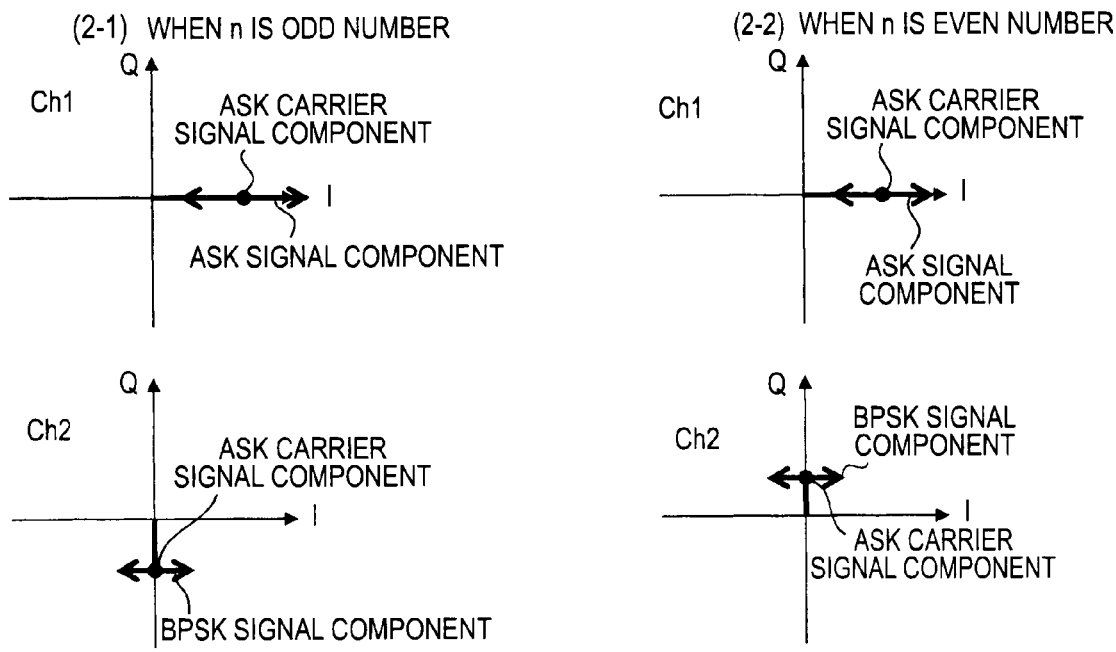
Figure 13B:
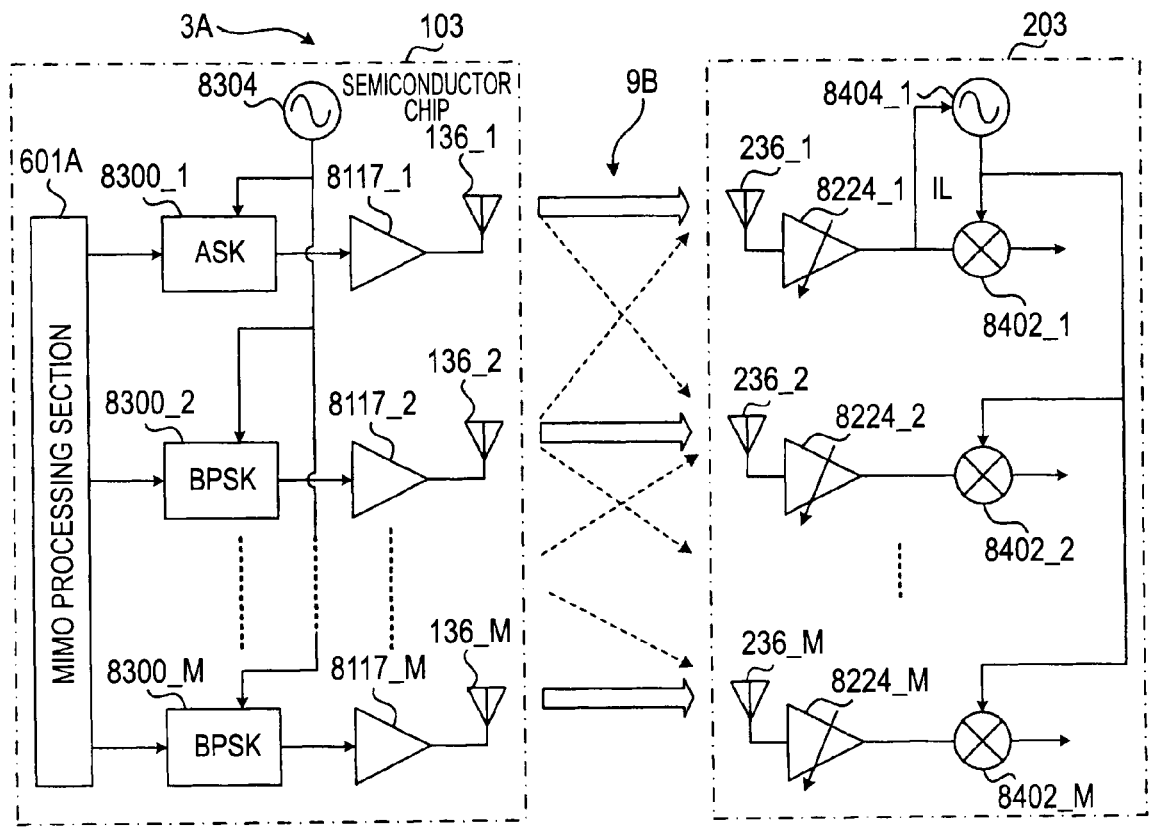
FIG. 13B is a diagram illustrating a transmission MIMO system of the first embodiment (second example).

FIGS. 13A to 13C are diagrams illustrating a first example (referred to as the transmission MIMO system of the first embodiment) of the specific application example of MIMO processing for application on the transmission side described with reference to FIGS. 9A to 12D. Here, it is assumed that "an unnecessary wave reaches only adjacent antennas".

A transmission MIMO system 3A of the first embodiment has a feature in that injection locking is applied on the reception side. In consideration of the reduction in necessary transmission power at the time of multiplex transmission, only one system (first channel Ch1) from among the M systems uses the scheme of modulating only amplitude (in this case, the ASK scheme), and all the remaining systems use a scheme (in this case, the BPSK scheme) other than the scheme of modulating only amplitude.

In a transmission MIMO system 3A_1 of a first example shown in FIG. 13A, with regard to the M systems, the transmission side has a single-chip configuration, and the reception side has a 1-to-N configuration such that the semiconductor chip 203 is used by system. On the reception side, injection locking is applied to a received signal by system. Since it is assumed that "an unnecessary wave reaches only adjacent antennas", similarly to the first example, the basis resides in the correspondence relationship between the two channels.

Meanwhile, a transmission MIMO system 3A_2 of a second example shown in FIG. 13B has a 1-to-1 configuration such that the transmission side has a single-chip configuration, and the reception side also has a single-chip configuration, that is, a 1-to-1 configuration is made. On the reception side, one ASK system (first channel Ch1) is used, and in all the remaining systems, synchronous detection is performed on the basis of the reproduction carrier signal acquired through injection locking of the ASK system. Even when it is assumed that "an unnecessary wave reaches only adjacent antennas", since injection locking is taken with the channel of the ASK scheme, unlike the first example, the number of BPSK channels can be arbitrarily set.

A transmission MIMO system 3A_3 of a third example shown in FIG. 13C has a configuration such that the number of channels increases while the concept of the first example is used. While the assumption that "an unnecessary wave reaches only adjacent antennas" is not collapsed, the channel of the ASK scheme is arranged such that the modulated signal according to the ASK scheme reaches all the antennas 236. Specifically, a three-channel configuration may be made as a basic element such that the channels of the BPSK scheme are arranged on both sides of the channel of the ASK scheme, and the basic element may be repeatedly arranged.

With regard to the antenna arrangement, the antennas 136 and 236 are arranged such that the path difference $\Delta d$ satisfies the path condition 1, that is, the relationship the path difference $\Delta d = (n/2 + 1/4) \lambda c$ is approximated. With regard to signal components, only a desired component is input to the reception side. Since the path condition 1 is applied, the MIMO processing section 601A of the first example shown in (2) of FIG. 11A is used as the MIMO processing section 601. If the relationship the path difference $\Delta d = (n/2 + 1/4) \lambda c$ is completely satisfied, the component of the unnecessary wave is not received by the reception-side antenna 236 because of the MIMO processing applied on the transmission side. However, when there is a shift, the component of the unnecessary wave is detected a little. When three is a phase characteristic depending on directionality, the antennas 136 and 236 are arranged as described above such that the path difference $\Delta d$ approximates to the relationship of Expression (5-2).

In the case of injection locking on the reception side, the synchronism is made for the average value of the input signal. Thus, with the synchronism with the ASK carrier signal component, the respective received signals can be demodulated. Meanwhile, in the first example shown in (1) of FIG. 13A or the third example shown in FIG. 13C, in a channel other than the channel to which the ASK scheme is not applied (the BPSK scheme is applied), the phase relationship between the BPSK signal component and the ASK carrier signal component are orthogonalized (has a phase difference of $\pi/2$). For this reason, a phase shifter 8462 is provided to shift the phase of the reproduction carrier signal created through injection locking by 90 degrees ($\pi/2$). A control signal O/E is supplied to the phase shifter 8462 to control the phase shift direction on the basis of "n" prescribing the path condition 1.

With regard to the relationship path difference $\Delta d = (n/2 + 1/4) \lambda c$, as shown in (2) of FIG. 13A, when n is an odd number or an even number, the phase relationship between the BPSK signal component and the ASK carrier signal component in the received signal becomes +90 degrees (+$\pi/2$) or becomes −90 degrees (−$\pi/2$).

While the MIMO processing is performed for the signal component on the transmission side, the MIMO processing is not performed for the carrier component. Thus, with regard to the signal component, the signal component of the unnecessary wave does not appear in the reception-side antenna 236. The signal component of the desired wave does not undergo phase rotation and appears in the antenna 236.

The carrier component appears in the reception-side antenna 236, and the phase of the carrier component at that time depends on the transmission distance. In comparison of the phases of carriers appear in the antennas 236, there is a phase difference corresponding to the difference in the transmission distance (that is, the path difference Δd).

Specifically, when n is an odd number (ODD), as shown in (2-1) of FIG. 13A, in a channel other than the first channel, the ASK carrier signal component appears in the negative direction of the Q axis with respect to the BPSK signal component in the I-axis direction with respect to the BPSK signal component in the I-axis direction. Meanwhile, when n is an even number (EVEN), as shown in (2-2) of FIG. 13A, in a channel other than the first channel, the ASK carrier signal component appears in the position direction of the Q axis with respect to the BPSK signal component in the I-axis direction.

Therefore, the phase shifter 8362 has to switch −90 degrees (−π/2) and +90 degrees (+π/2) in accordance with whether n is an odd number or an even number. In practice, since it is known whether the number of antennas is an odd number or an even number when the antennas are provided, it is said that it is only necessary to select any one, instead of switching in accordance with the control signal.

Transmission MIMO

Second Embodiment

Figure 14A:
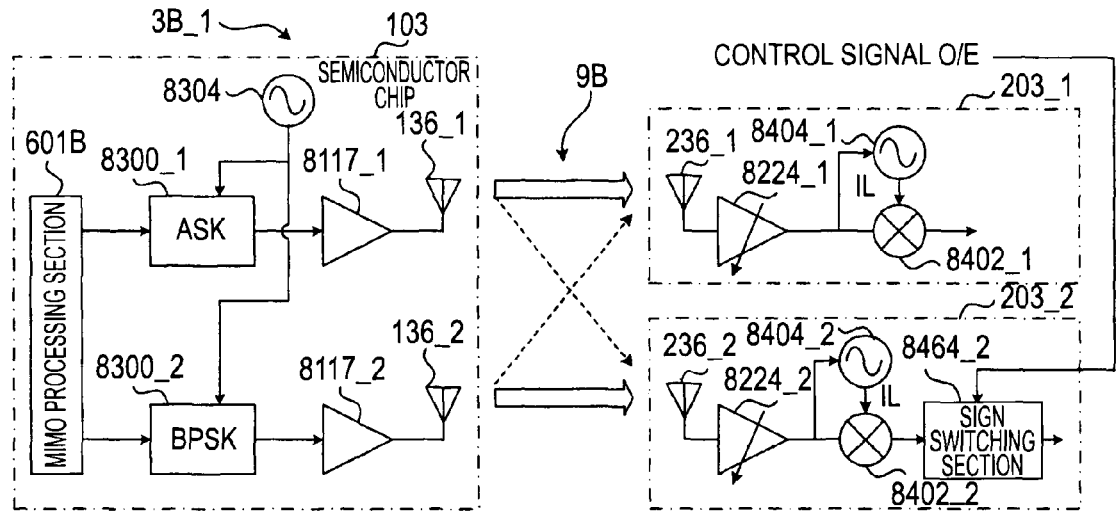
FIG. 14A is a diagram illustrating a transmission MIMO system of a second embodiment (first example).
Figure 14A:
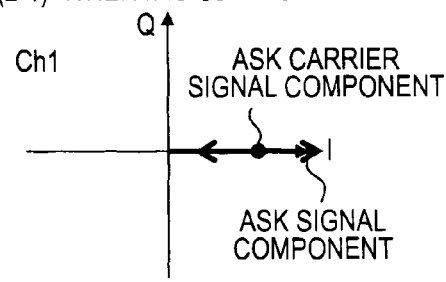
Figure 14A:
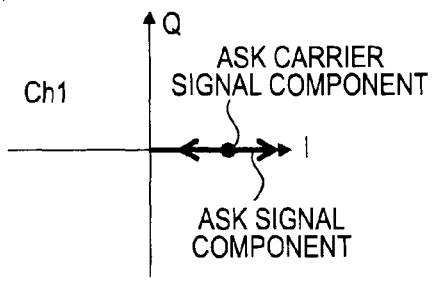
Figure 14A:
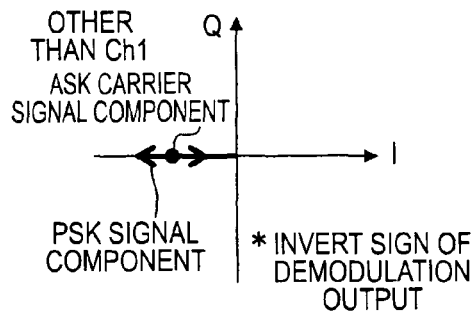
Figure 14A:
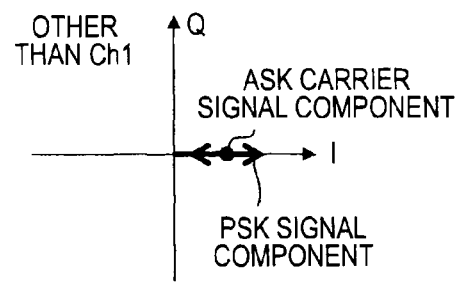
Figure 14B:
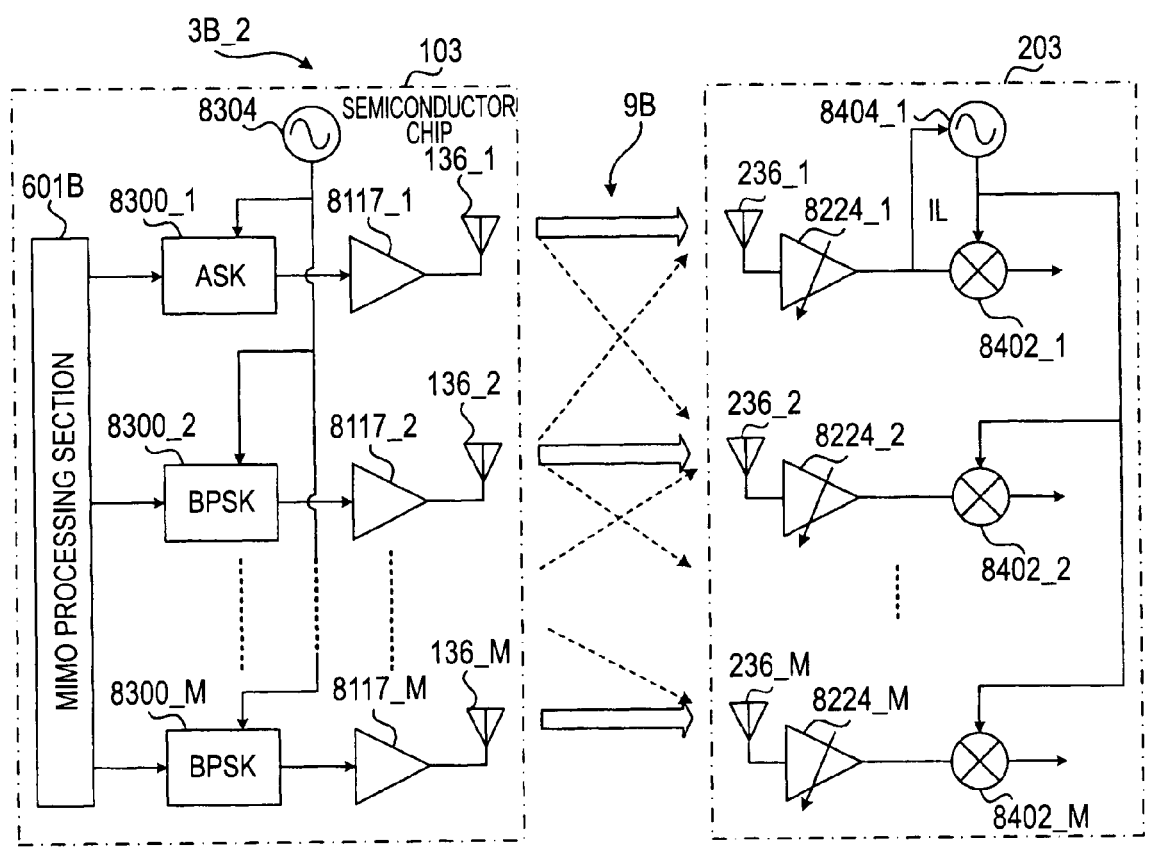
FIG. 14B is a diagram illustrating a transmission MIMO system of the second embodiment (second example).
Figure 14C:
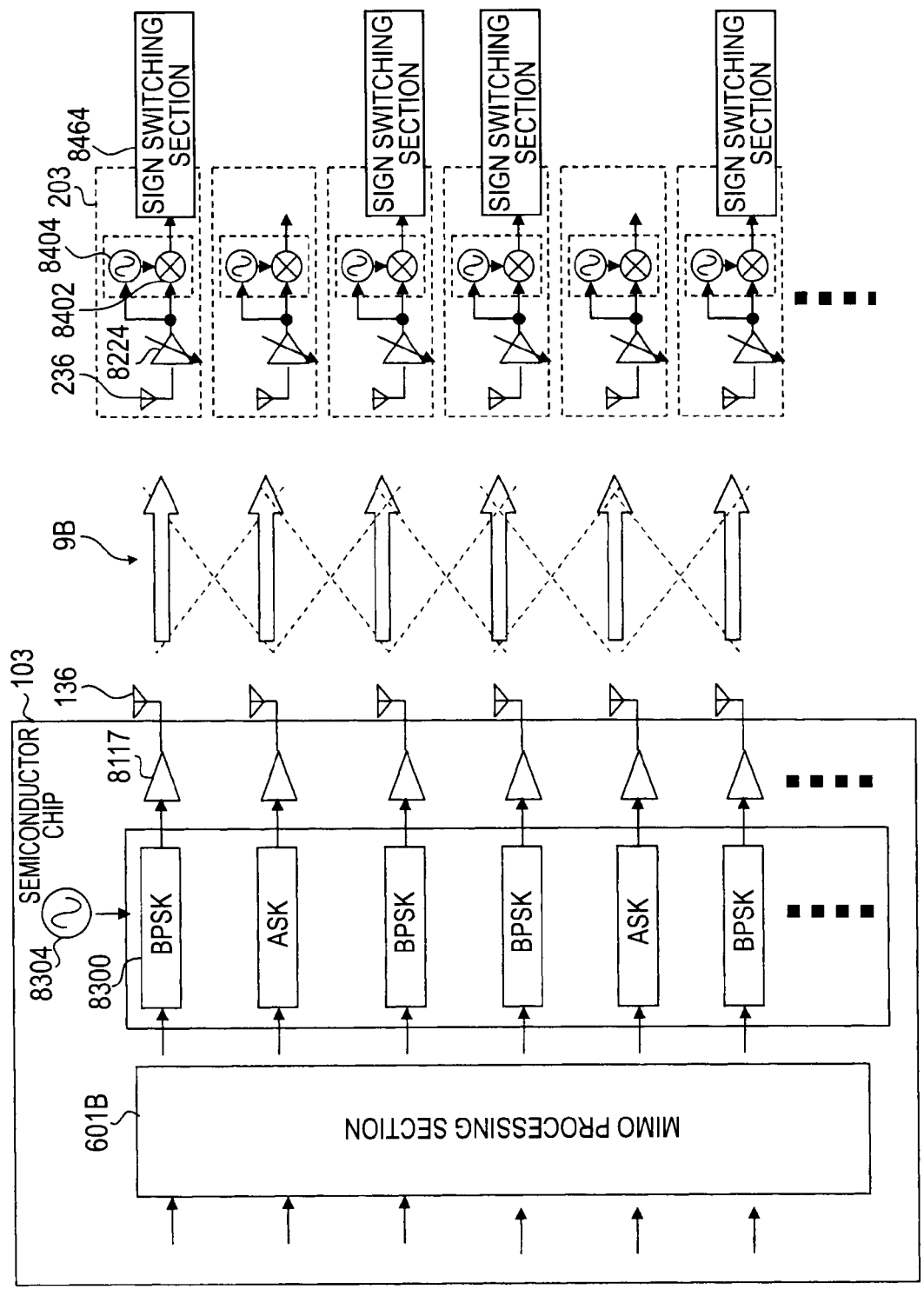
FIG. 14C is a diagram illustrating a transmission MIMO system of the second embodiment (third example).

FIGS. 14A to 14C are diagrams illustrating a second example (referred to as the transmission MIMO system of the second embodiment) of the specific application example of MIMO processing for application on the transmission side described with reference to FIGS. 9A to 12D. In this case, it is also assumed that "an unnecessary wave reaches only adjacent antennas".

A transmission MIMO system 3B of the second embodiment has a feature in that injection locking is applied on the reception side. In consideration of the reduction in necessary transmission power at the time of multiplex transmission, only one system (first channel Ch1) from among the M systems uses the scheme of modulating only amplitude (in this case, the ASK scheme), and all the remaining systems use a scheme (in this case, the BPSK scheme) other than the scheme of modulating only amplitude.

In a transmission MIMO system 3B_1 of a first example shown in FIG. 14A, with regard to the M systems, the transmission side has a single-chip configuration, and the reception side has a 1-to-N configuration such that the semiconductor chip 203 is used by system. On the reception side, injection locking is applied to a received signal by system. Since it is assumed that "an unnecessary wave reaches only adjacent antennas", similarly to the first example, the basis resides in the correspondence relationship in the two channels.

Meanwhile, in a transmission MIMO system 3B_2 of a second example shown in FIG. 14B, the reception side has a single-chip configuration, and the reception side also has a single-chip configuration, that is, a 1-to-1 configuration is made. On the reception side, one ASK system (first channel Ch1) is used, and in all the remaining systems, synchronous detection is performed on the basis of the reproduction carrier signal acquired through of the ASK system. Even when it is assumed that "an unnecessary wave reaches only adjacent antennas", since injection locking is taken with the channel of the ASK scheme, unlike the first example, the number of BPSK channels can be set arbitrarily.

A transmission MIMO system 3B_3 of a third example shown in FIG. 14C has a configuration such that the number of channels increases while the concept of the first example is used. While the assumption that "an unnecessary wave reaches only adjacent antennas" is not collapsed, the channel of the ASK scheme is arranged such that the modulated signal according to the ASK scheme reaches all the antennas 236. Specifically, a three-channel configuration may be made as a basic element such that the channels of the BPSK scheme are arranged on both sides of the channel of the ASK scheme, and the basic element may be repeatedly arranged.

With regard to the antenna arrangement, the antennas 136 and 236 are arranged such that the path difference Δd satisfies the path condition 2, that is, the relationship the path difference Δd=(n/2)λc is approximated. With regard to the signal component, only a desired component is input to the reception side. Since the path condition 2 is applied, the MIMO processing section 601B of the second example shown in (2) of FIG. 11B is used as the MIMO processing section 601. If the relationship the path difference Δd=(n/2)λc is completely satisfied, the component of the unnecessary wave is not received by the reception-side antenna 236 because of the effect of the MIMO processing applied on the transmission side. However, when there is a shift, the component of the unnecessary wave is detected a little. When there is a phase characteristic depending on directionality, the antennas 136 and 236 are arranged as described above such that the path difference Δd approximates to the relationship of Expression (5-3).

In the case of injection locking on the reception side, the synchronism is made for the average value of the input signal. Thus, with the synchronism with the ASK carrier signal component, the respective received signals can be demodulated. Meanwhile, in the first example shown in (1) of FIG. 14A or the third example shown in FIG. 14C, in a channel other than the channel to which the ASK scheme is not applied (the BPSK scheme is applied), the BPSK signal component and the ASK carrier signal component are in phase; however, the sign is affected by "n" which prescribes the path condition 2. Thus, a sign switching section 8464 (an example of a sign setting section) which switches the signal of the demodulation output is provided at the back of the frequency mixing section 8402. A control signal O/E is supplied to the sign switching section 8464 to control the sign of the demodulated signal on the basis of "n" which prescribes the path condition 2.

In the case of the relationship the path difference Δd=(n/2)λc, as shown in (2) of FIG. 14A, when n is an odd number or an even number, the BPSK signal component and the ASK carrier signal component in the received signal appear on the negative side of the I axis or the positive side of the I axis. The appearance on the negative side of the I axis means that the received signal (envelop) becomes negative. Specifically, when n is an odd number (ODD), as shown in (2-1) of FIG. 14A, in a channel other than the first channel, the BPSK signal component and the ASK carrier signal component appear on the negative side of the I axis. This means that, when n is an odd number, the phase of the received signal is inverted. Thus, it is necessary to invert the sign of the demodulation output. Meanwhile, when n is an even number (EVEN), as shown in (2-2) of FIG. 14A, the BPSK signal component and the ASK carrier signal component appear on the positive side of the I axis.

Therefore, the sign switching section 8464 has to switch the sign of the demodulation output between positive and negative in accordance with whether n is an odd number or an even number. In practice, since it is known whether the number of antennas is an odd number or an even number when the antennas are provided, it is said that it is only necessary to select any one, instead of switching in accordance with the control signal.

Transmission MIMO

Third Embodiment

Figure 15A:
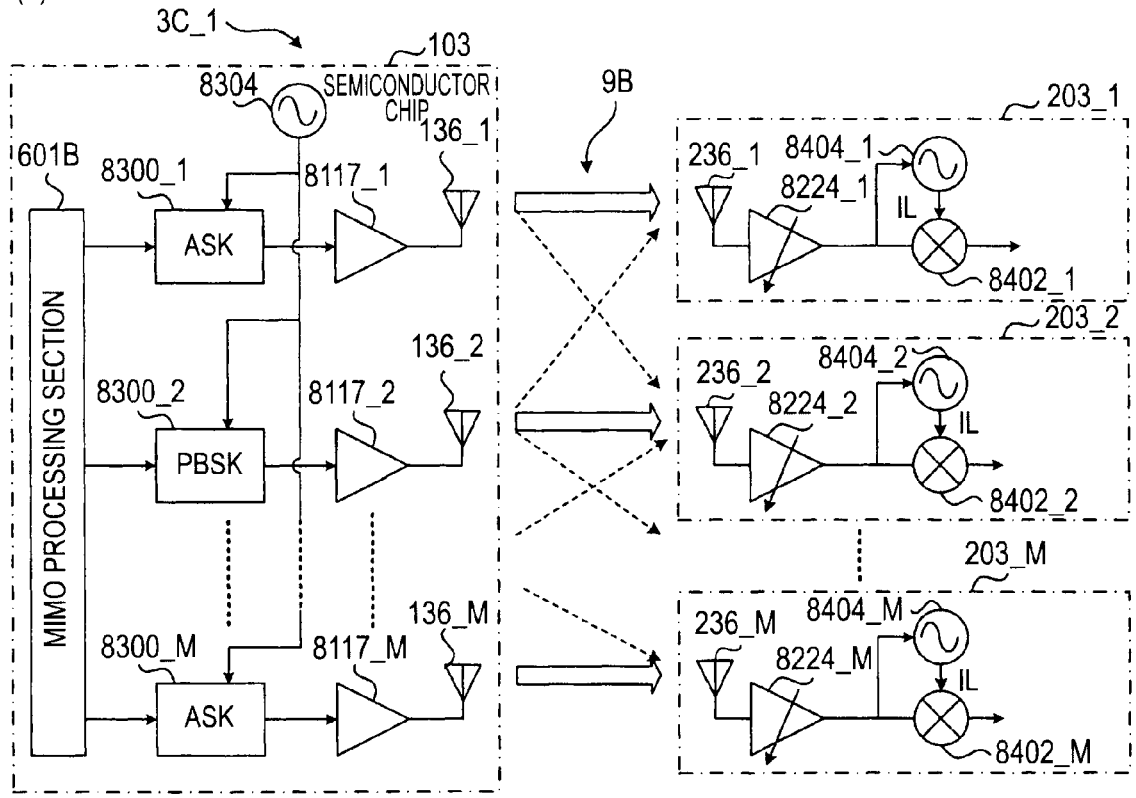
FIG. 15A is a diagram illustrating a transmission MIMO system of a third embodiment (first example).
Figure 15A:
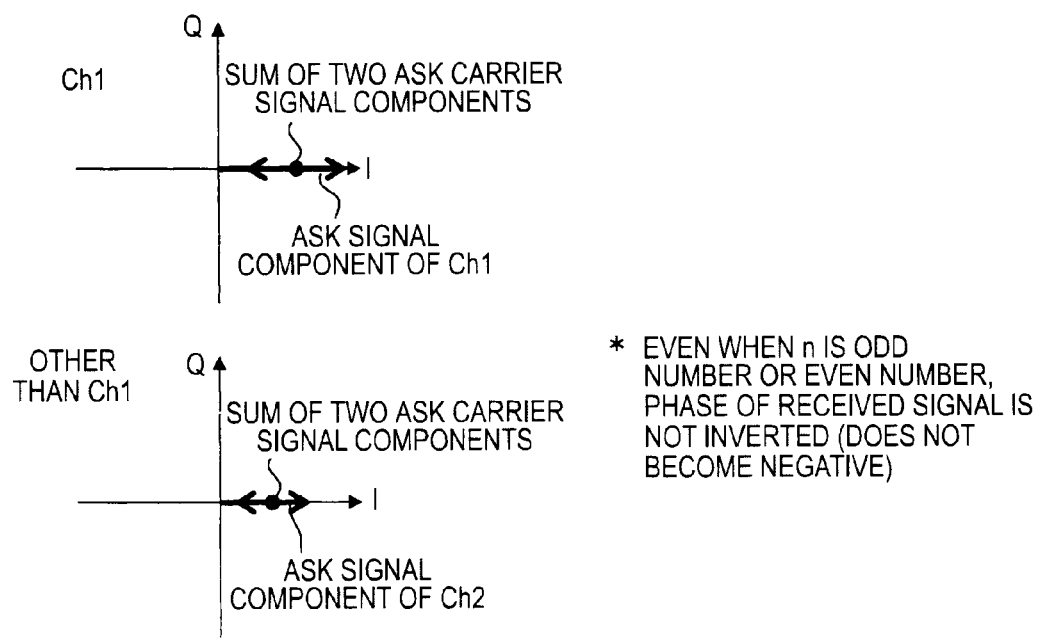
Figure 15B:
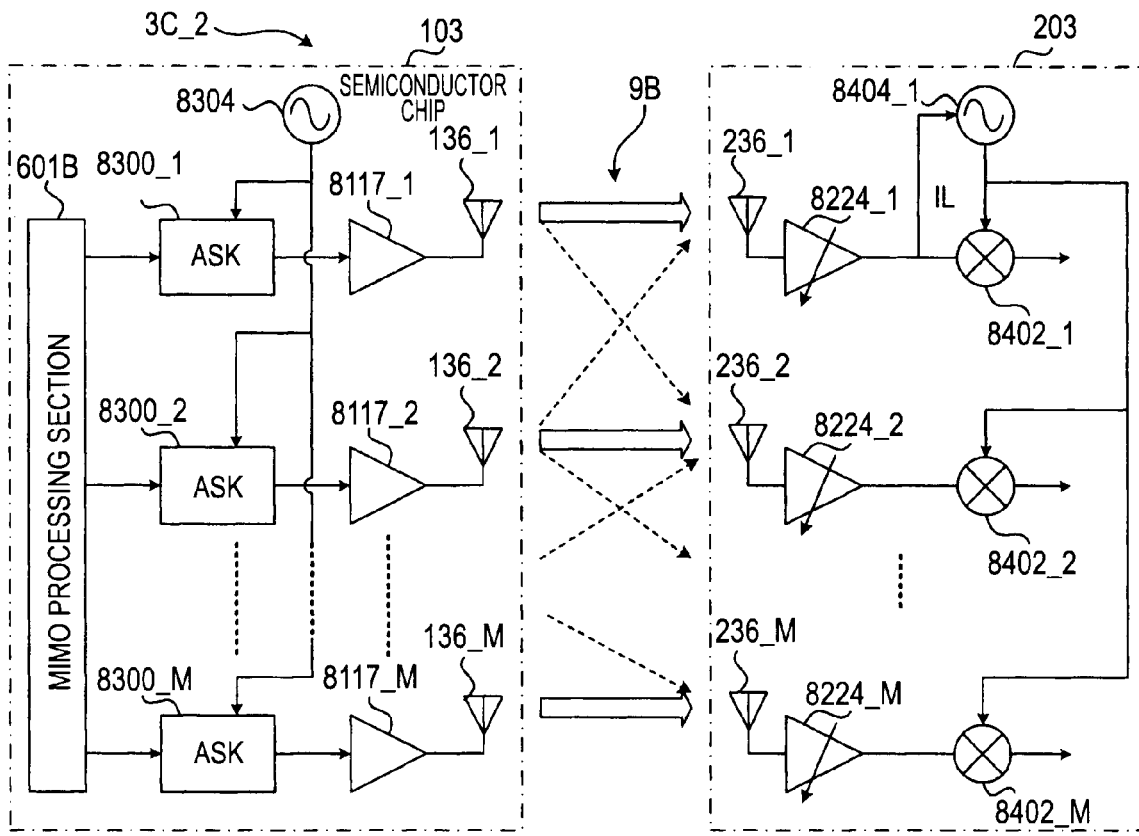
FIG. 15B is a diagram illustrating a transmission MIMO system of the third embodiment (second example).
Figure 15C:
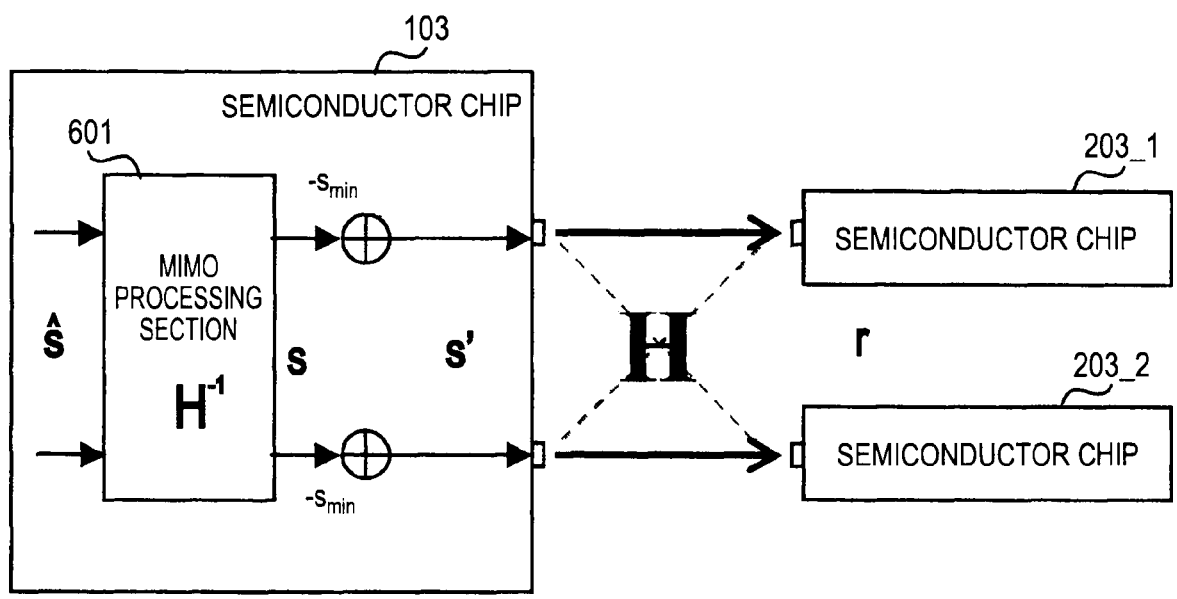
FIG. 15C is a diagram illustrating the phase of a received signal being not inverted in the transmission MIMO system of the third embodiment (first example).

FIGS. 15A to 15C are diagrams illustrating a third example (referred to as a transmission MIMO system of a third embodiment) of the specific application example of MIMO processing applied on the transmission side shown in FIGS. 9A to 12D.

A transmission MIMO system 3C of the third embodiment has a feature in that injection locking is applied on the reception side. Further, in consideration of ease of injection locking on the reception side, all the M systems use the scheme of modulating only amplitude (in this case, the ASK scheme). Since all channels use the ASK scheme, the number of channels can be set arbitrarily.

In a transmission MIMO system 3C_1 of a first example shown in FIG. 15A, with regard to the M systems, the reception side has a single-chip configuration, and the reception side has a 1-to-N configuration such that the semiconductor chip 203 is used by system. On the reception side, injection locking is applied to a received signal by system.

Meanwhile, in a transmission MIMO system 3C_2 of a second example shown in FIG. 15B, the transmission side has a single-chip configuration, and the reception side also has a single-chip configuration, that is, a 1-to-1 configuration is made. On the reception side, one ASK system (for example, first channel Ch1), and in all the remaining systems, synchronous detection is performed on the basis of the reproduction carrier signal acquired through injection locking of the ASK system. The following systems may be mixed: a system where the carrier signal for demodulation synchronized with the carrier signal for modulation is created on the basis of the received signal through injection locking, and the received modulated signal is demodulated through frequency conversion with the carrier signal for demodulation; and a system where the received modulated signal is frequency-converted on the basis of the carrier signal for demodulation created through injection locking through frequency conversion and then demodulated. The number of channels using injection locking is not limited to one system and may be a plural number insofar as the number of channels is smaller than the total number of channel.

With regard to the antenna arrangement, the antennas 136 and 236 are arranged such that the path difference Δd satisfies the path condition 2, that is, the relationship the path difference Δd=(n/2)λc is approximated. With regard to the signal component, only a desired component is input to the reception side. Since the path condition 2 is applied, the MIMO processing section 6013 of the second example shown in (2) of FIG. 11B is used as the MIMO processing section 601. If the relationship the path difference Δd=(n/2)λc is completely satisfied, the component of the unnecessary wave is not received by the reception-side antenna 236 because of the effect of the MIMO processing. However, when there is a shift, the component of the unnecessary wave is detected a little. When there is a phase characteristic depending on directionality, the antennas 136 and 236 are arranged as described above such that the path difference Δd approximates to the relationship of Expression (5-3).

In the case of injection locking on the transmission side, the synchronism is made for the average value of the input signal. Thus, with the synchronism with the ASK carrier signal, the respective received signals can be decoded. In the first example shown in (1) of FIG. 15A, as shown in (2) of FIG. 15A, the sign of the component of the sum of two ASK carrier signals is not affected by "n" prescribing the path condition 2.

This means that the phase of the received signal is not inverted (does not become negative), regardless of "n" being an odd number or an even number. Thus, unlike the second embodiment (first example), it is not necessary to provide the sign switching section 8464.

Referring to FIG. 15C, description will be provided for the regard that, if the antenna arrangement is set such that all systems are ASK, and the path difference Δd satisfies the path condition 2, the phase of the received signal is not inverted (does not become negative), regardless of "n" being an odd number or an even number.

A signal to be transmitted (transmission-target signal Ŝ (circumflex over s)) and the channel matrix H are defined as described in Expression (6-1). With the indication that transmission is performed in the ASK scheme and the received signal (envelope) does not become negative, taking into consideration the point that the (envelope) of the transmitted signal does not become negative in the ASK scheme, only a case where a of the channel matrix H is negative may be taken into consideration.

The inverse matrix H^−1 of the channel matrix H is expressed by Expression (6-2), and the transmitted signal s is expressed by Expression (6-3). When a is negative, the minimum value $s_{min}$ of the transmitted signal s is as described in Expression (6-4).

For ASK modulation, the transmitted signal s' does not have to be negative, thus it is necessary to give the offset corresponding to the minimum value $s_{min}$ of the transmitted signal. The offset may be set to, for example, b0 in (3) and (4) of FIG. 8A. The transmitted signal s' after the offset (the envelope of the ASK modulated wave) is expressed by Expression (6-5). A received signal r corresponding to the transmitted signal s' after the offset is expressed by Expression (6-6). Since the transmitted signals s1 and s2 have the minimum value of "−s", it is understood from Expression (6-6) that the received signal r does not become negative constantly.

$$\left.\begin{aligned}
\hat{s} &= \begin{pmatrix} s_1 \\ s_2 \end{pmatrix}, \begin{matrix} s_1 = \pm s \\ s_2 = \pm s, \end{matrix} H = \begin{pmatrix} 1 & a \\ a & 1 \end{pmatrix}, |a| < 1 & (6-1) \\
H^{-1} &= \frac{1}{1-a^2}\begin{pmatrix} 1 & -a \\ -a & 1 \end{pmatrix} & (6-2) \\
s &= H^{-1}\hat{s} = \frac{1}{1-a^2}\begin{pmatrix} s_1 - as_2 \\ s_2 - as_1 \end{pmatrix} & (6-3) \\
s_{min} &= \frac{1}{1-a^2}\begin{pmatrix} -s+as \\ -s+as \end{pmatrix} = \frac{s}{1-a^2}\begin{pmatrix} a-1 \\ a-1 \end{pmatrix} & (6-4) \\
s' &= s - s_{min} = \frac{1}{1-a^2}\begin{pmatrix} s_1 - as_2 - as + s \\ s_2 - as_1 - as + s \end{pmatrix} & (6-5) \\
r &= Hs' \\
&= \begin{pmatrix} 1 & a \\ a & 1 \end{pmatrix}\left(\frac{1}{1-a^2}\begin{pmatrix} s_1 - as_2 - as + s \\ s_2 - as_1 - as + s \end{pmatrix}\right) \\
&= \frac{1}{1-a^2}\begin{pmatrix} s_1(1-a^2) + s(1-a^2) \\ s_2(1-a^2) + s(1-a^2) \end{pmatrix} & (6-6) \\
&= \begin{pmatrix} s_1 + s \\ s_2 + s \end{pmatrix}
\end{aligned}\right\} (6)$$

Transmission MIMO

Fourth Embodiment

Figure 16:
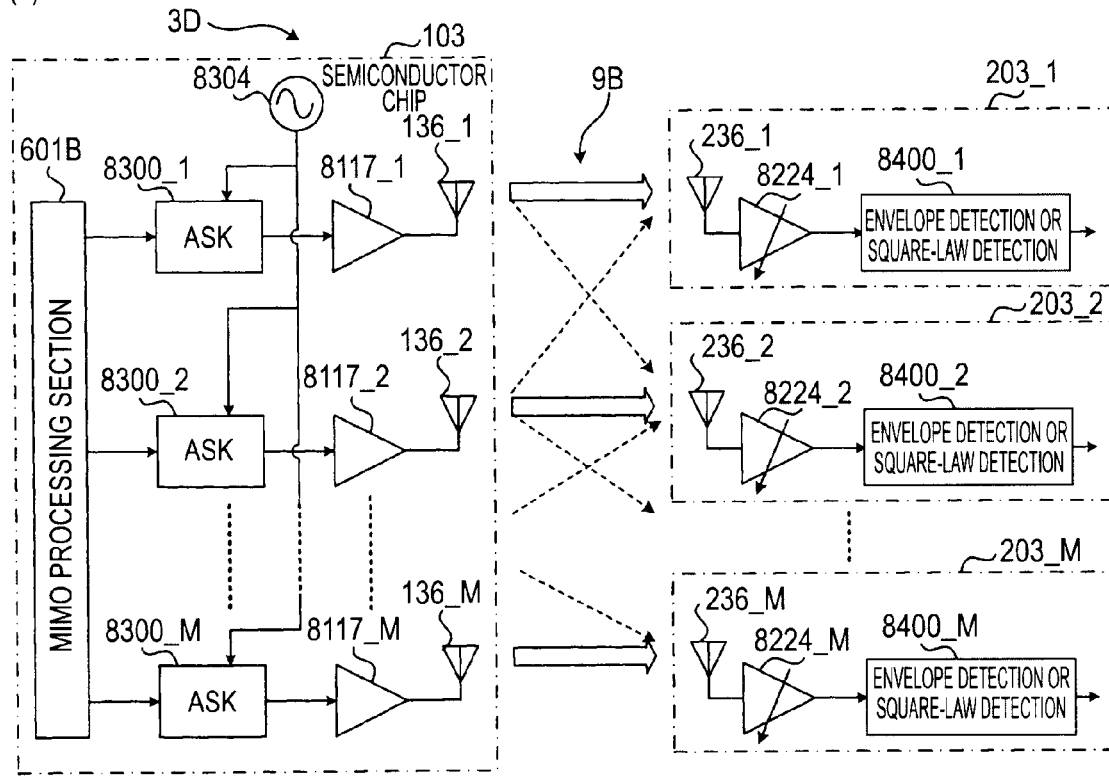
FIG. 16 is a diagram illustrating a transmission MIMO system of a fourth embodiment.
Figure 16:
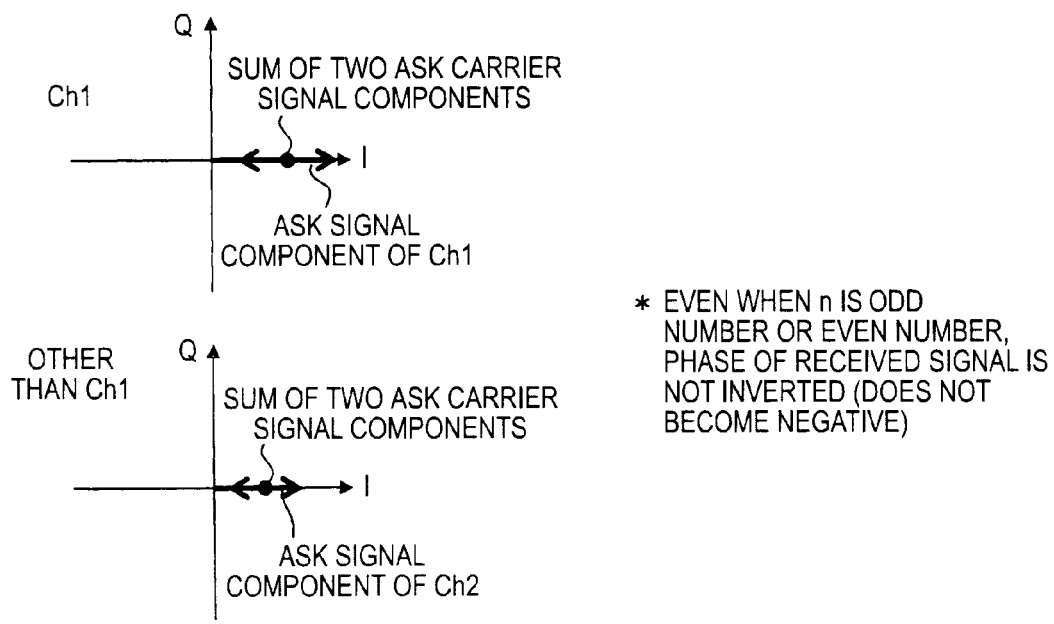

FIG. 16 is a diagram illustrating a fourth example (referred to as a transmission MIMO system of the fourth embodiment)

of the specific application example of the MIMO processing for application on the transmission side described with reference to FIGS. 9A to 12D. Referring to FIG. 16, with regard to the M systems, the transmission side has a single-chip configuration, and the reception side has a 1-to-N configuration such that the semiconductor chip 203 is used by system. Meanwhile, the reception side may have a single-chip configuration, that is, a 1-to-1 configuration may be made.

A transmission MIMO system 3D of the fourth embodiment has a feature in that the demodulation functional section 8400 applies envelope detection or square-law detection on the reception side, instead of injection locking. Further, a scheme (in this case, ASK scheme) is used in which only amplitude is modulated for all the M system taking into consideration a combination with envelope detection or square-law detection. The ASK scheme is applied for all channels, thus the number of channels can be set arbitrarily.

With regard to the antenna arrangement, the antennas 136 and 236 are arranged such that the path difference Δd satisfies the path condition 2, that is, approaches the relationship the path difference $\Delta d=(n/2)\lambda c$. Since the path condition 2 is applied, as the MIMO processing section 601, the MIMO processing section 601B of the second example shown in (2) of FIG. 11B is used.

With regard to the signal components, only a desired component is input to the reception side. If the relationship the path difference $\Delta d=(n/2)\lambda c$ is completely satisfied, the component of the unnecessary wave is not received by the reception-side antenna 236 because of the MIMO processing applied on the transmission side. However, when a shift exists, the component of the unnecessary wave is detected a little. When there is a phase characteristic depending on directionality, as described above, the antennas 136 and 236 are arranged such that the path difference Δd approaches the relationship of Expression (5-3).

As described in the third embodiment, if all systems use ASK, and the antenna arrangement is set such that the path difference Δd satisfies the path condition 2, as shown in (2) of FIG. 16, the sign of the component of the sum of the two ASK carrier signals is not affected by "n" which defines the path condition 2. Regardless of whether "n" is an odd number or an even number, the phase of the received is not inverted. Thus, even when envelope detection or square-law detection is applied, amplitude information is held, and the respective received signals can be demodulated.

The present application contains subject matters related to those disclosed in Japanese Priority Patent Applications JP 2009-243107 and JP 2010-011360 filed in the Japan Patent Office on Oct. 22, 2009 and Jan. 21, 2010, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A radio transmission system comprising:
a plurality of antenna pairs, each antenna pair including a transmitting antenna and a receiving antenna corresponding to each other and configured such that a radio signal transmitted from the transmitting antenna in one of the plurality of antenna pairs directly arrives as a desired wave at the receiving antenna of the one antenna pair, and a radio signal transmitted from the transmitting antenna of another antenna pair different from the one antenna pair directly arrives as an unnecessary wave at the receiving antenna of the one antenna pair;
a transfer characteristic correction circuit provided for each of the antenna pairs, each transfer characteristic correction circuit configured to correct a transmission-target signal corresponding to the transmitting antenna of the corresponding antenna pair based on a transfer characteristic of a transmission space between the transmitting antenna and the receiving antenna of the corresponding antenna pair; and
a modulation functional circuit provided for each of the antenna pairs, each modulation functional circuit configured to modulate a carrier signal with a corrected signal after correction by the transfer characteristic correction circuit and transmit the modulated carrier signal from the transmitting antenna of the corresponding antenna pair, wherein
for each of a plurality of transmission-target signals, the transfer characteristic correction circuit is configured to perform only a real term-related correction operation for a desired signal and only an imaginary term-related correction operation for an unnecessary signal, and supply a real term-related corrected signal for the desired signal and an imaginary term-related corrected signal for the unnecessary signal in a pair to the modulation functional circuit, and
for each of the plurality of transmission-target signals, the modulation functional circuit quadrature-modulates for the real term-related corrected signal, for the desired signal and the imaginary term-related corrected signal, and for the unnecessary signal supplied in a pair from the transfer characteristic correction circuit.

2. The radio transmission system according to claim 1, wherein a path difference, which is the difference between an inter-antenna distance of the desired wave and an inter-antenna distance of the unnecessary wave, between the transmitting antenna and the receiving antenna is set such that each element of the desired wave of a matrix prescribing the transfer characteristic is expressed only by a real term, and each element of the unnecessary wave of the matrix prescribing the transfer characteristic is expressed by a real term or an imaginary term.

3. The radio transmission system according to claim 2, wherein the path difference is further set such that each element of the unnecessary wave of the matrix prescribing the transfer characteristic is expressed only by an imaginary term.

4. The radio transmission system according to claim 3, wherein the modulation functional circuit is configured to modulate only amplitude for transmission-target signals corresponding to at least one antenna pair and the modulation functional circuit is configured to modulate amplitude and an additional property for transmission target-signals corresponding to other antenna pairs not including the at least one antenna pair, and
the radio transmission system further comprises:
a demodulation functional circuit configured to, for each of the plurality of transmission-target signals, create a carrier signal for demodulation synchronized with a carrier signal for modulation through injection locking on the basis of a received signal, and demodulate a received modulated signal through frequency conversion with the carrier signal for demodulation; and
a phase-shift circuit configured to, for the other antenna pairs not including the at least one antenna pair, shift the phase of the carrier signal for demodulation and supply the phase-shifted carrier signal to the corresponding demodulation functional circuit.

5. The radio transmission system according to claim 3,
wherein the modulation functional circuit is configured to modulate only amplitude for transmission-target signals corresponding to at least one antenna pair and the modulation functional circuit is configured to modulate amplitude and an additional property for transmission target-signals corresponding to other antenna pairs not including the at least one antenna pair, and the radio transmission system further comprises a demodulation functional circuit configured to, for the at least one antenna pair, create a carrier signal for demodulation synchronized with a carrier signal for modulation through injection locking on the basis of a received signal, demodulate a received modulated signal through frequency conversion with the carrier signal for demodulation, and for the antenna pairs not using injection locking, demodulate the received modulated signal through frequency conversion with the carrier signal for demodulation created by the antenna pairs using injection locking.

6. The radio transmission system according to claim 2,
wherein the path difference is further set such that each element of the unnecessary wave of the matrix prescribing the transfer characteristic is expressed only by a real term.

7. The radio transmission system according to claim 6,
wherein the modulation functional circuit is configured to modulate only amplitude for transmission-target signals corresponding to at least one of the antenna pair and the modulation functional circuit is configured to modulate amplitude and an additional property for transmission target-signals corresponding to other antenna pairs not including the at least one antenna pair, and the radio transmission system further comprises:
a demodulation functional circuit configured to, for each of the plurality of transmission-target signals, create a carrier signal for demodulation synchronized with a carrier signal for modulation through injection locking on the basis of a received signal, and demodulate a received modulated signal through frequency conversion with the carrier signal for demodulation; and
a sign setting circuit configured to, for the other antenna pairs, set the sign of an output signal output from the demodulation functional circuit.

8. The radio transmission system according to claim 2, wherein
when a wavelength of the carrier signal used in the modulation functional circuit is $\lambda c$, and phase characteristics depending on the directionality of antennas are zero, a path difference, which is the difference between an inter-antenna distance of the desired wave and an inter-antenna distance of the unnecessary wave, between the transmitting antenna and the receiving antenna is set to $(n/2+\frac{1}{4})\lambda c$, where n is a positive integer of 0 or equal to or greater than 1, and when a radiation angle from the transmitting antenna of the one antenna pair to the receiving antenna of the one antenna pair is $\theta 1$, a radiation angle from the transmitting antenna of another antenna pair to the receiving antenna of the one antenna pair is $\theta 2$, and the phase characteristics depending on the directionality of the antennas are $\phi a(\theta 1)$ and $\phi a(\theta 2)$, the path difference is corrected by $-(\phi a(\theta 2)-\phi a(\theta 1))/\pi)\lambda c$.

9. The radio transmission system according to claim 2, wherein
when a wavelength of the carrier signal used in the modulation functional circuit is $\lambda c$, and phase characteristics depending on the directionality of antennas are zero, a path difference, which is the difference between an inter-antenna distance of the desired wave and an inter-antenna distance of the unnecessary wave, between the transmitting antenna and the receiving antenna is set to $(n/2)\lambda c$, where n is a positive integer of 0 or equal to or greater than 1, and when a radiation angle from the transmitting antenna of the one antenna pair to the receiving antenna of the one antenna pair is $\theta 1$, a radiation angle from the transmitting antenna of another antenna pair to the receiving antenna of the one antenna pair is $\theta 2$, and the phase characteristics depending on the directionality of the antennas are $\phi a(\theta 1)$ and $\phi a(\theta 2)$, the path difference is corrected by $-(\phi a(\theta 2)-\phi a(\theta 1))/\pi)\lambda c$.

10. The radio transmission system according to claim 1, wherein
when a wavelength of the carrier signal used in the modulation functional circuit is $\lambda c$, and phase characteristics depending on the directionality of antennas are zero, a path difference, which is the difference between an inter-antenna distance of the desired wave and an inter-antenna distance of the unnecessary wave, between the transmitting antenna and the receiving antenna is set to $(n/2+\frac{1}{4})\lambda c$, where n is a positive integer of 0 or equal to or greater than 1, and when a radiation angle from the transmitting antenna of the one antenna pair to the receiving antenna of the one antenna pair is $\theta 1$, a radiation angle from the transmitting antenna of another antenna pair to the receiving antenna of the one antenna pair is $\theta 2$, and the phase characteristics depending on the directionality of the antennas are $\phi a(\theta 1)$ and $\phi a(\theta 2)$, the path difference is corrected by $-(\phi a(\theta 2)-\phi a(\theta 1))/\pi)\lambda c$.

11. The radio transmission system according to claim 10,
wherein the modulation functional circuit is configured to modulate only amplitude for transmission-target signals corresponding to at least one antenna pair and the modulation functional circuit is configured to modulate amplitude and an additional property for transmission target-signals corresponding to other antenna pairs not including the at least one antenna pair, and the radio transmission system further comprises:
a demodulation functional circuit configured to, for each of the plurality of transmission-target signals, create a carrier signal for demodulation synchronized with a carrier signal for modulation through injection locking on the basis of a received signal, and demodulate a received modulated signal through frequency conversion with the carrier signal for demodulation; and
a phase-shift circuit configured to, for the other antenna pairs not including the at least one antenna pair, shift the phase of the carrier signal for demodulation and supply the phase-shifted carrier signal to the corresponding demodulation functional circuit.

12. The radio transmission system according to claim 10,
wherein the modulation functional circuit is configured to modulate only amplitude for transmission-target signals corresponding to at least one antenna pair and the modulation functional circuit is configured to modulate amplitude and an additional property for transmission target-signals corresponding to other antenna pairs not including the at least one antenna pair, and the radio transmission system further comprises a demodulation functional circuit configured to, for the at least one antenna pair, create a carrier signal for demodulation synchronized with a carrier signal for modulation through injection locking on the basis of a received signal, demodulate a received modulated signal through frequency conversion with the carrier signal for demodulation, and for the antenna pairs not using injection locking, demodulate the received modulated signal through frequency conversion with the carrier signal for demodulation created by the antenna pairs using injection locking.

13. The radio transmission system according to claim 1, wherein when a wavelength of the carrier signal used in the modulation functional circuit is λc, and phase characteristics depending on the directionality of antennas are zero, a path difference, which is the difference between an inter-antenna distance of the desired wave and an inter-antenna distance of the unnecessary wave between the transmitting antenna and the receiving antenna is set to (n/2)λc, where n is a positive integer of 0 or equal to or greater than 1, and when a radiation angle from the transmitting antenna of the one antenna pair to the receiving antenna of the one antenna pair is θ1, a radiation angle from the transmitting antenna of another antenna pair to the receiving antenna of the one antenna pair is θ2, and the phase characteristics depending on the directionality of the antennas are φa(θ1) and φa(θ2), the path difference is corrected by −(φa(θ2)−φa(θ1))/π)λc.

14. The radio transmission system according to claim 13, wherein the modulation functional circuit is configured to modulate only amplitude for transmission-target signals corresponding to at least one of the antenna pair and the modulation functional circuit is configured to modulate amplitude and an additional property for transmission target-signals corresponding to other antenna pairs not including the at least one antenna pair, and the radio transmission system further comprises:
   a demodulation functional circuit configured to, for each of the plurality of transmission-target signals, create a carrier signal for demodulation synchronized with a carrier signal for modulation through injection locking on the basis of a received signal, and demodulate a received modulated signal through frequency conversion with the carrier signal for demodulation; and
   a sign setting circuit configured to, for the other antenna pairs, set the sign of an output signal output from the demodulation functional circuit.

15. The radio transmission system according to claim 13, wherein the modulation functional circuit is configured to modulate only amplitude for transmission-target signals corresponding to at least one of the antenna pair and the modulation functional circuit is configured to modulate amplitude and an additional property for transmission target-signals corresponding to other antenna pairs not including the at least one antenna pair, and the radio transmission system further comprises a demodulation functional circuit configured to, for the at least one antenna pair, create a carrier signal for demodulation synchronized with a carrier signal for modulation through injection locking on the basis of a received signal, demodulate a received modulated signal through frequency conversion with the carrier signal for demodulation, and for the antenna pairs not using injection locking, demodulate the received modulated signal on the basis of the carrier signal for demodulation created by the antenna pairs using injection locking through frequency conversion.

16. The radio transmission system according to claim 13, wherein the modulation functional circuit is configured to modulate only amplitude for all the antenna pairs of a plurality of transmission-target signals, and the radio transmission system further comprises a demodulation functional circuit configured to, for each of the plurality of transmission-target signals, create a carrier signal for demodulation synchronized with a carrier signal for modulation through injection locking on the basis of a received signal and demodulate a received modulated signal through frequency conversion with the carrier signal for demodulation.

17. The radio transmission system according to claim 13, wherein the modulation functional circuit is configured to modulate only amplitude for all the antenna pairs of a plurality of transmission-target signals, and the radio transmission system further comprises a demodulation functional circuit configured to mix a system in which a carrier signal for demodulation synchronized with a carrier signal for modulation is created through injection locking on the basis of a received signal, and a received modulated signal is demodulated through frequency conversion with the carrier signal for demodulation and a system in which the received modulated signal is demodulated through frequency conversion on the basis of the carrier signal for demodulation created by injection locking.

18. The radio transmission system according to claim 13, wherein the modulation functional circuit is configured to modulate only amplitude for all the antenna pairs of a plurality of transmission-target signals, and the radio transmission system further comprises a demodulation functional circuit configured to perform envelope detection or square-law detection for a received modulated signal.

19. The radio transmission system according to claim 1, wherein for each of a plurality of transmission-target signals, the transfer characteristic correction circuit is configured to perform only a real term-related correction operation for the desired signal and also only a real term-related correction operation for the unnecessary signal, add a real term-related corrected signal for the desired signal and a real term-related corrected signal for the unnecessary signal, and supplies the added signal to the modulation functional circuit and for each of the plurality of transmission-target signals, the modulation functional circuit is configured to modulate the added signal of the real term-related corrected signal for the desired signal and the real term-related corrected signal for the unnecessary signal supplied from the transfer characteristic correction circuit.

20. The radio transmission system according to claim 1 wherein the frequency of a carrier signal used in the modulation functional circuit is in common to all of the antenna pairs.

21. A radio communication apparatus for a system including a plurality of antenna pairs, each antenna pair including a transmitting antenna and a receiving antenna corresponding to each other, the apparatus comprising:

a transfer characteristic correction circuit configured to perform a correction operation based on a transfer characteristic of a transmission space between the transmitting antenna and receiving antenna of each antenna pair such that a radio signal transmitted from the transmitting antenna of one of the plurality of antenna pairs directly arrives as a desired wave at the receiving antenna of the one antenna pair, and a radio signal transmitted from the transmitting antenna of another antenna pair different from the one antenna pair directly arrives as an unnecessary wave at the receiving antenna of the antenna pair; and a modulation functional circuit configured to modulate a carrier signal with a corrected signal after correction by the transfer characteristic correction circuit and transmit the modulated carrier signal from the transmitting antenna corresponding to the antenna pair, wherein for each of a plurality of transmission-target signals, the transfer characteristic correction circuit is configured to perform only a real term-related correction operation for a desired signal and only an imaginary term-related correction operation for an unnecessary signal, and supply a real term-related corrected signal for the desired signal and an imaginary term-related corrected signal for the unnecessary signal in a pair to the modulation functional circuit, and for each of the plurality of transmission-target signals, the modulation functional circuit quadrature modulates for the real term-related corrected signal, for the desired signal and the imaginary term-related corrected signal, and for the unnecessary signal supplied in pair from the transfer characteristic correction section.

22. The radio communication apparatus according to claim 21,
wherein, for each of the plurality of the transmission-target signals, the transfer characteristic correction circuit is configured to perform only a real term-related correction operation for the desired signal and also only a real term-related correction operation for the unnecessary signal, add a real term-related corrected signal for the desired signal and a real term-related corrected signal for the unnecessary signal, supply the added signal to the modulation functional circuit, and for each of the plurality of transmission-target signals, the modulation functional circuit is configured to modulate the added signal of the real term-related corrected signal for the desired signal and the real term-related corrected signal for the unnecessary signal supplied from the transfer characteristic correction circuit.

23. A radio transmission method comprising:
providing a plurality of antenna pairs, each antenna pair including a transmitting antenna and a receiving antenna corresponding to each other;

performing radio transmission through space division multiplex such that a radio signal transmitted from the transmitting antenna of one of the plurality of antenna pairs directly arrives as a desired wave the receiving antenna of the one antenna pair, and a radio signal transmitted from the transmitting antenna of another antenna pair different from the one antenna pair directly arrives as an unnecessary wave at the receiving antenna of the one antenna pair;

correcting a transmission-target signal corresponding to the transmitting antenna of the corresponding antenna pair based on a transfer characteristic of a transmission space between the transmitting antenna and the receiving antenna;

modulating a carrier signal with a corrected signal after the correction; and transmitting the modulated signal from the corresponding transmitting antenna, wherein the correcting includes performing only a real term-related correction operation for a desired signal and only an imaginary term-related correction operation for an unnecessary signal, and supplying a real term-related corrected signal for the desired signal and an imaginary term-related corrected signal for the unnecessary signal in a pair, and the modulating includes quadrature-modulating for the real term-related corrected signal, for the desired signal and the imaginary term-related corrected signal, and for the unnecessary signal.

* * * * *